United States Patent
Takae et al.

(10) Patent No.: US 10,164,967 B2
(45) Date of Patent: Dec. 25, 2018

(54) TERMINAL DEVICE AND INFORMATION PROCESSING DEVICE

(71) Applicant: SONY CORPORATION, Tokyo (JP)

(72) Inventors: Shinji Takae, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 242 days.

(21) Appl. No.: 15/021,989

(22) PCT Filed: Sep. 29, 2014

(86) PCT No.: PCT/JP2014/075932
§ 371 (c)(1),
(2) Date: Mar. 15, 2016

(87) PCT Pub. No.: WO2015/068497
PCT Pub. Date: May 14, 2015

(65) Prior Publication Data
US 2016/0226861 A1    Aug. 4, 2016

(30) Foreign Application Priority Data
Nov. 11, 2013    (JP) ................... 2013-233414

(51) Int. Cl.
*H04L 29/06* (2006.01)
*H04W 48/14* (2009.01)
(Continued)

(52) U.S. Cl.
CPC ......... *H04L 63/0823* (2013.01); *H04W 12/06* (2013.01); *H04W 40/08* (2013.01);
(Continued)

(58) Field of Classification Search
CPC ................................. H04L 63/0823
(Continued)

(56) References Cited

U.S. PATENT DOCUMENTS

| 2004/0198234 A1* | 10/2004 | Wacker | H04W 24/00 455/67.13 |
| 2009/0007246 A1* | 1/2009 | Gutowski | H04L 63/20 726/6 |

(Continued)

FOREIGN PATENT DOCUMENTS

| JP | 2010-114743 A | 5/2010 |
| JP | 2013-197756 A | 9/2013 |

(Continued)

OTHER PUBLICATIONS

International Search Report dated Nov. 18, 2014 in PCT/JP2014/075932 filed Sep. 29, 2014.

*Primary Examiner* — Jacob Lipman
(74) *Attorney, Agent, or Firm* — Xsensus, LLP

(57) ABSTRACT

There is provided a terminal device including a mobile communication unit configured to perform mobile communication of a mobile communication network, an acquisition unit configured to acquire state information indicating a state of each of one or more wireless networks for wireless communication that is different from the mobile communication, a selection unit configured to select one wireless network among the one or more wireless networks based on the state information, and a providing unit configured to provide information regarding the one selected wireless network to another terminal device that performs the wireless communication.

20 Claims, 23 Drawing Sheets

(51) Int. Cl.
*H04W 48/18* (2009.01)
*H04W 12/06* (2009.01)
*H04W 40/08* (2009.01)
*H04W 52/02* (2009.01)
*H04W 88/04* (2009.01)
*H04W 84/12* (2009.01)
*H04W 36/08* (2009.01)
*H04W 48/20* (2009.01)

(52) U.S. Cl.
CPC ........... *H04W 48/14* (2013.01); *H04W 48/18* (2013.01); *H04W 52/0219* (2013.01); *H04W 52/0245* (2013.01); *H04W 36/08* (2013.01); *H04W 48/20* (2013.01); *H04W 84/12* (2013.01); *H04W 88/04* (2013.01); *Y02D 70/00* (2018.01); *Y02D 70/1222* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01)

(58) Field of Classification Search
USPC ............................................................ 726/7
See application file for complete search history.

(56) References Cited

U.S. PATENT DOCUMENTS

| | | | |
|---|---|---|---|
| 2010/0120439 A1 | 5/2010 | Hashimoto et al. | |
| 2013/0097657 A1* | 4/2013 | Cardamore | H04L 63/20 726/1 |
| 2013/0148568 A1* | 6/2013 | Iimori | H04W 40/02 370/315 |
| 2015/0351004 A1* | 12/2015 | Ko | H04W 48/10 455/411 |

FOREIGN PATENT DOCUMENTS

| | | |
|---|---|---|
| JP | 2013-207313 A | 10/2013 |
| JP | 2013-219740 A | 10/2013 |
| WO | 2013/134669 A1 | 9/2013 |

* cited by examiner

FIG. 5

| NETWORK TYPE | LOCATION | TIME |
|---|---|---|
| WLAN | LATITUDE: LAT_A<br>LONGITUDE: LON_A | MONDAY: 1:30 PM |

FIG. 6

| ID | NETWORK TYPE | NETWORK PROPERTY | COMMUNICATION AREA | AVAILABLE TIME |
|---|---|---|---|---|
| 1 | WLAN | HESSID: HESSID_1<br>ESSID: ESSID_1<br>BSSID: BSSID_1<br>CHANNEL: 1 | ANCHORLATITUDE: LAT_1<br>ANCHORLONGITUDE: LON_1<br>RADIUS: 30 | WEEKDAY: 9 AM - 10 PM<br>WEEKEND: 12 AM - 0 AM |
| 2 | WLAN | HESSID: HESSID_2<br>ESSID: ESSID_2<br>BSSID: BSSID_2<br>CHANNEL: 6 | ANCHORLATITUDE: LAT_2<br>ANCHORLONGITUDE: LON_2<br>RADIUS: 50 | WEEKDAY: 8 AM - 11 PM<br>WEEKEND: 8 AM - 11 AM |
| 3 | WLAN | HESSID: HESSID_3<br>ESSID: ESSID_3<br>BSSID: BSSID_3<br>CHANNEL: 6 | ANCHORLATITUDE: LAT_3<br>ANCHORLONGITUDE: LON_3<br>RADIUS: 30 | WEEKDAY: 8 AM - 11 PM<br>WEEKEND: 8 AM - 11 AM |

FIG. 7

| ESSID | MAX DEVICE CAPACITY | NUMBER OF DEVICEs | MAX TRAFFIC CAPACITY (Mbps) | TRAFFIC (Mbps) |
|---|---|---|---|---|
| ESSID_1 | 150 | 20 | 150 | 60 |
| ESSID_2 | 30 | 15 | 54 | 40 |
| ESSID_3 | 50 | 10 | 54 | 35 |

FIG. 8

| ESSID | FLOOR |
|---|---|
| ESSID_1 | 1,2,3 |
| ESSID_2 | 1 |
| ESSID_3 | 1 |

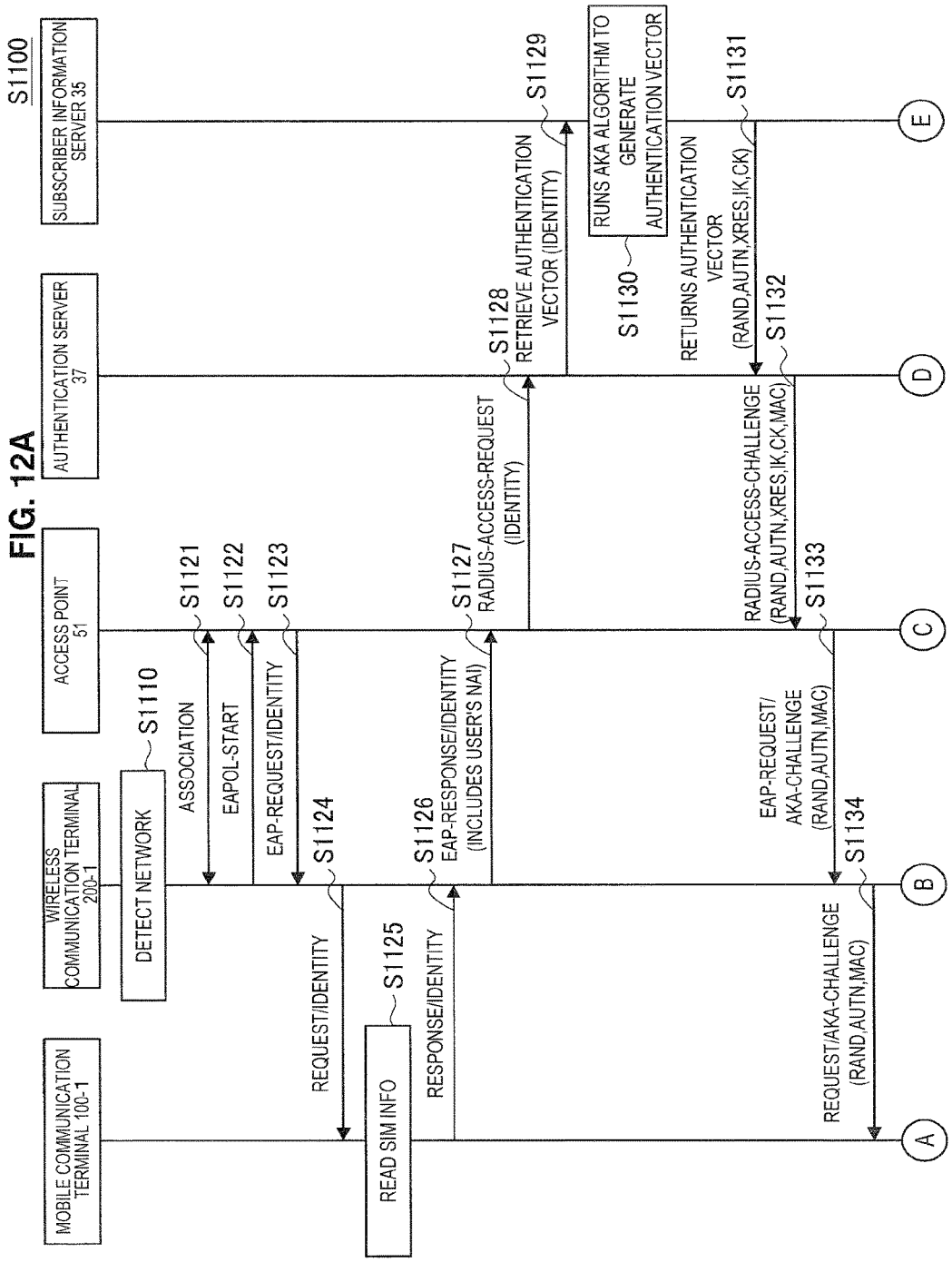

FIG. 13

| ESSID | RSSI |
|---|---|
| ESSID_1 | -30 |
| ESSID_2 | -50 |
| ESSID_3 | -70 |

FIG. 14

| ESSID | CHANNEL |
|---|---|
| ESSID_1 | 1 |
| ESSID_2 | 6 |
| ESSID_3 | 6 |

TERMINAL DEVICE AND INFORMATION PROCESSING DEVICE

TECHNICAL FIELD

The present disclosure relates to a terminal device and an information processing device.

BACKGROUND ART

In recent years, apparatuses with a communication function using a wireless local area network (WLAN) have become widespread. As examples of the apparatuses, beginning with smartphones that also have a mobile communication function in mobile communication services, various kinds of apparatuses such as personal computers (PCs), tablet terminals, portable game devices, digital cameras, and printers are exemplified.

In general, an apparatus with a WLAN communication function is connected to a WLAN to perform transmission and reception of data by way of the WLAN. In other words, the apparatus performs transmission and reception of data by way of an access point of the WLAN. In addition, as an example of communication not by way of a WLAN (or an access point), the apparatus is, for example, connected to a mobile communication terminal and performs transmission and reception of data by way of the mobile communication terminal and a mobile communication network. That is, the apparatus performs transmission and reception of data through tethering. With regard to tethering, various technologies have been proposed.

For example, Patent Literature 1 discloses a technology for enabling a device that is a relay destination to continue communication even when an amount of electric charge of a device that performs relaying using tethering decreases.

CITATION LIST

Patent Literature

Patent Literature 1: JP 2013-197756A

SUMMARY OF INVENTION

Technical Problem

In general, communication by way of a WLAN (or an access point) like that described above can only be performed in a limited area (i.e., a communication area of a WLAN). On the other hand, in communication using tethering like that described above, a communication speed can be low due to a communication situation of a mobile communication terminal or a communication speed of the mobile communication. In addition, radio resources consumed on a mobile communication network and power consumption of a mobile communication terminal can increase. Thus, when communication by way of a WLAN (or an access point) becomes possible while communication is being performed through tethering, it is desirable for an apparatus to promptly switch communication from communication using tethering to communication by way of a WLAN.

Except for a case in which connection information is obtained beforehand, however, the apparatus is not capable of specifying a WLAN to which the apparatus can connect (i.e., a WLAN that authorizes connection of the apparatus) from WLANs (or access points) provided from various service providers. Thus, in order to switch communication from communication using tethering to communication by way of a WLAN, for example, a user of the apparatus selects a WLAN to which the apparatus can connect every time. For this reason, prompt switching of communication can be hard. Alternatively, in order to switch communication from communication using tethering to communication by way of a WLAN (or an access point), for example, the apparatus attempts to connect to various WLANs. Thus, failure repeats in a connection procedure. Therefore, time taken for connection to a WLAN is considered to become long and prompt switching of communication can be hard.

In addition, even if a WLAN to which the apparatus is connectable (i.e., a WLAN to which connection of the apparatus is permitted) is specified, when there are two WLANs to which the apparatus is connectable, it is not guaranteed that the apparatus will be connected to the more desirable WLAN.

Thus, it is desirable to provide a mechanism in which communication can be promptly switched to communication that is performed via a more desirable wireless network.

Solution to Problem

According to the present disclosure, there is provided a terminal device including: a mobile communication unit configured to perform mobile communication of a mobile communication network; an acquisition unit configured to acquire state information indicating a state of each of one or more wireless networks for wireless communication that is different from the mobile communication; a selection unit configured to select one wireless network among the one or more wireless networks based on the state information; and a providing unit configured to provide information regarding the one selected wireless network to another terminal device that performs the wireless communication. Each of the one or more wireless networks is a wireless network for the wireless communication to which the other terminal device is connectable through an authentication procedure. Information regarding the one or more wireless networks is included in information provided to the terminal device by an information providing device that provides information regarding a wireless network that is different from the mobile communication network to a device that performs the mobile communication.

According to the present disclosure, there is provided an information processing device for a terminal device which performs mobile communication of a mobile communication network, the information processing device including: a memory that stores a program; and one or more processors that are capable of executing the program. The program is a program for execution of acquiring state information indicating a state of each of one or more wireless networks for wireless communication that is different from the mobile communication, selecting one wireless network among the one or more wireless networks based on the state information, and providing information regarding the one selected wireless network to another terminal device that performs the wireless communication. Each of the one or more wireless networks is a wireless network for the wireless communication to which the other terminal device is connectable through an authentication procedure. Information regarding the one or more wireless networks is included in information provided to the terminal device by an information providing device that provides information regarding a wireless network that is different from the mobile communication network to a device that performs the mobile communication.

According to the present disclosure, there is provided a terminal device including: a wireless communication unit configured to perform wireless communication that is different from mobile communication of a mobile communication network; an acquisition unit configured to acquire state information indicating a state of each of one or more wireless networks for the wireless communication; and a selection unit configured to select one wireless network among the one or more wireless networks based on the state information. Each of the one or more wireless networks is a wireless network for the wireless communication to which the terminal device is connectable through an authentication procedure. Information regarding the one or more wireless networks is at least partial information of information to be provided to another terminal device that performs the mobile communication by an information providing device that provides information regarding a wireless network that is different from the mobile communication network to a device that performs the mobile communication, and is included in the information to be provided to the terminal device by the other terminal device. The terminal device further includes a connection control unit configured to causes the terminal device to be connected to the one selected wireless network through the authentication procedure.

According to the present disclosure, there is provided an information processing device for a terminal device that performs wireless communication that is different from mobile communication of a mobile communication network, the information processing device including: a memory that stores a program; and one or more processors that are capable of executing the program. The program is a program for causing execution of acquiring state information indicating a state of each of one or more wireless networks for the wireless communication, and selecting one wireless network among the one or more wireless networks based on the state information. Each of the one or more wireless networks is a wireless network for the wireless communication to which the terminal device is connectable through an authentication procedure. Information regarding the one or more wireless networks is at least partial information of information to be provided to another terminal device that performs the mobile communication by an information providing device that provides information regarding a wireless network that is different from the mobile communication network to a device that performs the mobile communication, and included in the information to be provided to the terminal device by the other terminal device. The program is a program for further causing execution of connecting the terminal device to the one selected wireless network through the authentication procedure.

Advantageous Effects of Invention

According to the present disclosure described above, it is possible to promptly switch communication to communication that is performed via a more desirable wireless network. Note that the effect is not necessarily limitative, and along with the effect or instead of the effect, any effect disclosed in the present specification or other effects that can be understood from the present specification may be exhibited.

BRIEF DESCRIPTION OF DRAWINGS

FIG. 5 is an explanatory diagram for describing an example of information provided to a network information providing device.

FIG. 6 is an explanatory diagram for describing an example of first network information.

FIG. 7 is an explanatory diagram for describing an example of use situation information.

FIG. 8 is an explanatory diagram for describing an example of disposition situation information.

FIG. 12A is a sequence diagram showing an example of (the first half of) a schematic flow of a connection process according to the first embodiment.

FIG. 13 is an explanatory diagram for describing an example of communication quality information.

FIG. 14 is an explanatory diagram for describing an example of information indicating channels used on wireless networks.

DESCRIPTION OF EMBODIMENT(S)

Figure 1:
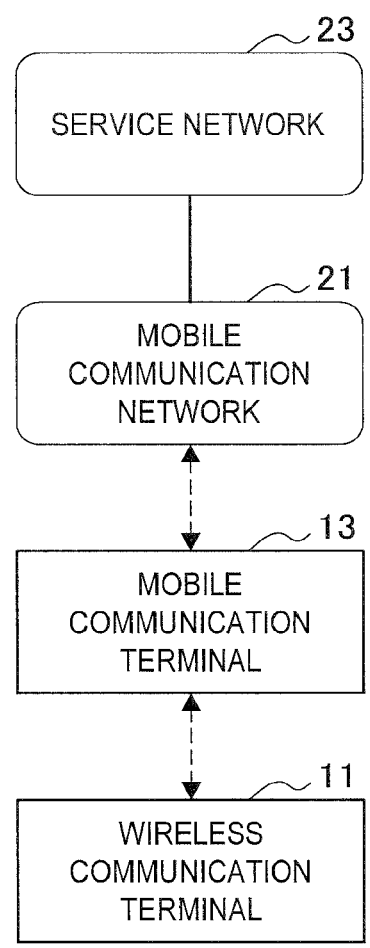
FIG. 1 is an explanatory diagram for describing an example of communication using tethering.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Introduction
2. Schematic configuration of a communication system
3. First Embodiment
   3.1. Configuration of a mobile communication terminal
   3.2. Process flow
   3.3. Modified example
4. Second Embodiment
   4.1. Configuration of a wireless communication terminal
   4.2. Process flow
   4.3. Modified example
5. Application examples
   5.1. Application examples regarding a mobile communication terminal
   5.2. Application example regarding a wireless communication terminal
6. Application example

1. Introduction

First, communication using tethering and communication by way of a WLAN will be described with reference to FIGS. 1 and 2.

Communication Using Tethering

A wireless communication terminal that performs WLAN communication performs, for example, communication using tethering. In other words, the wireless communication terminal is connected to a mobile communication terminal to perform communication by way of the mobile communication terminal and a mobile communication network. A specific example of this subject will be described below with reference to FIG. 1.

FIG. 1 is an explanatory diagram for describing an example of communication using tethering. Referring to FIG. 1, a wireless communication terminal 11, a mobile communication terminal 13, a mobile communication network 21, and a service network 23 are shown. The wireless communication terminal 11 is, for example, a device that performs WLAN communication, and is a tablet terminal as an example. The mobile communication terminal 13 is a device that performs mobile communication on the mobile communication network 21, and is a smartphone as an example. The mobile communication network 21 is a network that conforms with a communication standard, for example, Long Term Evolution (LTE), LTE-Advanced, or the like. The service network 23 is a public network, for example, the Internet. The mobile communication terminal 13, for example, is connected to the mobile communication network 21 to perform transmission and reception of data by way of the mobile communication network 21. In addition, the mobile communication network 21 is connected to the service network 23, and thus the mobile communication terminal 13 can perform transmission and reception of data by way of the mobile communication network 21 and the service network 23. Furthermore, the wireless communication terminal 11 is connected to the mobile communication terminal 13, and performs transmission and reception of data by way of the mobile communication terminal 13 and the mobile communication network 21 (and the service network 23). In other words, the mobile communication terminal 13 has a function of performing relaying between the wireless communication terminal 11 and the mobile communication network 21. In this manner, the wireless communication terminal 11 performs communication using tethering, and the mobile communication terminal 13 has the tethering function.

A communication speed in the communication using tethering described above can be low due to a communication situation of the mobile communication terminal or a communication speed of the mobile communication thereof. In addition, radio resources consumed on the mobile communication network and power consumption of the mobile communication terminal can increase.

Communication by Way of a WLAN

A wireless communication terminal that performs WLAN communication, for example, is connected to a WLAN. In other words, the wireless communication terminal described above is connected to an access point of the WLAN. Thus, the wireless communication terminal performs transmission and reception of data by way of the WLAN (or the access point). A specific example of this subject will be described below with reference to FIG. 2.

Figure 2:
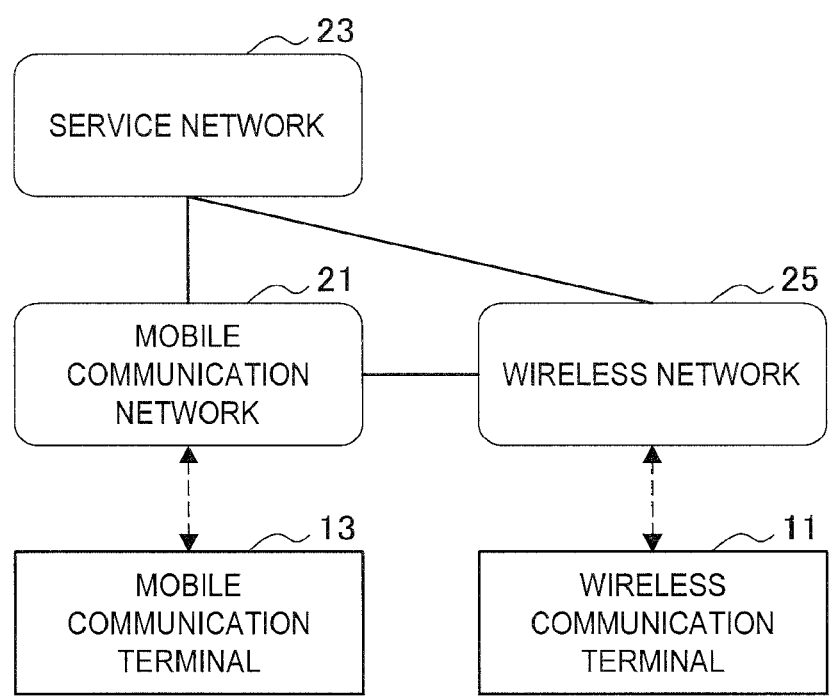
FIG. 2 is an explanatory diagram for describing an example of communication by way of a WLAN.

FIG. 2 is an explanatory diagram for describing an example of communication by way of a WLAN. Referring to FIG. 2, the wireless communication terminal 11, the mobile communication terminal 13, the mobile communication network 21, the service network 23, and a wireless network 25 are shown. The wireless network 25 is, for example, a WLAN. The wireless communication terminal 11 is connected to the wireless network 25 to perform transmission and reception of data by way of the wireless network 25. In addition, for example, the wireless network 25 is connected to the mobile communication network 21, and thus the wireless communication terminal 11 can perform transmission and reception of data by way of the wireless network 25 and the mobile communication network 21 (and the service network 23). Alternatively, the wireless network 25 is connected to the service network 23, and thus the wireless communication terminal 11 may perform transmission and reception of data by way of the wireless network 25 and the service network 23.

It is generally possible to perform communication by way of a WLAN only in a limited area (in other words, a communication area of a WLAN) as described above.

2. Schematic Configuration of a Communication System

Figure 3:
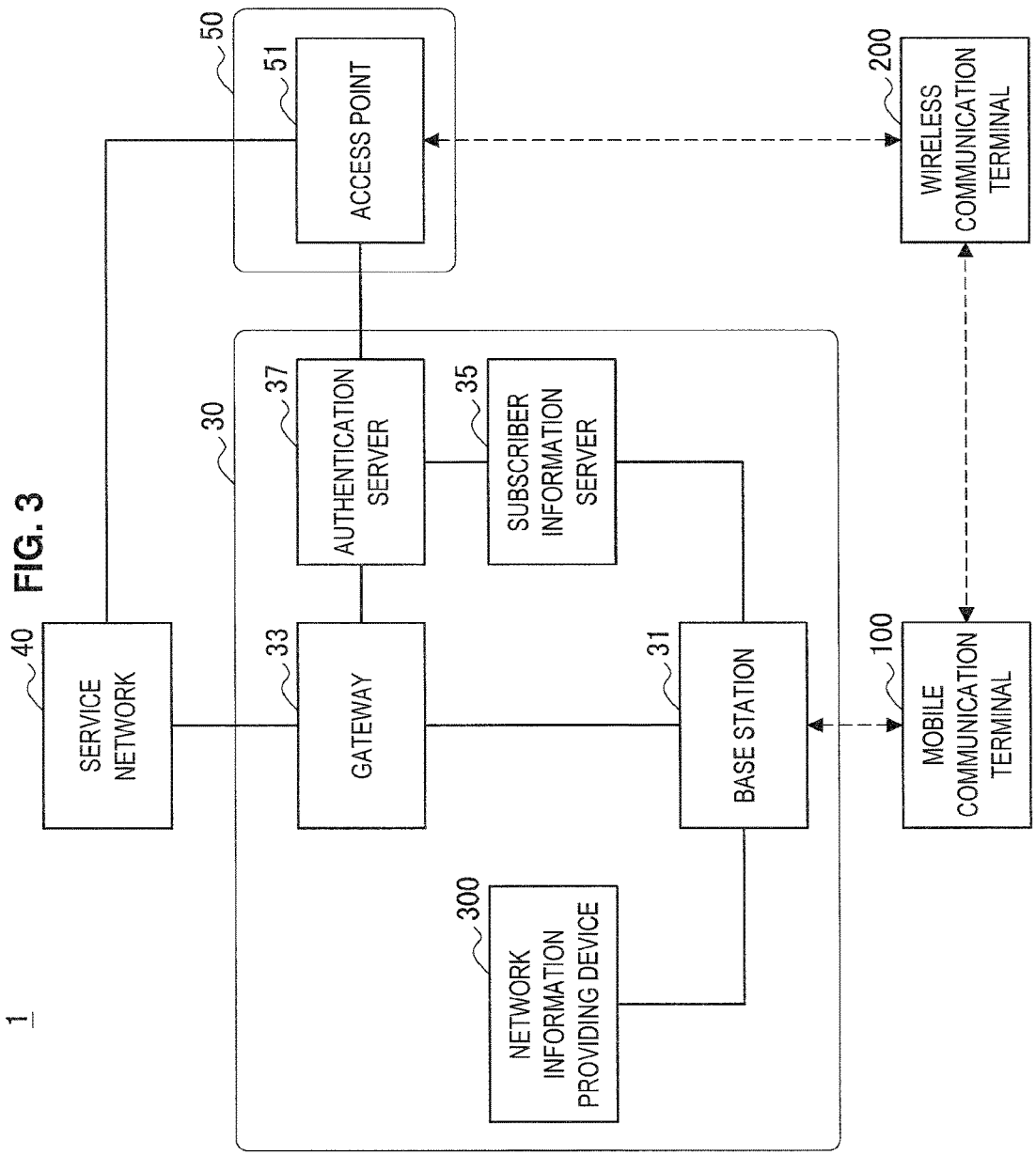
FIG. 3 is an explanatory diagram showing an example of a schematic configuration of a communication system according to an embodiment of the present disclosure.

Next, a schematic configuration of a communication system 1 according to an embodiment of the present disclosure will be described with reference to FIG. 3. FIG. 3 is an explanatory diagram showing an example of a schematic configuration of the communication system 1 according to the embodiment of the present disclosure. Referring to FIG. 3, the communication system 1 includes a mobile communication network 30, a service network 40, a wireless network 50, a mobile communication terminal 100 and a wireless communication terminal 200.

(Mobile Communication Network 30)

The mobile communication network 30 is a network for mobile communication. The mobile communication network 30 is, for example, a network that conforms with any communication standard of Third Generation Partnership Project (3GPP). As an example, the mobile communication network 30 is a network that conforms with Long Term Evolution (LTE) or LTE-Advanced. The mobile communication network 30 is operated by, for example, a mobile communication service provider. Note that the mobile communication network 30 can also be called a cellular network. In addition, mobile communication can also be called cellular-type communication.

The mobile communication network 30 includes a radio access network (RAN) and a core network. In addition, the mobile communication network 30 includes a base station 31 on the radio access network, and includes a gateway 33, a subscriber information server 35, an authentication server 37, and a network information providing device 300 on the core network.

Base Station 31

The base station 31 performs communication with a terminal device that performs mobile communication. For example, the base station 31 forms a cell that is a communication area of the mobile communication network 30 and communicates with a terminal device positioned within the cell. As an example, the base station 31 is an evolved Node B (eNB).

Gateway 33

The gateway 33 performs relaying between the mobile communication network 30 and another network. As an example, the gateway 33 is a packet data network gateway (P-GW). In addition, the other network is, for example, the service network 40.

Subscriber Information Server 35

The subscriber information server 35 retains subscriber information of the mobile communication network 30. For example, the subscriber information server 35 also retains information used in authentication for connection. The subscriber information server 35 is, for example, a home subscriber server (HSS).

Authentication Server 37

The authentication server 37 has an authentication function of authenticating subscribers of the mobile communication network 30 at the time of connection. The authentication server 37 is, for example, an authentication, authorization, and accounting (AAA) server.

Network Information Providing Device 300

The network information providing device 300 provides information regarding a different wireless network from the mobile communication network 30 to a device that performs mobile communication. The wireless network includes, for example, a WLAN. More specifically, the network information providing device 300 is, for example, a device that has an access network discovery and selection function (ANDSF).

When, a device that performs mobile communication (for example, the mobile communication terminal 100) requests provision of information from the network information providing device 300, for example, the network information providing device 300 provides information regarding a wireless network to the device that performs the mobile communication.

Specifically, for example, when making a request to the network information providing device 300, the device that performs the mobile communication (for example, the mobile communication terminal 100) provides information for specifying a wireless network to the network information providing device 300. Then, the network information providing device 300 searches all wireless networks that are search objects for a wireless network that corresponds to the information for specifying the wireless network. As a result, for example, the search result includes at least one wireless network. Then, the network information providing device 300 provides information regarding the at least one wireless network to the device that performs the mobile communication.

(Service Network 40)

The service network 40 is a public network such as the Internet.

(Wireless Network 50)

The wireless network 50 is a network for wireless communication that is different from mobile communication. The wireless network 50 is, for example, a WLAN.

Access Point 51

An access point 51 communicates with a terminal device that performs the wireless communication described above that is different from mobile communication. For example, the access point 51 communicates with a terminal device positioned within the communication area of the access point 51.

(Mobile Communication Terminal 100)

The mobile communication terminal 100 performs mobile communication on the mobile communication network 30. In other words, the mobile communication terminal 100 performs mobile communication in a service area of the mobile communication network 30. Specifically, the mobile communication terminal 100 communicates with, for example, the base station 31 when it is positioned within the cell of the base station 31.

In addition, the mobile communication terminal 100 also performs wireless communication that is different from mobile communication. For example, the mobile communication terminal 100 performs WLAN communication as first wireless communication that is different from the mobile communication. In addition, the mobile communication terminal 100 performs, for example, short-range wireless communication as second wireless communication that is different from mobile communication. The short-range wireless communication includes Bluetooth (registered trademark) communication as an example.

Furthermore, the mobile communication terminal 100 has a tethering function. That is, the mobile communication terminal 100 has the function of performing relaying between the mobile communication network 30 and another terminal device.

(Wireless Communication Terminal 200)

The wireless communication terminal 200 performs wireless communication that is different from the mobile communication. For example, the wireless communication terminal 200 performs WLAN communication as first wireless communication. In addition, the wireless communication terminal 200 performs, for example, short-range wireless communication as second wireless communication that is different from the mobile communication. The short-range wireless communication includes Bluetooth communication as an example.

Furthermore, the wireless communication terminal 200 performs communication using tethering. In other words, the wireless communication terminal 200 performs communication by way of relaying performed by a terminal device (for example, the mobile communication terminal 100) that performs mobile communication. More specifically, for example, the wireless communication terminal 200 is connected to the mobile communication terminal 100 to perform transmission and reception of data by way of the mobile communication terminal 100 and the mobile communication network 30 (and the service network 40).

Note that the wireless communication terminal 200 does not have a communication function for mobile communication on the mobile communication network 30.

3. First Embodiment

Next, a first embodiment of the present disclosure will be described with reference to FIGS. 4 to 16.

According to the first embodiment, the mobile communication terminal 100-1 selects one wireless network among one or more wireless networks to which the wireless communication terminal 200-1 is connectable through an authentication procedure. Then, the mobile communication terminal 100-1 provides information regarding the one selected wireless network to the wireless communication terminal 200-1. As a result, the wireless communication terminal 200-1 can be connected to the one selected wireless network.

3.1 Configuration of a Mobile Communication Terminal

Figure 4:
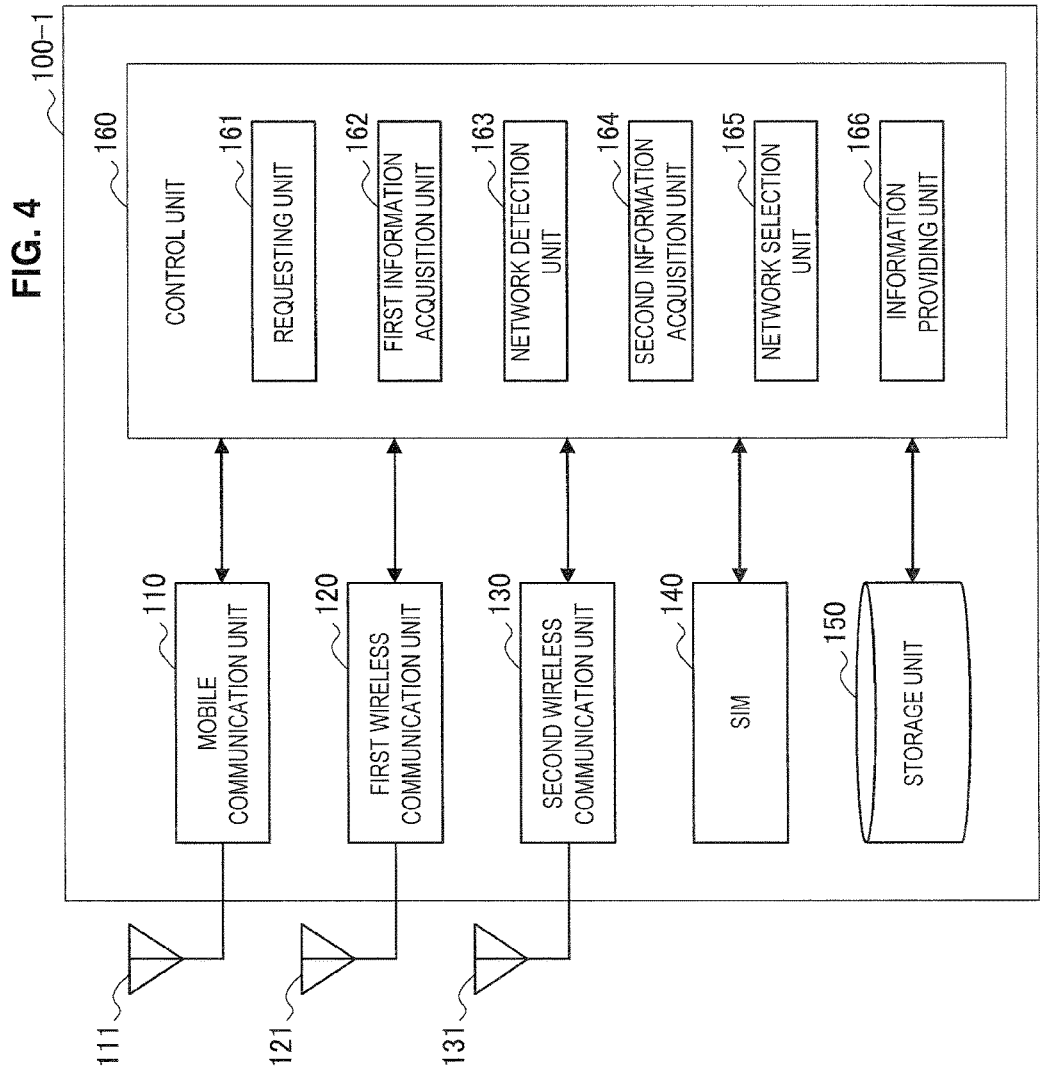
FIG. 4 is a block diagram showing an example of a configuration of a mobile communication terminal according to a first embodiment.

First, an example of a configuration of a mobile communication terminal 100-1 according to the first embodiment of the present disclosure will be described with reference to FIGS. 4 to 8. FIG. 4 is a block diagram showing the example of the configuration of the mobile communication terminal 100-1 according to the first embodiment. Referring to FIG. 4, the mobile communication terminal 100-1 is provided with a mobile communication unit 110, an antenna unit 111, a first wireless communication unit 120, an antenna unit 121, a second wireless communication unit 130, an antenna unit 131, a subscriber identification module (SIM) 140, a storage unit 150, and a control unit 160.

(Mobile Communication Unit 110)

The mobile communication unit 110 performs mobile communication on the mobile communication network 30. For example, the mobile communication is communication that conforms with any communication standard of the 3GPP (for example, LTE, LTE-Advanced, or the like). The mobile communication unit 110, for example, receives a downlink signal from the base station 31 and transmits an uplink signal to the base station 31.

(Antenna Unit 111)

The antenna unit 111 radiates, as radio waves, signals output from the mobile communication unit 110 to a space. In addition, the antenna unit 111 converts radio waves of the space into signals, and outputs the signals to the mobile communication unit 110.

(First Wireless Communication Unit 120)

The first wireless communication unit 120 performs wireless communication that is different from mobile communication. The wireless communication is, for example, WLAN communication. Specifically, for example, the WLAN communication is communication that conforms with any of WLAN standards such as IEEE 802.11a, 11b, 11g, 11n, 11ac and 11ad.

For example, the first wireless communication unit 120 receives signals from the access point 51 and transmits signals to the access point 51. In addition, for example, in cases of direct communication, the first wireless communication unit 120 receives signals from another terminal device and transmits signals to the other terminal device. The other terminal device is, for example, the wireless communication terminal 200-1.

(Antenna Unit 121)

The antenna unit 121 radiates, as radio waves, signals output from the first wireless communication unit 120 to the space. In addition, the antenna unit 121 converts radio waves of the space into signals and outputs the signals to the first wireless communication unit 120.

(Second Wireless Communication Unit 130)

The second wireless communication unit 130 performs wireless communication that is different from mobile communication. The wireless communication is, for example, short-range wireless communication, and includes Bluetooth communication (i.e., communication that conforms with the Bluetooth standard) as an example. The second wireless communication unit 130, for example, receives signals from another terminal device and transmits signals to the other terminal device. The other terminal device is, for example, the wireless communication terminal 200-1.

(Antenna Unit 131)

The antenna unit 131 radiates, as radio waves, signals output from the second wireless communication unit 130 to the space. In addition, the antenna unit 131 converts radio waves of the space into signals and outputs the signals to the second wireless communication unit 130.

(SIM 140)

The SIM 140 provides authentication information used in authentication to be connected to a network. In addition, the SIM 140 executes an authentication process for the authentication to be connected to the network. For example, the authentication to be connected to a network includes, for example, authentication of a subscriber and authentication of a network.

As an example, the authentication is authentication based on Extensible Authentication Protocol Method for $3^{rd}$ Generation Authentication and Key Agreement (EAP-AKA).

In this case, for example, the authentication process includes verification of an AUTN as a process for authenticating a network. In addition, the authentication process includes verification of a message authentication code (MAC). In addition, the authentication process includes generation of a response to a challenge as a process for authenticating a subscriber. In addition, the authentication process includes generation of a MAC and a session key.

In addition, for example, the authentication information includes an International Mobile Subscriber Identity (IMSI). In addition, the authentication information includes the generated response. In addition, the authentication information includes the generated MAC and session key.

Note that the authentication may be authentication other than authentication based on EAP-AKA. As an example, the authentication may be authentication based on EAP-AKA'. As another example, the authentication may be authentication based on Extensible Authentication Protocol Method for Global System for Mobile Communications (GSM) Subscriber Identity Modules (EAP-SIM) (GSM is a registered trademark).

(Storage Unit 150)

The storage unit 150 temporarily or permanently stores programs and data for operations of the mobile communication terminal 100-1.

(Control Unit 160)

The control unit 160 provides various functions of the mobile communication terminal 100-1. The control unit 160 includes a requesting unit 161, a first information acquisition unit 162, a network detection unit 163, a second information acquisition unit 164, a network selection unit 165, and an information providing unit 166.

(Requesting Unit 161)

The requesting unit 161 requests provision of information from a network information providing device 300-1.

For example, the requesting unit 161 requests provision of information regarding a wireless network for wireless communication that is different from mobile communication from the network information providing device 300-1. More specifically, for example, the requesting unit 161 transmits a network information requesting message to the network information providing device 300-1 via the mobile communication unit 110.

Information Provided when Requested

The requesting unit 161 provides, for example, information for specifying a wireless network to the information providing device 300-1 upon the request for provision. Specifically, the requesting unit 161, for example, transmits a network information requesting message including the above information to the network information providing device 300-1 via the mobile communication unit 110.

Network Type Information

The requesting unit 161 provides, for example, information indicating the type of the wireless network for wireless communication that is different from mobile communication (hereinafter, referred to as "network type information") to the network information providing device 300-1 upon the request for provision.

As an example, the wireless network for the wireless communication is a WLAN, and the network type information indicates the WLAN.

Accordingly, for example, it is possible to provide information regarding a wireless network of a desired type to the network information providing device 300-1. Thus, it is possible to acquire information regarding a connectable wireless network in terms of, for example, a communication scheme.

Position-Related Information

The requesting unit 161 provides, for example, information regarding a position of the mobile communication terminal 100-1 or a wireless communication terminal 200-1 (hereinafter referred to as "position-related information") to the network information providing device 300-1 upon the request for provision.

As an example, the position-related information is position information indicating a position of the mobile communication terminal 100-1 or the wireless communication terminal 200-1. The position information is, for example, information acquired from the Global Positioning System (GPS). Note that the position-related information is not limited to the position information, and may be other information. As an example, the position-related information may be identification information of a cell to which the mobile communication terminal 100-1 belongs on the mobile communication network 30.

Accordingly, for example, it is possible to provide information regarding a connectable wireless network in terms of position to the network information providing device 300-1. Thus, for example, it is possible to acquire the information regarding the connectable wireless network in terms of position.

Example of Specific Information

FIG. 5 is an explanatory diagram for describing an example of information to be provided to the network information providing device 300-1. Referring to FIG. 5, the information to be provided to the network information providing device 300-1 is shown. For example, network type information (WLAN) indicating a network type and position information indicating a position of the mobile communication terminal 100-1 or the wireless communication terminal 200 (LAT_A and LON_A) are provided. In addition, information indicating a current time (MONDAY: 1:30 PM) is further provided.

Trigger for a Request

The requesting unit 161 requests, for example, provision of information from the network information providing device 300-1 according to occurrence of any of one or more predetermined events.

As a first example, one of the one or more predetermined events described above is stop of movement of the mobile communication terminal 100-1 or the wireless communication terminal 200-1, or elapse of a predetermined period of time after the movement stops.

As a second example, one of the one or more predetermined events described above is start of tethering (in other words, communication of the mobile communication terminal 100-1 through relay of mobile communication).

As a third example, one of the one or more predetermined events described above is positioning of the mobile communication terminal 100-1 or the wireless communication terminal 200-1 at a position at which switch from communication using tethering (for example, switch from communication using tethering to communication via a WLAN) was performed in the past.

As a fourth example, one of the one or more predetermined events described above is arrival of a predetermined cycle.

Due to such triggers, requests are made with respect to the network information providing device 300-1 when switch from tethering is desirable.

(First Information Acquisition Unit 162)

Acquisition of First Network Information

The first information acquisition unit 162 acquires information provided to the mobile communication terminal 100-1 from the network information providing device 300-1 (hereinafter referred to as "first network information"). The first network information is information regarding a wireless network that is different from the mobile communication network 30.

Technique of Acquiring First Network Information

As described above, for example, the requesting unit 161 requests provision of information from the network information providing device 300-1. Then, the network information providing device 300-1 provides the first network information to the mobile communication terminal 100-1. Then, the first information acquisition unit 162 acquires the first network information. The first information acquisition unit 162 thereafter causes the first network information to be stored in the storage unit 150.

At Least One Wireless Network

As described above, the first network information is information regarding a wireless network that is different from the mobile communication network 30. More specifically, the first network information is, for example, information regarding at least one wireless network for wireless communication that is different from the mobile communication.

More specifically, when making a request to the network information providing device 300-1, for example, the requesting unit 161 provides information for specifying a wireless network to the network information providing device 300-1. Then, the network information providing device 300-1 provides information regarding at least one wireless network that corresponds to the information for specifying the wireless network to the device that performs the mobile communication. In other words, the first network information is information regarding at least one wireless network that corresponds to the information for specifying the wireless network.

Network that is Connectable Through an Authentication Procedure

Each of the at least one wireless network is the wireless network for the wireless communication to which the mobile communication terminal 100-1 or the wireless communication terminal 200-1 is connectable through an authentication procedure.

For example, the authentication procedure includes an authentication procedure in which authentication information provided from the SIM 140 is used (hereinafter referred to as a "SEW authentication procedure"). In other words, the first network information includes information regarding the wireless network for the wireless communication that is connectable through the SIM authentication procedure.

As an example, each of the at least one wireless network is a wireless network operated by an operator of the mobile communication network 30. In other words, the first network information is information regarding at least one wireless network for the wireless communication operated by the operator of the mobile communication network 30. The operator includes, for example, a mobile communication service provider (mobile network operator or MNO) that possesses the communication network 30, and/or a virtual mobile communication service provider (mobile virtual network operator or MVNO).

Instead of the SIM authentication procedure, or in addition to the SIM authentication procedure, the authentication procedure may include an authentication procedure in which an electronic certificate is used. In other words, the first network information may include information regarding a wireless network for wireless communication to which the mobile communication terminal 100-1 or the wireless communication terminal 200-1 is connectable through the authentication procedure using an electronic certificate. The electronic certificate may be an electronic certificate, for example, issued by the operator of the mobile communication network 30.

Note that, for example, capabilities of the mobile communication terminal 100-1 and the wireless communication terminal 200-1 with respect to authentication are the same. In this case, each of the at least one wireless network is the wireless network for the wireless communication to which the mobile communication terminal 100-1 and the wireless communication terminal 200-1 are connectable through the authentication procedure.

Network that Corresponds to a Position

Each of the at least one wireless network is, for example, a wireless network that has a communication area that corresponds to a position of the mobile communication terminal 100-1 or the wireless communication terminal 200-1. In other words, the first network information is information regarding at least one wireless network that has a communication area that corresponds to a position of the mobile communication terminal 100-1 or the wireless communication terminal 200-1.

Specifically, for example, each of the at least one wireless network is a wireless network that has a communication area that includes a position of the mobile communication terminal 100-1 or the wireless communication terminal 200-1.

Accordingly, information regarding a wireless network that is connectable in terms of position is obtained. Thus, it is possible to avoid attempts to detect a wireless network that is not allowed to connect in terms of position.

Network that Corresponds to Time

Each of the at least one wireless network is, for example, a wireless network that has an available time in terms of time. In other words, the first network information is information regarding at least one wireless network having an available time in terms of time.

Specifically, for example, each of the at least one wireless network is a wireless network that has an available time including a current time (i.e., a wireless network that is currently connectable in terms of time).

Accordingly, the information regarding a wireless network that is connectable in terms of time is obtained. Thus, it is possible to avoid attempts to detect a wireless network that is not allowed to connect in terms of time.

WLAN

Each of the at least one wireless network is, for example, a WLAN, and the wireless communication that is different from the mobile communication is, for example, WLAN communication. In other words, the first network information is information regarding at least one WLAN.

Information Items Included in First Network Information

Access Point Identification Information

The first network information includes, for example, identification information for identifying each access point of the at least one wireless network.

As described above, for example, each of the at least one wireless network is a WLAN. In this case, the identification information includes, for example, a service set identifier (SSID). More specifically, the identification information includes, for example, a homogenous extended service set identifier (HESSID), an extended service set identifier (ESSID), and/or a basic service set identifier (BSSID).

With such identification information, for example, a wireless network that is connectable can be specified.

Channel Information

The first network information includes information indicating a channel for each of the at least one wireless network.

For example, a plurality of channels are prepared for the wireless network for the wireless communication (for example, a WLAN). Then, on each of the at least one wireless network (for example, one or more WLANs), one or more channels of the plurality of channels are used. In addition, the first network information includes information indicating the one or more channels used on the at least one wireless network as information indicating the channels for each of the at least one wireless network.

With the information, for example, it is possible to detect a wireless network more quickly. More specifically, for example, when a channel of a wireless network is unclear, individual channels among all channels are sequentially scanned to detect a wireless network. Thus, an enormous amount of time can be necessary for detecting a wireless network. On the other hand, when there is channel information, for example, a wireless network is detected by scanning a channel indicated by channel information. Therefore, a wireless network can be quickly detected.

As a specific example, for example, 13 channels are prepared in the 2.4 GHz band for a WLAN. Then, for example, if it takes 10 ms for a channel transition and 100 ms to scan each channel, it takes 1420 ms (10 ms*12+100 ms*13) to scan all the channels. In other words, when a channel for a wireless network is unclear, a maximum of 1420 ms is necessary for detecting a wireless network. On the other hand, when there is channel information, for example, it is sufficient to scan one channel indicated by the channel information. Thus, for example, it takes 110 ms (10 ms*1+100 ms*1) to detect a wireless network. 10 ms out of 110 ms is time necessary for a transition to the one channel indicated by the channel information from a channel being used in communication using tethering. When the channel being used in the communication using tethering coincides with the one channel indicated by the channel information, 100 ms is necessary for detecting a wireless network. In this manner, time taken to detect a wireless network is shortened, and thus a wireless network can be detected more quickly.

Note that, for the wireless network for the wireless communication (for example, the WLAN), the plurality of channels may be channels of one band (for example, one of the 2.4 GHz and 5 GHz band) or may be channels of two or more bands (for example, the 2.4 GHz and 5 GHz band).

Example of Specific Information

FIG. 6 is an explanatory diagram for describing an example of the first network information. Referring to FIG. 6, the first network information is shown. In this example, the first network information is three wireless networks (three WLANs). The first network information includes, for example, identification information of access points of the wireless network (HESSID, ESSID, and BSSID) as network property information. In addition, the first network information includes information indicating channels for the wireless network as the network property information. In addition, in this example, the first network information includes the ID of the wireless network and network type information indicating the network type of the wireless network. Furthermore, the first network information includes communication area information indicating a communication area of the wireless network, and available time information indicating an available time of the wireless network.

Note that, for example, when the information for specifying the wireless network shown in FIG. 5 is provided by the mobile communication terminal 100-1 to the network information providing device 300-1, the first network information shown in FIG. 6 is provided. More specifically, as shown in FIG. 5, network type information (WLAN), position information (LAT_A and LON_A), and time information (MONDAY: 1:30 PM) are provided as the information for specifying the wireless network. Then, the network information providing device 300-1 searches all wireless networks that are search objects for a wireless network that corresponds to the network type information, the position information, and the time information. In other words, the network information providing device 300-1 searches for a wireless network whose network type is WLAN having a communication area in which the position indicated by the latitude LAT_A and the longitude LON_A is included and an available time that includes 1:30 p.m. on Monday. As a result, the search result includes the three wireless networks shown in FIG. 6, and the network information providing device 300-1 provides the first network information shown in FIG. 6 to the mobile communication terminal 100-1. Then, the first information acquisition unit 162 acquires the first network information.

Acquisition of Use Situation Information

For example, the first information acquisition unit 162 acquires use situation information indicating a use situation of each of the at least one wireless network.

Technique of Acquiring Use Situation Information

For example, the use situation information is provided by the network information providing device 300-1. More specifically, for example, the network information providing device 300-1 requests provision of information indicating a use situation from each of the at least one wireless network, and thereby acquires the use situation information. Then, the network information providing device 300-1 provides the use situation information to the mobile communication terminal 100-1. Thereby, the first information acquisition unit 162 acquires the use situation information. The first information acquisition unit 162 thereafter causes the storage unit 150 to store the use situation information.

Information Items Included in Use Situation Information

Information Regarding the Number of Connected Terminals

As a first example, the use situation information includes information regarding the number of devices connected to each of the at least one wireless network.

As an example, the use situation information includes the number of devices that are actually connected to each of the at least one wireless network and the maximum device capacity of the at least one wireless network (i.e., the maximum number of connectable devices). As another example, the use situation information may include a ratio of the number of devices that are actually connected to each of the at least one wireless network to the maximum device capacity thereof. As still another example, the use situation information may include an evaluation result of the number of devices connected to each of the at least one wireless network (for example, any evaluation value).

Information Regarding Traffic

As a second example, the use situation information includes information regarding traffic on each of the at least one wireless network.

As an example, the use situation information includes actual traffic on each of the at least one wireless network and a maximum traffic capacity of each of the at least one wireless network (i.e., maximum tolerable traffic). As another example, the use situation information may include a ratio of actual traffic on each of the at least one wireless network to the maximum traffic capacity. As still another example, the use situation information may include an evaluation result of traffic on each of the at least one wireless network (for example, any evaluation value).

Example of Specific Information

FIG. 7 is an explanatory diagram for describing an example of the use situation information. Referring to FIG. 7, the use situation information is shown. The use situation information of this example is information indicating use situations of three respective wireless networks (three WLANs). In addition, the use situation information of this example includes maximum device capacities, the number of connected devices (i.e., NUMBER OF DEVICEs), maximum traffic capacities, and actual traffic (i.e., TRAFFIC) of the three respective wireless networks. Note that, when the first network information shown in FIG. 6 is provided, for example, the use situation information shown in FIG. 7 is provided.

Acquisition of Disposition Situation Information

The first information acquisition unit 162 acquires, for example, disposition situation information indicating a disposition situation of an access point of each of the at least one wireless network.

Technique for Acquiring the Disposition Situation Information

The disposition situation information is, for example, provided by the network information providing device 300-1 along with the use situation information. More specifically, for example, the network information providing device 300-1 requests provision of information indicating a use situation and a disposition situation from the at least one wireless network, and thereby acquires the use situation information and the disposition situation information. Then, the network information providing device 300-1 provides the use situation information and the disposition situation information to the mobile communication terminal 100-1. Thereby, the first information acquisition unit 162 acquires the disposition situation information along with the use situation information. The first information acquisition unit 162 thereafter causes the storage unit 150 to store the disposition situation information along with the use situation information.

Information Items Included in Disposition Situation Information

The disposition situation information includes, for example, floor information of the inside of a building in which an access point is disposed for each of the at least one wireless network. A specific example of the disposition situation information will be described with reference to FIG. 8.

Figure 8:
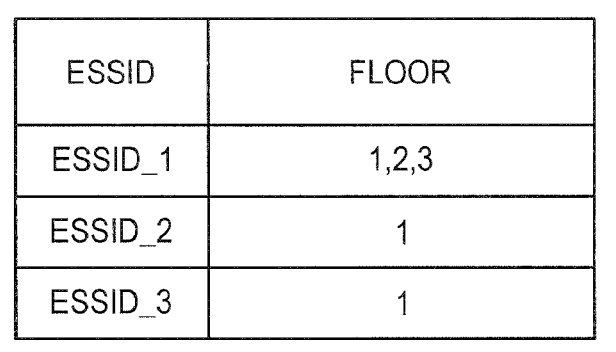

FIG. 8 is an explanatory diagram for describing an example of disposition situation information. Referring to FIG. 8, the disposition situation information is shown. The disposition situation information of this example is information indicating a disposition situation of access points of three respective wireless networks (three WLANs). In addition, the disposition situation information of this example includes information of floors of the inside of a building in which the access points of the three respective wireless networks (three WLANs) are disposed. For example, access points are disposed on $1^{st}$ $2^{nd}$ and $3^{rd}$ floors of the building for the WLAN with ESSID_1. Meanwhile, access points are disposed only on the $1^{st}$ floor of the building for the WLAN with ESSID_2 and the WLAN with ESSID_3. Note that, for example, when the first network information shown in FIG. 6 is to be provided, the disposition situation information shown in FIG. 8 is provided.

Note that the disposition situation information may include another type of information, instead of the floor information or in addition to the floor information. As an example, the disposition situation information may include the number of access points disposed for the at least one wireless network.

(Network Detection Unit 163)

The network detection unit 163 detects a wireless network for the wireless communication.

For example, the network detection unit 163 detects the wireless network (for example, the WLAN) by scanning a channel for the wireless network for the wireless communication (for example, the WLAN).

Detection Based on First Network Information

The network detection unit 163 detects, for example, the wireless network for the wireless communication based on the first network information.

Specifically, for example, the network detection unit 163 scans the at least one wireless network indicated by the first network information to detect one or more wireless networks from the at least one wireless network. As an example, when the first network information is information regarding the three wireless networks as shown in FIG. 6, the network detection unit 163 scans the three wireless networks. As a result, for example, the network detection unit 163 detects all three of the wireless networks.

In addition, for example, the first network information includes information indicating a channel for each of the at least one wireless network as described above. In this case, the network detection unit 163 performs the scanning based on the information indicating the channel. Accordingly, it is possible to quickly switch a wireless network.

(Second Information Acquisition Unit 164)

Acquisition of State Information

The second information acquisition unit 164 acquires state information indicating a state of each of one or more wireless networks for wireless network that is different from mobile communication of the mobile communication network 30.

For example, the state information includes use situation information indicating a use situation of each of the one or more wireless networks.

One or More Wireless Networks

Network that is Connectable Through an Authentication Procedure

Each of the one or more wireless networks is a wireless network for the wireless communication to which the wireless communication terminal 200-1 is connectable through an authentication procedure.

For example, the authentication procedure includes an authentication procedure in which authentication information provided by the SIM 140 is used (i.e., a SIM authentication procedure). In other words, the one or more wireless networks include a wireless network for the wireless communication to which the wireless communication terminal 200-1 is connectable through the SIM authentication procedure. Note that the authentication information is provided, for example, by the mobile communication terminal 100-1 to the wireless communication terminal 200-1 as will be described below.

As an example, each of the one or more wireless networks is a wireless network operated by an operator of the mobile communication network 30. The operator includes, for example, an MNO and/or an MVNO.

Note that the authentication procedure may include an authentication procedure in which an electronic certificate is used instead of the SIM authentication procedure or in addition to the SIM authentication procedure. In other words, the one or more wireless networks may include a wireless network for the wireless communication to which the wireless communication terminal 200-1 is connectable through the authentication procedure in which an electronic certificate is used. The electronic certificate may be, for example, an electronic certificate issued by the operator of the mobile communication network 30.

Network that Corresponds to a Position

Each of the one or more wireless networks is, for example, a wireless network that has a communication area that corresponds to a position of the mobile communication terminal 100-1 or the wireless communication terminal 200-1. Specifically, each of the one or more wireless networks is, for example, a wireless network that has a communication area in which a position of the mobile communication terminal 100-1 or the wireless communication terminal 200-1 is included.

Accordingly, information regarding a wireless network that is connectable in terms of position is obtained. Thus, it is possible to avoid attempts to detect a wireless network that is not allowed to connect in terms of position.

Network that Corresponds to Time

Each of the one or more wireless networks is, for example, a wireless network that has an available time in terms of time. Specifically, for example, each of the one or more wireless networks is one or more wireless networks (i.e., currently connectable wireless networks) that have an available time including a current time.

Accordingly, the information regarding a wireless network that is connectable in terms of time is obtained. Thus, it is possible to avoid attempts to detect a wireless network that is not allowed to connect in terms of time.

WLAN

Each of the one or more wireless networks is, for example, a WLAN, and the wireless communication that is different from the mobile communication is, for example, WLAN communication.

Information Items Included in Use Situation Information

Information of the Number of Connected Terminals

As a first example, the use situation information includes information regarding the number of devices connected to each of the one or more wireless networks.

As an example, the use situation information includes the number of devices that are actually connected to each of the one or more wireless networks and the maximum device capacity of the one or more wireless networks (i.e., the maximum number of connectable devices). As another example, the use situation information may include a ratio of devices that are actually connected to each of the one or more wireless networks to the maximum device capacity. As still another example, the use situation information may include an evaluation result of the number of devices connected to each of the one or more wireless networks (for example, any evaluation value).

With that information, it is possible to ascertain, for example, the number of terminals connected to each of the one or more wireless networks. Thus, it is possible to ascertain a congestion situation of each of the one or more wireless networks.

Information Regarding Traffic

As a second example, the use situation information includes information regarding traffic on each of the one or more wireless networks.

As an example, the use situation information includes actual traffic on each of the one or more wireless networks and a maximum traffic capacity of each of the one or more wireless networks (i.e., maximum tolerable traffic). As another example, the use situation information may include a ratio of actual traffic on each of the one or more wireless networks to the maximum traffic capacity. As still another example, the use situation information may include an evaluation result of traffic on each of the one or more wireless networks (for example, any evaluation value).

With that information, it is possible to ascertain, for example, the amount of traffic on each of the one or more wireless networks. Accordingly, it is possible to ascertain a congestion situation of each of the one or more wireless networks.

As described above, it is possible to ascertain a congestion situation of each of the one or more wireless networks with the use situation information. Thus, it is possible to presume a wireless network with better communication quality among the one or more wireless networks.

Technique of Acquiring Use Situation Information

The use situation information acquired by the second information acquisition unit 164 is included in the information provided to the mobile communication terminal 100-1 via the mobile communication network 30.

For example, the network information providing device 300-1 provides use situation information indicating a use situation of each of at least one wireless network indicated by the first network information to the mobile communication terminal 100-1 via the mobile communication network 30 as described above. Then, the first information acquisition unit 162 acquires the use situation information and causes the storage unit 150 to store the information. On the other hand, the second information acquisition unit 164 acquires at least partial information of the use situation information acquired by the first information acquisition unit 162 from the storage unit 150.

More specifically, for example, the second information acquisition unit 164 acquires use situation information indicating a use situation of each of one or more wireless networks detected by the network detection unit 163 from the at least one wireless network indicated by the first network information.

As a specific example of the information, the network detection unit 163 detects all three of the WLANs (i.e., the three WLANs indicated by the first network information) shown in FIG. 6 as described above. In this case, for example, the second information acquisition unit 164 acquires the use situation information (i.e., use situation information acquired by the first information acquisition unit 162) shown in FIG. 7. Of course, two or fewer WLANs among the three WLANS shown in FIG. 6 may be detected by the network detection unit 163. In this case, the second information acquisition unit 164 may acquire use situation information of the two or fewer WLANs from the use situation information shown in FIG. 7.

Note that the use situation information acquired by the second information acquisition unit 164 may only include some information items of the use situation information acquired by the first information acquisition unit 162. As an example, the use situation information acquired by the second information acquisition unit 164 may only include some information items (for example, max device capacity and the number of devices) of the information items shown in FIG. 7.

In addition, authentication capabilities can be different between the mobile communication terminal 100-1 and the wireless communication terminal 200-1. In addition, a wireless network to which the wireless communication terminal 200-1 is connectable through an authentication procedure can be any of some wireless networks of the at least one wireless network (for example, the three WLANs shown in FIG. 6) indicated by the first network information. In such a case, the second information acquisition unit 164 may acquire use situation information indicating a use situation of each of one or more wireless networks detected by the network detection unit 163 among the some wireless networks.

Others

Note that information regarding the one or more wireless networks is included in information provided by the network information providing device 300 to the mobile communication terminal 100-1.

More specifically, for example, the one or more wireless networks are included in the at least one wireless network indicated by the first network information, and information regarding the one or more wireless networks is included in the first network information. In other words, the information regarding the one or more wireless networks is included in the first network information provided by the network information providing device 300-1 to the mobile communication terminal 100-1.

Thus, the mobile communication terminal 100-1 can recognize the one or more wireless networks.

Acquisition of Disposition Situation Information

The second information acquisition unit 164 acquires, for example, disposition situation information indicating a disposition situation of an access point of each of the one or more wireless networks.

Information Items Included in Disposition Situation Information

Specifically, the disposition situation information includes, for example, floor information of the inside of a building in which an access point is disposed for each of the one or more wireless networks. Note that the disposition situation information may include another type of information instead of the floor information or in addition to the floor information. As an example, the disposition situation information may include the number of access points disposed for the one or more wireless networks.

With that disposition situation information, it is possible to presume, for example, a wireless network with better communication quality among the one or more wireless networks.

Technique of Acquiring Disposition Situation Information

The second information acquisition unit 164 acquires, for example, the disposition situation information in the same manner as the use situation information.

The second information acquisition unit 164 acquires, for example, at least partial information of the disposition situation information acquired by the first information acquisition unit 162 from the storage unit 150. More specifically, for example, the second information acquisition unit 164 acquires the disposition situation information indicating a disposition situation of an access point of each of the one or more wireless networks detected by the network detection unit 163.

As a specific example of the information, all three of the WLANs (i.e., the three WLANs indicated by the first network information) shown in FIG. 6 are detected by the network detection unit 163 as described above. In this case, for example, the second information acquisition unit 164 acquires the disposition situation information (i.e., disposition situation information acquired by the first information acquisition unit 162) shown in FIG. 8. Of course, two or fewer WLANs of the three WLANs shown in FIG. 6 may be detected by the network detection unit 163. In this case, the second information acquisition unit 164 may acquire disposition situation information of the two or fewer WLANs of the disposition situation information shown in FIG. 8.

Note that, as described above, authentication capabilities can be different between the mobile communication terminal 100-1 and the wireless communication terminal 200-1. In such a case, the second information acquisition unit 164 may acquire disposition situation information indicating a disposition situation of an access point of each of the one or more wireless networks detected by the network detection unit 163 among the some wireless networks.

(Network Selection Unit 165)

The network selection unit 165 selects one wireless network among the one or more wireless networks based on the situation information indicating a situation of each of the one or more wireless networks.

As described above, the situation information indicating a state of each of the one or more wireless networks includes, for example, use situation information indicating a use situation of each of the one or more wireless networks. In other words, the network selection unit 165 selects one wireless network among the one or more wireless networks based on a use situation of each of the one or more wireless networks. Accordingly, a wireless network with better communication quality can be selected.

Furthermore, the network selection unit 165 selects, for example, the one wireless network based further on the disposition situation information indicating a disposition situation of an access point of each of the one or more wireless networks. Accordingly, a wireless network with, for example, better communication quality can be selected with higher accuracy.

Specific Selection Technique

The network selection unit 165, for example, evaluates each of the one or more wireless networks based on the use situation information and the disposition situation information and selects the one wireless network having the highest evaluation result among the one or more wireless networks.

More specifically, for example, the network selection unit 165 calculates an evaluation value of each of the one or more wireless networks and selects the one wireless network with the highest evaluation value.

As a first example, if the number of devices connected to a wireless network is 50% or less of the maximum device capacity of the wireless network, 2 is added to the evaluation value of the wireless network. In addition, if the number of devices is equal to or greater than 50% and less than 80% of the maximum device capacity, 1 is added to the evaluation value. Further, if the number of devices is equal to or greater than 80% of the maximum device capacity, nothing is added to the evaluation value. As a specific example, referring to FIG. 7 again, for example, since the number of devices connected to the WLAN of ESSID_1 (20) is about 13% of the maximum device capacity of the WLAN (150), 2 is added to the evaluation value of the WLAN of ESSID_1. In addition, for example, since the number of devices connected to the WLAN of ESSID_2 (15) is 50% of the maximum device capacity of the WLAN (30), 1 is added to the evaluation value of the WLAN of ESSID_2. In addition, for example, since the number of devices connected to the WLAN of ESSID_3 (10) is 20% of the maximum device capacity of the WLAN (50), 2 is added to the evaluation value of the WLAN of ESSID_3.

As a second example, if traffic on the wireless network is less than 50% of the maximum traffic capacity, 2 is added to the evaluation value of the wireless network. In addition, if the traffic is equal to or greater than 50% and less than 80% of the maximum traffic capacity, 1 is added to the evaluation value. In addition, if the traffic is equal to or greater than 80% of the maximum traffic capacity, nothing is added to the evaluation value. As a specific example, referring to FIG. 7 again, for example, since the traffic on the WLAN of ESSID_1 (60 Mbps) is 40% of the maximum traffic capacity of the WLAN (150 Mbps), 2 is added to the evaluation value of the WLAN of ESSID_1. In addition, for example, since the traffic on the WLAN of ESSID_2 (40 Mbps) is about 74% of the maximum traffic capacity of the WLAN (54 Mbps), 1 is added to the evaluation value of the WLAN of ESSID_2. In addition, for example, since the traffic on the WLAN of ESSID_3 (35 Mbps) is about 64% of the maximum traffic capacity of the WLAN (54 Mbps), 1 is added to the evaluation value of the WLAN of ESSID_3.

As a third example, if access points are disposed on two or more floors for a wireless network, 2 is added to the evaluation value of the wireless network. On the other hand, if an access point is disposed only on one floor for a wireless network, nothing is added to the evaluation value. As a specific example, referring to FIG. 8 again, for example, since access points of the WLAN of ESSID_1 are disposed on three floors, 2 is added to the evaluation value of the WLAN of ESSID_1. In addition, for example, since an access point of the WLAN of ESSID_2 is disposed on one floor, nothing is added to the evaluation value of the WLAN of ESSID_2. In addition, for example, since an access point of the WLAN of ESSID_3 is disposed on one floor, nothing is added to the evaluation value of the WLAN of ESSID_3.

The evaluation values are calculated, for example, as described above. According to the examples of FIGS. 7 and 8 described above, the evaluation value of the WLAN of ESSID_1 is 6 (=2+2+2), the evaluation value of the WLAN of ESSID_2 is 2 (=1+1+0), and the evaluation value of the WLAN of ESSID_3 is 3 (=2+1+0). Thus, according to the examples of FIGS. 7 and 8, the WLAN of ESSID_1 is selected.

(Information Providing Unit 166)

Provision of Second Network Information

The information providing unit 166 provides information regarding the one selected wireless network (hereinafter referred to as "second network information) to another terminal device that performs wireless communication that is different from mobile communication of the mobile communication network 30. For example, the information providing unit 166 provides the second network information to the wireless communication terminal 200-1.

Information Items Included in Second Network Information

Access Point Identification Information

The second network information includes, for example, identification information for identifying an access point of the one selected wireless network.

The one selected wireless network is, for example, a WLAN. In this case, the identification information includes, for example, an SSID. More specifically, for example, the identification information includes an HESSID, an ESSID, and/or a BSSID.

With such identification information, for example, it is possible to specify a connectable wireless network.

Channel Information

The second network information includes information indicating a channel for the one selected wireless network.

For example, a plurality of channels are prepared for a wireless network for the wireless communication (for example, a WLAN). In addition, on the one selected wireless network (for example, the one WLAN), one or more channels among the plurality of channels are used. Furthermore, the second network information includes information indicating the one or more channels that are used on the one selected wireless network as information indicating a channel for the one selected wireless network.

With the information, for example, the wireless communication terminal 200-1 can detect a wireless network more quickly.

Example of Specific Information

Information items of the second network information are, for example, the same as the information items of the first network information. As a specific example, the second network information also includes the information items shown in FIG. 6 like the first network information. When the WLAN of ESSID_1 is selected as described above, for example, the second network information includes information of the WLAN of ESSID_1 from the first network information shown in FIG. 6.

Note that the information items of the second network information may be some information items of the information items of the first network information. In addition, the information items of the second network information may include information items that are not included in the information items of the first network information.

Technique of Providing Second Network Information

When the network selection unit 165 selects one wireless network among the one or more wireless networks, for example, the information providing unit 166 acquires information regarding the one selected wireless network (i.e., second network information) from the storage unit 150 as described above. Then, the information providing unit 166 provides the second network information to the wireless communication terminal 200-1. The information providing unit 166 transmits the second network information to the wireless communication terminal 200-1 via, for example, the first wireless communication unit 120. As a specific example, the second network information is transmitted in WLAN communication (direct communication).

Note that the information providing unit 166 may transmit the second network information to the wireless communication terminal 200-1 via the second wireless communication unit 130 rather than the first wireless communication unit 120. As a specific example, the second network information may be transmitted in short-range wireless communication (for example, Bluetooth communication).

Communication Switch Instruction

The information providing unit 166 instructs the wireless communication terminal 200-1 to switch communication when, for example, providing the second network information to the wireless communication terminal 200-1. For example, the information providing unit 166 transmits a switch instructing message to the wireless communication terminal 200-1 via the first wireless communication unit 120 (or the second wireless communication unit 130). Specifically, for example, the information providing unit 166 transmits a switch instructing message including the second network information to the wireless communication terminal 200-1 via the first wireless communication unit 120 (or the second wireless communication unit 130).

The switch is a switch from communication using tethering to communication by way of a wireless network. More specifically, for example, the switch is a switch from communication via the mobile communication terminal 100-1 to communication via a WLAN.

Effect Brought on by Providing Second Network Information

As described above, the second network information is provided to the other terminal device (for example, the wireless communication terminal 200-1). Accordingly, for example, the other terminal device (for example, the wireless communication terminal 200-1) can promptly switch communication to communication that is performed via a more desirable wireless network.

First, for example, the wireless communication terminal 200-1 can specify a wireless network to which the terminal is connectable through an authentication procedure from the provided second network information. As a result, for example, the wireless communication terminal 200-1 can promptly switch communication from communication using tethering to communication that is performed via the specified wireless network (for example, a WLAN).

More specifically, for example, a device with an ANDSF generally provides information regarding a wireless network to a device that performs mobile communication, but does not provide the information to a device that does not perform mobile communication. On the other hand, in the embodiment of the present disclosure, for example, the mobile communication terminal 100-1 acquires information regarding a wireless network to which the wireless communication terminal 200-1 is connectable through an authentication procedure from the device with the ANDSF (the network information providing device 300-1), and provides the information regarding the wireless network to the wireless communication terminal 200-1 as described above. Therefore, even the wireless communication terminal 200-1 that is not provided with the information directly from the device with the ANDSF can specify a wireless network to which the terminal is connectable through the authentication procedure.

Second, the second network information is information regarding one wireless network that is selected based on state information from one or more wireless networks to which the wireless communication terminal 200-1 is connectable through the authentication procedure. Thus, for example, the wireless communication terminal 200-1 can specify a desirable wireless network to which the wireless communication terminal 200-1 is connectable through the authentication procedure (for example, a wireless network with better communication quality) from the provided second network information. As a result, for example, the wireless communication terminal 200-1 can promptly switch communication from communication using tethering to communication that is performed via the specified more desirable wireless network.

Note that, when communication using tethering is being performed, the wireless communication terminal 200-1 can acquire information from the mobile communication terminal 100-1. Thus, provision of the second network information to the wireless communication terminal 200-1 is suitable especially for a switch from communication to tethering to communication via a wireless network (for example, a WLAN).

Provision of Authentication Information

The information providing unit 166 provides, for example, authentication information provided by the SIM 140 to another terminal device that performs the wireless communication. For example, the information providing unit 166 provides the authentication information to the wireless communication terminal 200-1.

IMSI and Identity

Note that, when EAP-AKA is used as an authentication scheme, for example, IMSI in authentication information is provided as a part of Identity as described below.

$$0<IMSI>@wlan.mnc<MNC>.mcc<MCC>0.3gppnetwork.org \quad [\text{Math. 1}]$$

Note that the IMSI includes a three-digit mobile country code (MCC), a two-digit or three-digit mobile network code (MNC), and a 10-digit mobile subscriber identification number (MSIN), and is expressed as follows.

$$<MCC:3\ digits><MNC:2\ or\ 3\ digits><MSIN:\text{up to } 10\ digits> \quad [\text{Math. 2}]$$

As an example, when the IMSI is 123456012345678, the Identity to be provided is expressed as follows.

$$0123456012345678@wlan.mnc456.mcc123.3gppnetwork.org \quad [\text{Math. 3}]$$

Effect Brought on by Providing Authentication Information

The authentication information is provided to the other terminal device (for example, the wireless communication terminal 200-1) as described above. Accordingly, the other terminal device can perform a SIM authentication procedure. Thus, for example, it is possible to lessen efforts of a user of the other terminal device in connection of the other terminal device (for example, the wireless communication terminal 200-1) which does not perform mobile communication on the mobile communication network 30 to a wireless network (for example, a WLAN). It is possible to lessen efforts of, for example, inputting a password or the like. As a result, for example, communication can be promptly switched.

Note that it is also possible to lessen efforts of the user by using an authentication procedure using an electronic certificate as in the case in which the SIM authentication procedure is used.

3.2. Process Flow

Next, an example of a communication control process according to the first embodiment will be described with reference to FIGS. 9 to 12B.

(Overall Process Flow)

Figure 9:
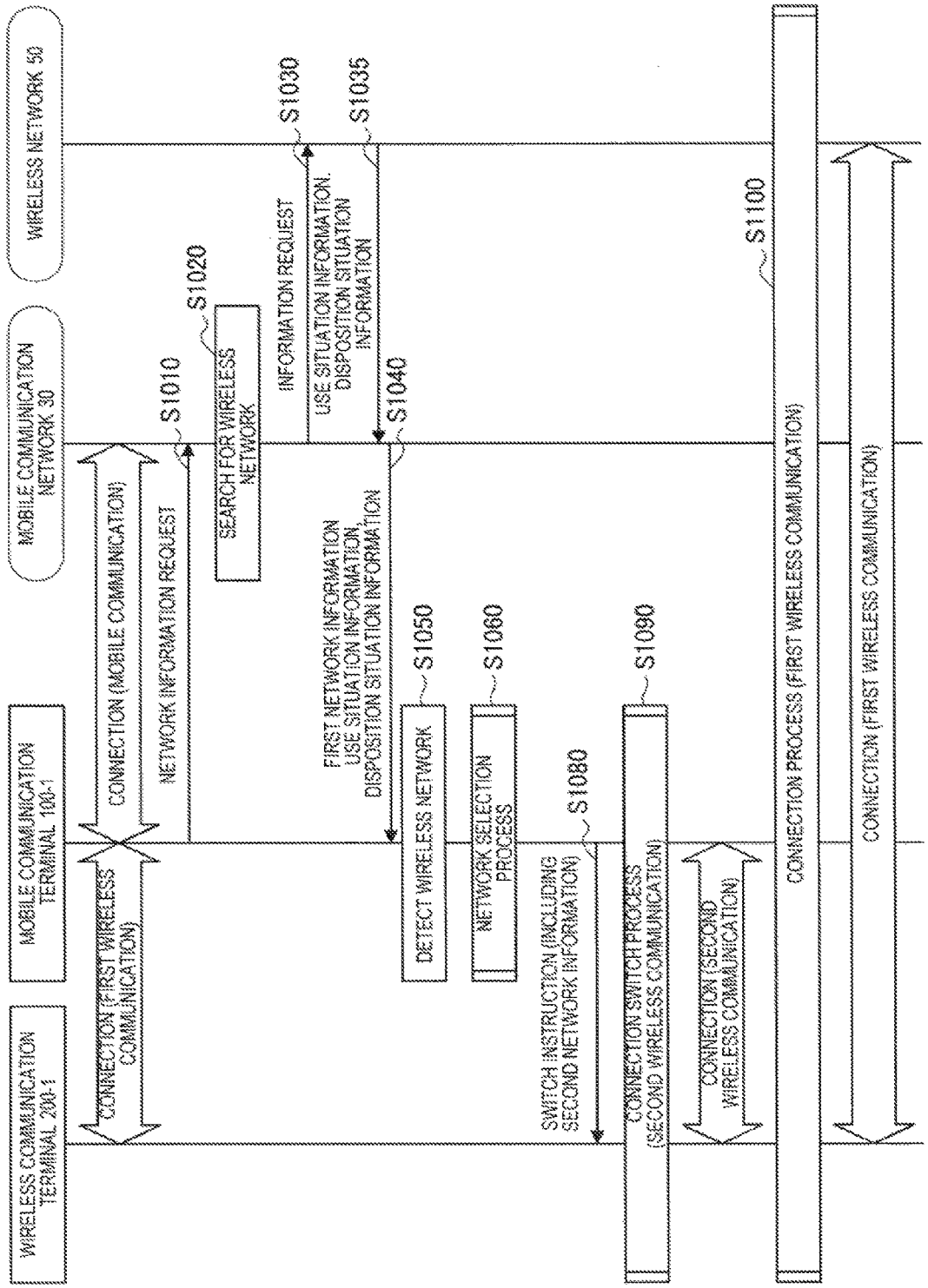
FIG. 9 is a sequence diagram showing an example of a schematic flow of an entire communication control process according to the first embodiment.

FIG. 9 is a sequence diagram showing an example of a schematic flow of the entire communication control process according to the first embodiment.

As a premise, for example, the mobile communication terminal 100-1 and the wireless communication terminal 200-1 are connected to each other in first wireless communication (for example, WLAN communication (direct communication)). In addition, the mobile communication terminal 100-1 is connected to the mobile communication network 30. Furthermore, the wireless communication terminal 200-1 performs communication using tethering by using the tethering function of the mobile communication terminal 100-1.

First, the mobile communication terminal 100-1 transmits a network information requesting message to the network information providing device 300-1 included in the mobile communication network 300 according to occurrence of any of one or more predetermined events (S1010). The network information requesting message includes information for specifying a wireless network (for example, network type information, position-related information, time information, and the like).

Then, upon receiving the network information requesting message, the network information providing device 300-1 searches for a wireless network (S1020). For example, the network information providing device 300-1 searches for a wireless network that corresponds to the information for specifying the wireless network (for example, network type information, position-related information, time information, and the like). In addition, the search result includes, for example, at least one wireless network 50.

In addition, the network information providing device 300-1 requests provision of information from each of the at least one wireless network 50 (S1030). Then, each of the at least one wireless network 50 provides use situation information indicating its use situation and disposition situation information indicating a disposition situation of its access points to the network information providing device 300-1 (S1035). Then, the network information providing device 300-1 acquires the use situation information indicating the use situation of each of the at least one wireless network 50 and the disposition situation information indicating the disposition situation of the access point of each of the at least one wireless network 50. Note that, although only one wireless network 50 is shown in FIG. 9, there can be two or more wireless networks 50.

The network information providing device 300-1 thereafter provides information regarding the at least one wireless network 50 (i.e., first network information), the use situation information, and the disposition situation information to the mobile communication terminal 100-1 (S1040). Then, the mobile communication terminal 100-1 receives and thereby acquires the first network information, the use situation information, and the disposition situation information.

Then, the mobile communication terminal 100-1 detects one or more wireless networks 50 based on the first network information (S1050). Specifically, for example, the mobile communication terminal 100-1 scans the at least one wireless network 50 indicated by the first network information. As a result, the mobile communication terminal 100-1 detects one or more wireless networks 50 from the at least one wireless network 50.

The mobile communication terminal 100-1 thereafter executes a network selection process (S1060). In other words, the mobile communication terminal 100-1 acquires use situation information indicating a use situation of the one or more detected wireless networks 50 and disposition situation information indicating a disposition situation of an access point of the one or more detected wireless networks 50. Then, the mobile communication terminal 100-1 selects one wireless network 50 from the one or more wireless networks 50 based on the use situation information and the disposition situation information.

Then, the mobile communication terminal 100-1 acquires information regarding the one selected wireless network 50 (i.e., second network information), and transmits a switch instructing message including the information (the second network information) to the wireless communication terminal 200-1 (S1080). Then, the wireless communication terminal 200-1 receives the switch instructing message and thereby acquires the second network information.

Thereafter, the mobile communication terminal 100-1 and the wireless communication terminal 200-1 perform a connection switch process for switching from connection of the first wireless communication (WLAN communication (direct communication)) to connection of second wireless communication (Bluetooth communication) (S1090). As a result, the mobile communication terminal 100-1 and the wireless communication terminal 200-1 are connected to each other in the second wireless communication (Bluetooth communication).

Furthermore, the wireless communication terminal 200-1 performs a connection process to connect to the one wireless network 50 indicated by the second network information (S1100). As a result, the wireless communication terminal 200-1 is connected to the one wireless network 50.

(Network Selection Process: S1060)

Figure 10:
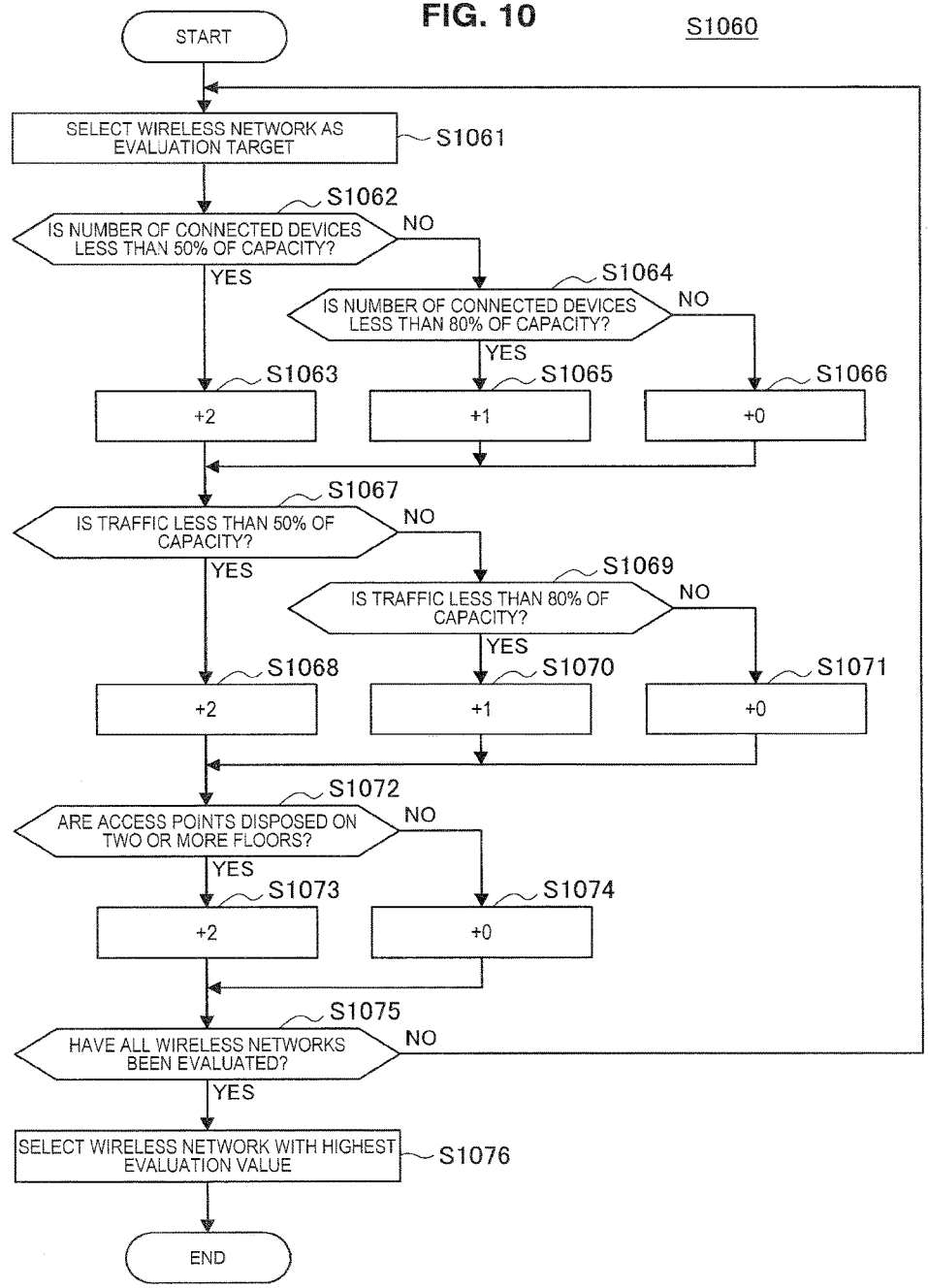
FIG. 10 is a flowchart showing an example of a schematic flow of a network selection process according to the first embodiment.

FIG. 10 is a flowchart showing an example of a schematic flow of a network selection process according to the first embodiment. The network selection process corresponds to the process of Step S1060 shown in FIG. 9.

The network selection unit 165 selects, as an evaluation target, one wireless network that is not evaluated yet from the one or more wireless networks (S1061).

Then, if the number of devices that are connected to the wireless network that is the evaluation target is less than 50% of the maximum device capacity of the wireless network (YES in S1062), the network selection unit 165 adds 2 to an evaluation value of the wireless network (S1063). Otherwise (NO in S1062), if the number of devices that are connected to the wireless network is less than 80% of the maximum device capacity of the wireless network (YES in S1064), the network selection unit 165 adds 1 to the evaluation value of the wireless network (S1065). Otherwise (NO in S1064), the network selection unit 165 adds nothing to the evaluation value of the wireless network (S1066).

In addition, if traffic on the wireless network that is the evaluation target is less than 50% of the maximum traffic capacity of the wireless network (YES in S1067), the network selection unit 165 adds 2 to the evaluation value of the wireless network (S1068). Otherwise (NO in S1067), if the traffic on the wireless network is less than 80% of the maximum traffic capacity of the network (YES in S1069), the network selection unit 165 adds 1 to the evaluation value of the wireless network (S1070). Otherwise (NO in S1069), the network selection unit 165 adds nothing to the evaluation value of the wireless network (S1071).

In addition, if access points of the wireless network that is the evaluation target are disposed on two or more floors (YES in S1072), the network selection unit 165 adds 2 to the evaluation value of the wireless network (S1073). Otherwise (NO in S1072), the network selection unit 165 adds nothing to the evaluation value of the wireless network (S1074).

Then, if all of the one or more wireless networks have been evaluated (YES in S1075), the network selection unit 165 selects the one wireless network with the highest evaluation value among the one or more wireless networks (S1076). Then, the process ends. Otherwise (NO in S1075), the process returns to Step S1061.

(Connection Switch Process: S1090)

Figure 11:
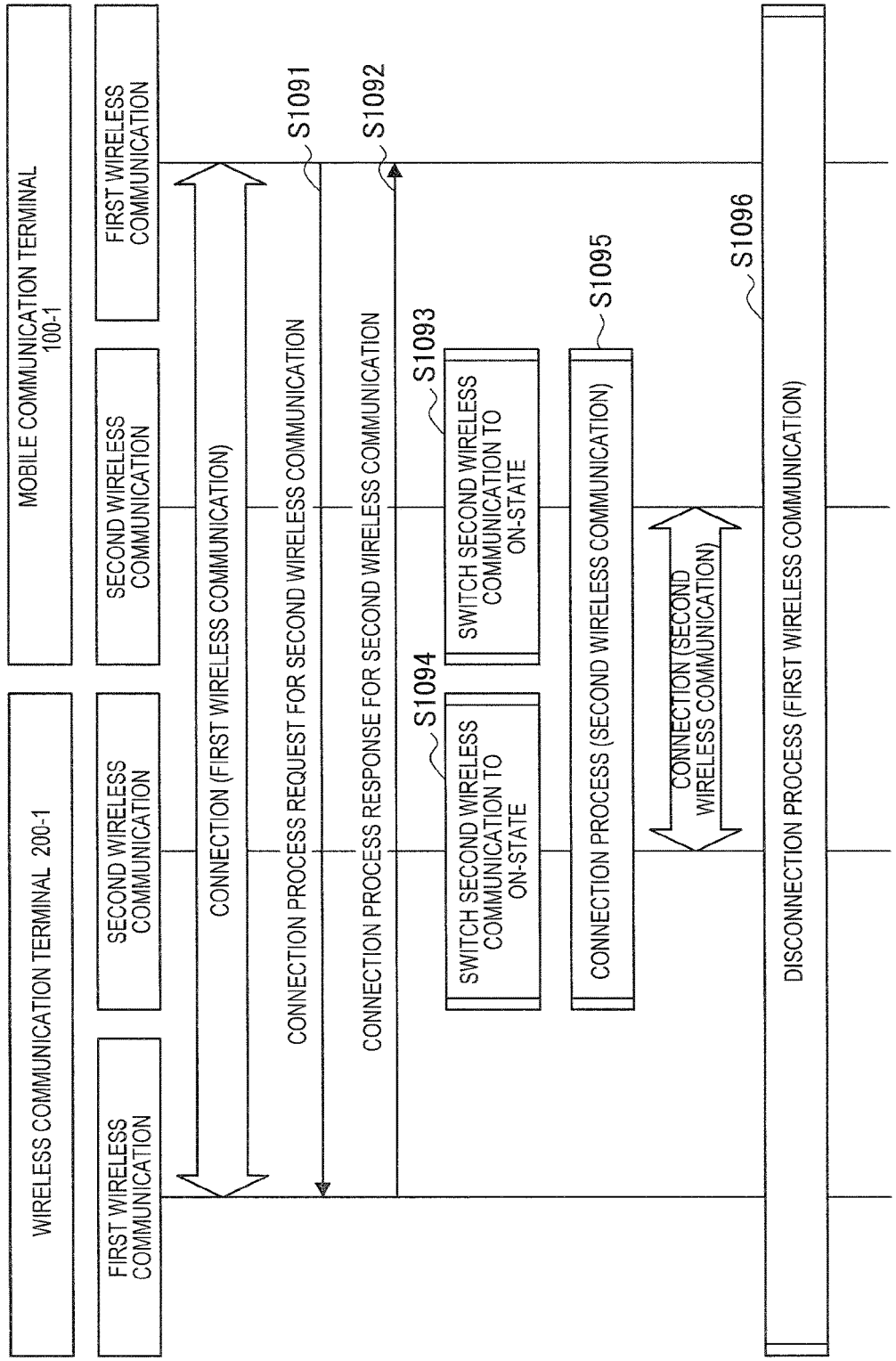
FIG. 11 is a sequence diagram showing an example of a schematic flow of a connection switch process according to the first embodiment.

FIG. 11 is a sequence diagram showing an example of a schematic flow of the connection switch process according to the first embodiment. The connection switch process is a process for switching connection between the mobile communication terminal 100-1 and the wireless communication terminal 200-1 to switch from connection of the first wireless communication (for example, WLAN communication) to connection of the second wireless communication (for example, Bluetooth communication). In addition, the connection switch process corresponds to the process of Step S1090 shown in FIG. 9.

As a premise, for example, the mobile communication terminal 100-1 and the wireless communication terminal 200-1 are connected to each other in the first wireless communication (for example, WLAN communication (direct communication)).

First, the mobile communication terminal 100-1 transmits a connection process requesting message with regard to the second wireless communication to the wireless communication terminal 200-1 (S1091). Then, the wireless communication terminal 200-1 transmits a connection process responding message with regard to the second wireless communication to the mobile communication terminal 100-1 (51092).

The mobile communication terminal 100-1 and the wireless communication terminal 200-1 thereafter switch the second wireless communication to an on state (S1093 and S1094). Then, the mobile communication terminal 100-1 and the wireless communication terminal 200-1 execute a connection process for connection of the second wireless communication (Bluetooth communication) (S1095). As a result, the mobile communication terminal 100-1 and the wireless communication terminal 200-1 are connected to each other in the second wireless communication (Bluetooth communication).

Furthermore, the mobile communication terminal 100-1 and the wireless communication terminal 200-1 execute a disconnection process for disconnecting the connection of the first wireless communication (WLAN (direct communication)) (S1096). As a result, the connection of the first wireless communication between the mobile communication terminal 100-1 and the wireless communication terminal 200-1 is disconnected. After the disconnection process, the mobile communication terminal 100-1 (for example, the control unit 160) may switch the function of the first wireless communication from an on-state to an off-state. In other words, the mobile communication terminal 100-1 may stop an operation of software or hardware for the first wireless communication. Accordingly, for example, the mobile communication terminal 100-1 transmits no beacon of the first wireless communication, and as a result, power consumption of the mobile communication terminal 100-1 can be reduced. Alternatively, after the disconnection process, the mobile communication terminal 100-1 (for example, the control unit 160) may further lengthen a transmission interval of beacons of the first wireless communication. Accordingly, for example, power consumption of the mobile communication terminal 100-1 can be reduced, and re-connection of the wireless communication terminal 200-1 to the mobile communication terminal 100-1 can be more quickly performed.

Note that the connection process requesting message with regard to the second wireless communication may be transmitted from the wireless communication terminal 200-1 to the mobile communication terminal 100-1, instead of being transmitted from the mobile communication terminal 100-1 to the wireless communication terminal 200-1. In this case, the connection process responding message with regard to the second wireless communication may be transmitted from the mobile communication terminal 100-1 to the wireless communication terminal 200-1, instead of being transmitted from the wireless communication terminal 200-1 to the mobile communication terminal 100-1.

(Wireless Network Connection Process: S1100)

Figure 12B:
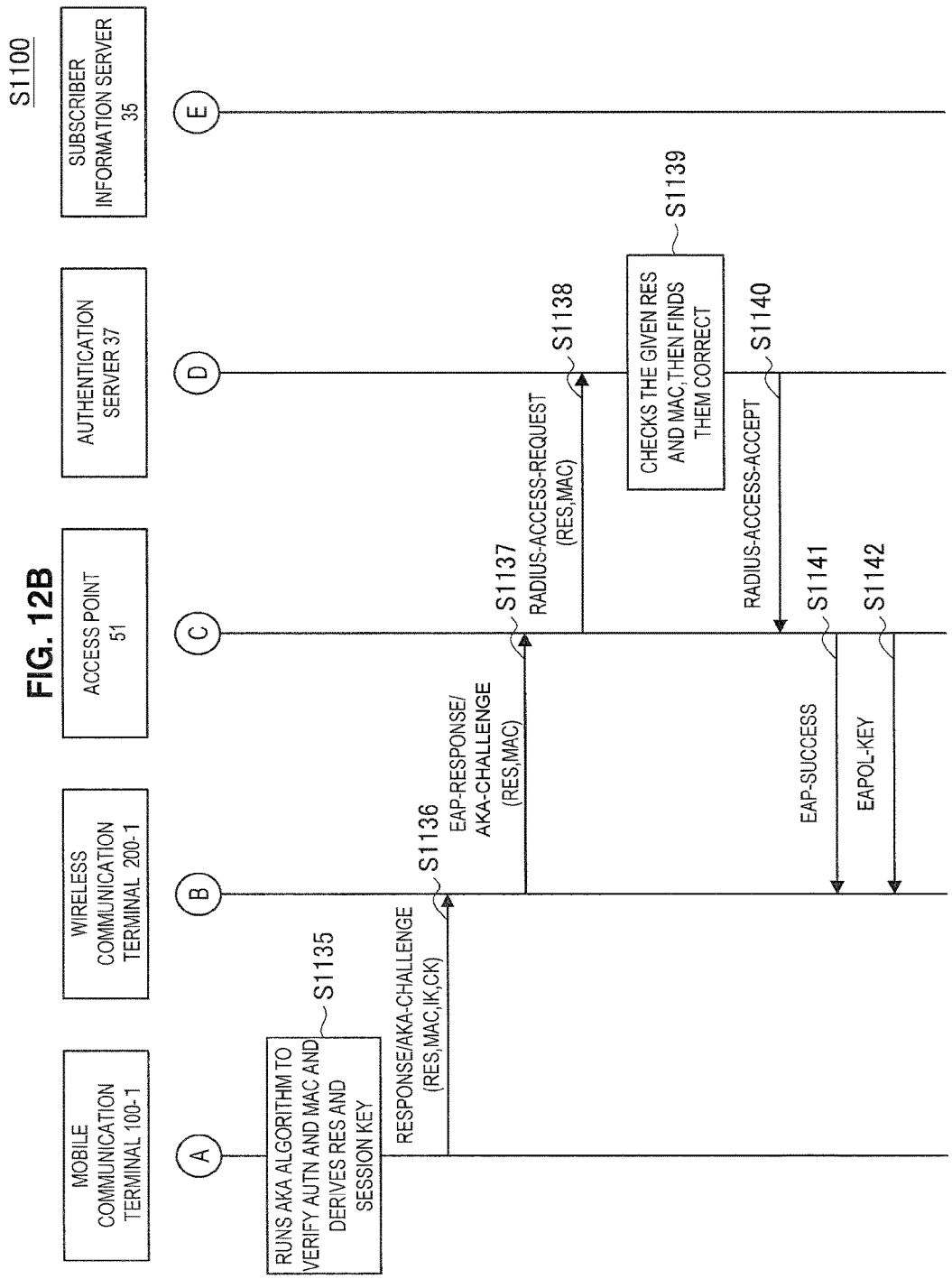
FIG. 12B is a sequence diagram showing an example of (the second half of) the schematic flow of the connection process according to the first embodiment.

FIGS. 12A and 12B are sequence diagrams showing an example of a schematic flow of the connection process according to the first embodiment. The connection process is a connection process for connection to the wireless network (for example, a WLAN). In this example, the connection process is a connection process through an authentication procedure based on EAP-AKA. The process corresponds to the one in Step S1100 shown in FIG. 9.

First, the wireless communication terminal 200-1 detects one wireless network 50 indicated by the second network information (S1110).

The access point 51 of the wireless network 50 and the wireless communication terminal 200-1 thereafter perform association (Association) (S1121). Accordingly, transmission and reception of information for the authentication procedure becomes possible.

Then, the wireless communication terminal 200-1 transmits an EAPoL-Start message to the access point 51 (S1122).

The access point 51 transmits an EAP-Request/Identity message to the wireless communication terminal 200-1 (S1123). Then, the wireless communication terminal 200-1 transmits a Request/Identity message to the mobile communication terminal 100-1 (S1124). Note that the EAP-Request/Identity message is a message requesting generation of Identity that is necessary for authentication of EAP-AKA.

The mobile communication terminal 100-1 acquires information (for example, an IMSI) provided by the SIM 140 and generates the Identity (S1125). Then, the mobile communication terminal 100-1 transmits a Response/Identity message that includes the generated Identity to the wireless communication terminal 200-1 (S1126). Then, the wireless communication terminal 200-1 transfers an EAP-Response/Identity message to the access point 51 (S1127).

The access point 51 thereafter transmits a RADIUS-Access-Request message that includes the Identity to the authentication server 37 (S1128).

Then, the authentication server 37 requests authentication vectors corresponding to the Identity from the subscriber information server 35 (S1129).

Then, the subscriber information server 35 generates authentication vectors corresponding to the Identity (S1130). Note that the authentication vectors refer to a set of information necessary for authenticating a terminal device. When an authentication scheme is EAP-AKA, the authentication vectors include a RAND, an AUTN, an XRES, an IK and a CK. The RAND is a random value used as a challenge. The AUTN is a value for a terminal device to authenticate a network. The XRES is a response value expected from a challenge. The 1K is a key for verifying integrity of a message. The CK is a key for encrypting a message.

The subscriber information server 35 thereafter transmits the generated authentication vectors to the authentication server 37 (S1131).

Further, the authentication server 37 transmits a RADIUS-Access-Challenge message to the access point 51 (S1132) in response to the RADIUS-Access-Request message (S1128). Note that the RADIUS-Access-Challenge message includes a message authentication code (MAC) in addition to the authentication vectors. The MAC is information for verifying the integrity of the message and is generated by the authentication server 37.

The access point 51 thereafter transmits an EAP-Request/AKA-Challenge message to the wireless communication terminal 200-1 (S1133). The EAP-Request/AKA-Challenge message includes the RAND, the AUTN, and the MAC. The XRES, the IK, and the CK are retained by the access point 51 and are not transmitted to the wireless communication terminal 200-1.

Then, the wireless communication terminal 200-1 transmits a Request/AKA-Challenge message to the mobile communication terminal 100-1 (S1134). The Request/AKA-Challenge message is a message requesting the mobile communication terminal 100-1 to generate a response and session keys (IK and CK).

The mobile communication terminal 100-1 (or the SIM 140) thereafter executes an authentication algorithm (AKA algorithm) based on the information included in the Request/AKA-Challenge message (the RAND, the AUTN, and the MAC) (S1135). Accordingly, verification of the integrity of the message, authentication of a wireless network, and generation of a response to a challenge, the MAC, and the session keys are performed.

Then, the mobile communication terminal 100-1 transmits a Response/AKA-Challenge message to the wireless communication terminal 200-1 (S1136). The Response/AKA-Challenge message includes the generated response, MAC, and session keys.

The wireless communication terminal 200-1 thereafter transmits an EAP-Response/AKA-Challenge message to the access point 51 (S1137) in response to the EAP-Request/AKA-Challenge message (S1133). The EAP-Response/AKA-Challenge message includes the response and the MAC transmitted in S1136.

Then, the access point 51 transmits a RADIUS-Access-Request message (S1138). The RADIUS-Access-Request message includes the response and the MAC transmitted in S1137.

The authentication server 37 performs verification of the coincidence of the response and the XRES and verification of the integrity of the message based on the MAC (S1139).

The authentication server 37 thereafter transmits a RADIUS-Access-Accept message to the access point 51 (S1140). The RADIUS-Access-Accept message is a message indicating permission for connection since a terminal device (i.e., the wireless communication terminal 200-1) that is subject to the authentication procedure is a legitimate user.

The access point 51 transmits an EAP-Success message to the wireless communication terminal 200-1 (S1141). The EAP-Success message is a message indicating success in authentication. In addition, the access point 51 transmits an EAPoL-Key message to the wireless communication terminal 200-1 (S1142). The EAPoL-Key message includes a key for encrypted communication used between the wireless communication terminal 200-1 and the access point 51.

The connection process is performed as described above. As a result, the wireless communication terminal 200-1 is connected to the wireless network 50.

3.3. Modified Example

Next, a modified example of the first embodiment will be described with reference to FIGS. 13 to 16.

According to the first embodiment described above, for example, the mobile communication terminal 100-1 acquires, as state information indicating a state of each of one or more wireless networks, use situation information indicating a use situation of each of the one or more wireless networks. Then, the mobile communication terminal 100-1 selects one wireless network among the one or more wireless networks based on the use situation information.

Meanwhile, according to a modified example of the first embodiment, the mobile communication terminal 100-1 acquires, as state information indicating a state of each of one or more wireless networks, communication quality information indicating measured communication quality of each of the one or more wireless networks. Then, the mobile communication terminal 100-1 selects one wireless network among the one or more wireless networks based on the communication quality information.

Note that only differences between the example of the first embodiment described above and the modified example of the first embodiment will be described here.
(Configuration of the Mobile Communication Terminal 100-1: First Information Acquisition Unit 162)

In the modified example of the first embodiment, the first information acquisition unit 162 does not acquire, for example, use situation information and disposition situation information.
(Configuration of the Mobile Communication Terminal 100-1: Network Detection Unit 163)

Measurement of Communication Quality

In the modified example of the first embodiment, when detecting a wireless network for the wireless communication based on the first network information, for example, the network detection unit 163 measures communication quality of the detected wireless network.

For example, when detecting the one or more wireless networks, the network detection unit 163 measures communication quality of each of the one or more wireless networks. Then, the network detection unit 163 generates communication quality information indicating the communication quality.

As an example, the network detection unit 163 measures intensity of a received signal as the communication quality and generates communication quality information that includes information indicating the measured intensity. As an example, the information indicating intensity of a received signal is a Received Signal Strength Indicator (RSSI).
(Configuration of the Mobile Communication Terminal 100-1: Second Information Acquisition Unit 164)

Acquisition of State Information

As described above, the second information acquisition unit 164 acquires state information indicating a state of each of one or more wireless networks for wireless communication that is different from mobile communication of a mobile communication network 30.

In the modified example of the first embodiment, in particular, the state information includes communication quality information indicating measured communication quality of each of the one or more wireless networks.

Information Items Included in Communication Quality Information

The communication quality information includes, for example, information indicating intensity of a received signal (hereinafter referred to as "reception intensity information"). As an example, the reception intensity information is a Received Signal Strength Indicator (RSSI). A specific example of the communication quality information will be described with reference to FIG. 13 below.

FIG. 13 is an explanatory diagram for describing an example of the communication quality information. Referring to FIG. 13, the communication quality information is shown. The communication quality information of this example is information indicating communication quality of each of three wireless networks (three WLANs). The communication quality information of this example includes an RSSI of each of the three wireless networks.

With such communication quality information, for example, it is possible to ascertain communication quality of a wireless network. Thus, it is possible to specify a wireless network with better communication quality among the one or more wireless networks.

Note that the communication quality information may include other types of information in addition to the reception intensity information or instead of the reception intensity information. As an example, the communication quality information may include a signal-to-noise ratio (SNR).

Technique of Acquiring Communication Quality Information

The communication quality information is information generated by the mobile communication terminal 100-1 or the wireless communication terminal 200-1 through measurement of communication quality. Thus, for example, an amount of information provided from a network side becomes small, and radio resources can be saved on the mobile communication network 30.

When detecting the one or more wireless networks, for example, the network detection unit 163 measures communication quality of each of the one or more wireless networks as described above. Then, the network detection unit 163 generates communication quality information indicating the communication quality as a measurement result. Then, the second information acquisition unit 164 acquires the communication quality information.

As a specific example of the information, when the first network information shown in FIG. 6 is provided, the network detection unit 163 detects all three of the WLANs (i.e., the three WLANs indicated by the first network information) shown in FIG. 6. Then, the communication quality information shown in FIG. 13 is generated by the network detection unit 163 and acquired by the second information acquisition unit 164.

Note that authentication capabilities can be different between the mobile communication terminal 100-1 and the wireless communication terminal 200-1. In addition, a wireless network to which the wireless communication terminal 200-1 is connectable through an authentication procedure can be any of some wireless networks of the at least one wireless network (for example, the three WLANs shown in FIG. 6) indicated by the first network information. In such a case, the second information acquisition unit 164 may acquire communication quality information indicating communication quality of each of the one or more wireless networks detected by the network detection unit 163 among the some wireless networks.

Acquisition of Channel Information

The second information acquisition unit 164 acquires, for example, information indicating a channel used on each of the one or more wireless networks. A specific example of the information will be described below with reference to FIG. 14.

FIG. 14 is an explanatory diagram for describing an example of information indicating channels used on wireless networks. Referring to FIG. 14, the channels used on each of the three wireless networks (three WLANs) are shown. For example, channel 1 is used on the WLAN of ESSID_1, and channel 6 is used on the WLAN of ESSID_2 and the WLAN of ESSID_3.

With the information, for example, it is possible to ascertain a sharing situation of channels on each of wireless networks.

Note that the information indicating channels used on each of the one or more wireless networks is, for example, generated according to detection by the network detection unit 163, and then the second information acquisition unit 164 acquires the generated information. Alternatively, the information indicating channels used on each of the one or more wireless networks may be included in the first network information. In this case, the second information acquisition unit 164 may acquire the information included in the first network information.

(Configuration of the Mobile Communication Terminal 100-1: Network Selection Unit 165)

The network selection unit 165 selects one wireless network among the one or more wireless networks based on the state information indicating a state of each of the one or more wireless networks.

In the modified example of the first embodiment, in particular, the state information indicating a state of each of the one or more wireless networks includes communication quality information indicating measured communication quality of each of the one or more wireless networks as described above. In other words, the network selection unit 165 selects one wireless network among the one or more wireless networks based on the communication quality information indicating measured communication quality of each of the one or more wireless networks. Accordingly, it is possible to select a wireless network with better communication quality.

Furthermore, the network selection unit 165 selects the one wireless network based further on, for example, a sharing situation of a channel used on each of the one or more wireless networks. Accordingly, it is possible to consider, for example, a possibility of interference or cross talk occurring on a wireless network, and thus to select a wireless network with better communication quality with high accuracy.

Specific Selection Technique

The network selection unit 165, for example, evaluates each of the one or more wireless networks based on the communication quality information and the sharing situation and selects the one wireless network having the highest evaluation result among the one or more wireless networks.

More specifically, for example, the network selection unit 165 calculates evaluation values of each of the one or more wireless networks and selects the one wireless network having the highest evaluation value.

As a first example, if the RSSI of a wireless network is higher than −40, 2 is added to the evaluation value of the wireless network. In addition, if the RSSI is higher than −60 and lower than or equal to −40, 1 is added to the evaluation value. If the RSSI is equal to or lower than −60, nothing is added to the evaluation value. As a specific example, referring to FIG. 13 again, for example, the RSSI of the WLAN of ESSID_1 is −30, and thus 2 is added to the evaluation value of the WLAN of ESSID_1. In addition, for example, since the RSSI of the WLAN of ESSID_2 is −50, 1 is added to the evaluation value of the WLAN of ESSID_2. In addition, for example, since the RSSI of the WLAN of ESSID_3 is −70, nothing is added to the evaluation value of the WLAN of ESSID_3.

As a second example, if a channel to be used on a wireless network is not shared by the wireless network and another wireless network, 2 is added to the evaluation value of the wireless network. In addition, if the channel is shared by the wireless network and another wireless network, nothing is added to the evaluation value. As a specific example, referring to FIG. 14 again, for example, channel 1 to be used on the WLAN of ESSID_1 is not being shared by the WLAN and other WLANs (the WLAN of ESSID_2 and the WLAN of ESSID_3). Thus, 2 is added to the evaluation value of the WLAN of ESSID_1. In addition, for example, channel 6 to be used on the WLAN of ESSID_2 is being shared by the WLAN of ESSID_2 and the WLAN of ESSID_3. Thus, nothing is added to the evaluation values of the WLAN of ESSID_2 and the WLAN of ESSID_3.

The evaluation values are calculated, for example, as described above. According to the examples of FIGS. 13 and 14 described above, the evaluation value of the WLAN of ESSID_1 is 4 (=2+2), the evaluation value of the WLAN of ESSID_2 is 1 (=1±0), and the evaluation value of the WLAN of ESSID_3 is 0 (=0±0). Thus, according to the examples of FIGS. 13 and 14, the WLAN of ESSID_1 is selected.

(Process Flow: Overall Process Flow)

Figure 15:
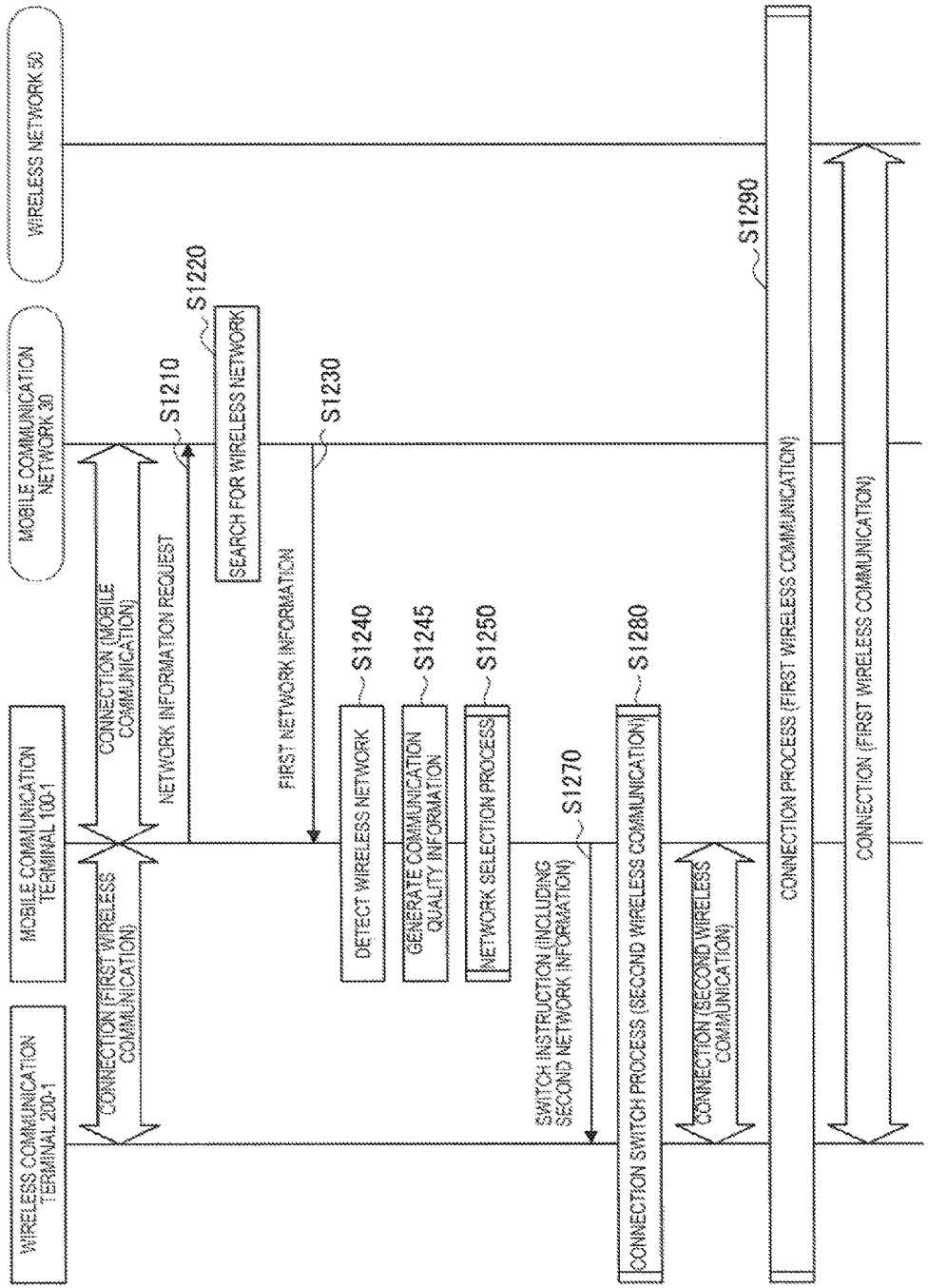
FIG. 15 is a sequence diagram showing an example of a schematic flow of an entire communication control process according to a modified example of the first embodiment.

FIG. 15 is a sequence diagram showing an example of a schematic flow of an entire communication control process according to the modified example of the first embodiment.

Note that Steps S1210, S1220, S1270, S1280, and S1290 in the communication control process according to the modified example of the first embodiment shown in FIG. 15 are the same as Steps S1010, S1020, S1080, S1090, and S1100 in the communication control process according to the first embodiment described with reference to FIG. 9. Thus, only Steps S1230, S1240, S1245, and S1250 will be described here.

The network information providing device 300-1 provides information regarding at least one wireless network 50 (i.e., first network information) included in the search result to the mobile communication terminal 100-1 (S1230). Thereby, the mobile communication terminal 100-1 receives and thereby acquires the first network information.

Then, the mobile communication terminal 100-1 detects one or more wireless networks 50 based on the first network information (S1240). Specifically, for example, the mobile communication terminal 100-1 scans the at least one wireless network 50 indicated by the first network information. As a result, the mobile communication terminal 100-1 detects one or more wireless networks 50 from the at least one wireless network 50.

In addition, the mobile communication terminal 100-1 measures communication quality of each of the one or more wireless networks, and generates communication quality information indicating the communication quality as a measurement result (S1245). Note that, for example, the mobile communication terminal 100-1 also generates information indicating a channel used on each of the one or more wireless networks.

The mobile communication terminal 100-1 thereafter executes a network selection process (S1250) In other words, the mobile communication terminal 100-1 selects one wireless network 50 among the one or more wireless networks 50 based on the communication quality information and a sharing situation of a channel used on each of the one or more wireless networks.

(Network Selection Process: S1250)

Figure 16:
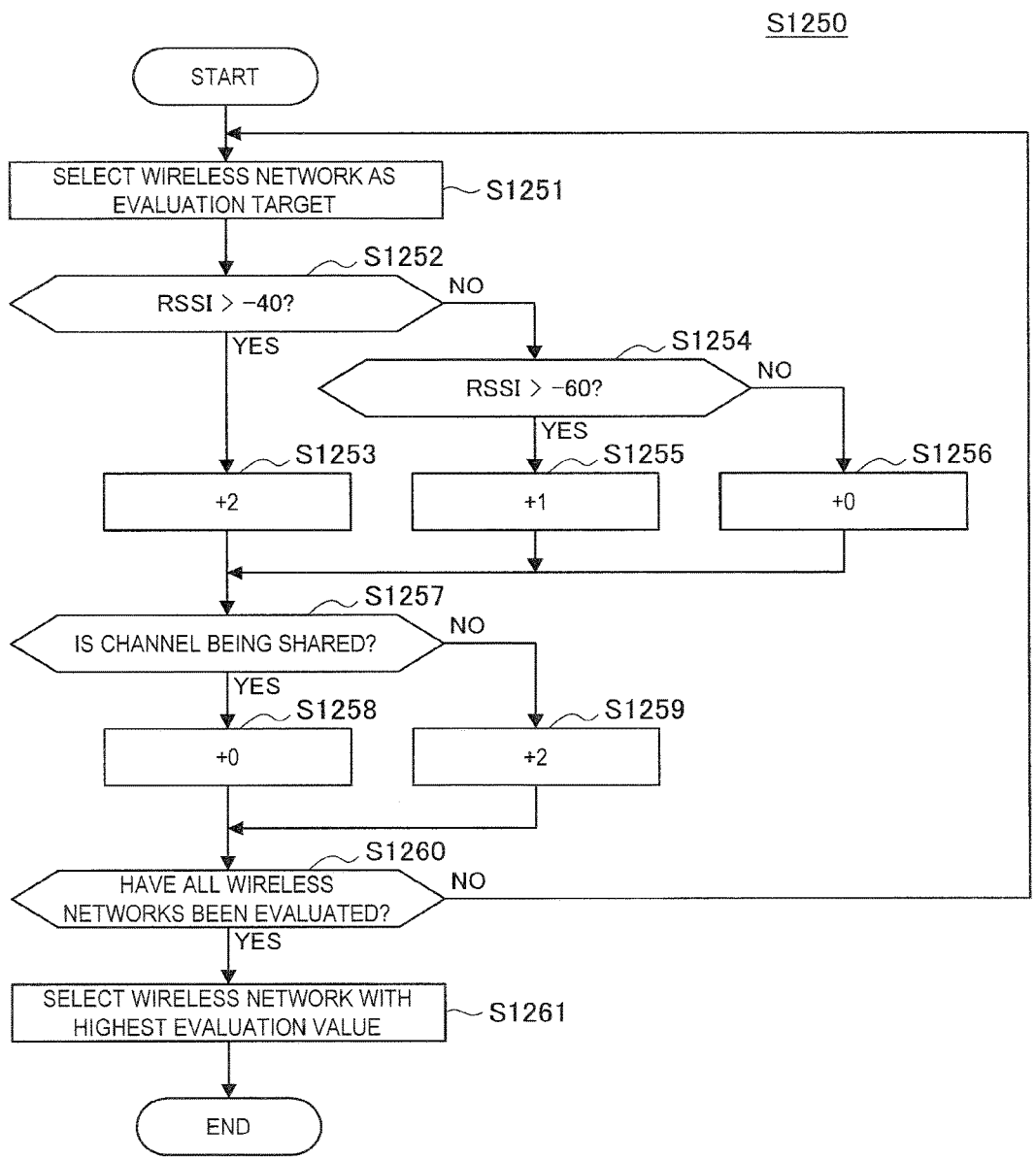
FIG. 16 is a flowchart showing an example of a schematic flow of a network selection process according to the modified example of the first embodiment.

FIG. 16 is a flowchart showing an example of a schematic flow of the network selection process according to the modified example of the first embodiment. The network selection process corresponds to the process of Step S1250 shown in FIG. 15.

The network selection unit 165 selects, as an evaluation target, one wireless network that is not evaluated yet from the one or more wireless networks (S1251).

Then, if the RSSI of the wireless network that is an evaluation target is higher than −40 (YES in S1252), the network selection unit 165 adds 2 to the evaluation value of the wireless network (S1253). Otherwise (NO in S1252), if the RSSI of the wireless network is higher than −60 (YES in S1254), the network selection unit 165 adds 1 to the evaluation value of the wireless network (S1255). Otherwise (NO in S1254), the network selection unit 165 adds nothing to the evaluation value of the wireless network (S1256).

In addition, if a channel to be used on the wireless network that is an evaluation target is being shared by the wireless network and another wireless network (YES in S1257), the network selection unit 165 adds nothing to the evaluation value of the wireless network (S1258). If the channel is not being shared (NO in S1257), the network selection unit 165 adds 2 to the evaluation value of the wireless network (S1259).

Then, if all of the one or more wireless networks have been evaluated (YES in S1260), the network selection unit 165 selects the one wireless network having the highest evaluation value among the one or more wireless networks (S1261). Then, the process ends. Otherwise (NO in S1260), the process returns to Step S1251.

4. Second Embodiment

Figure 17:
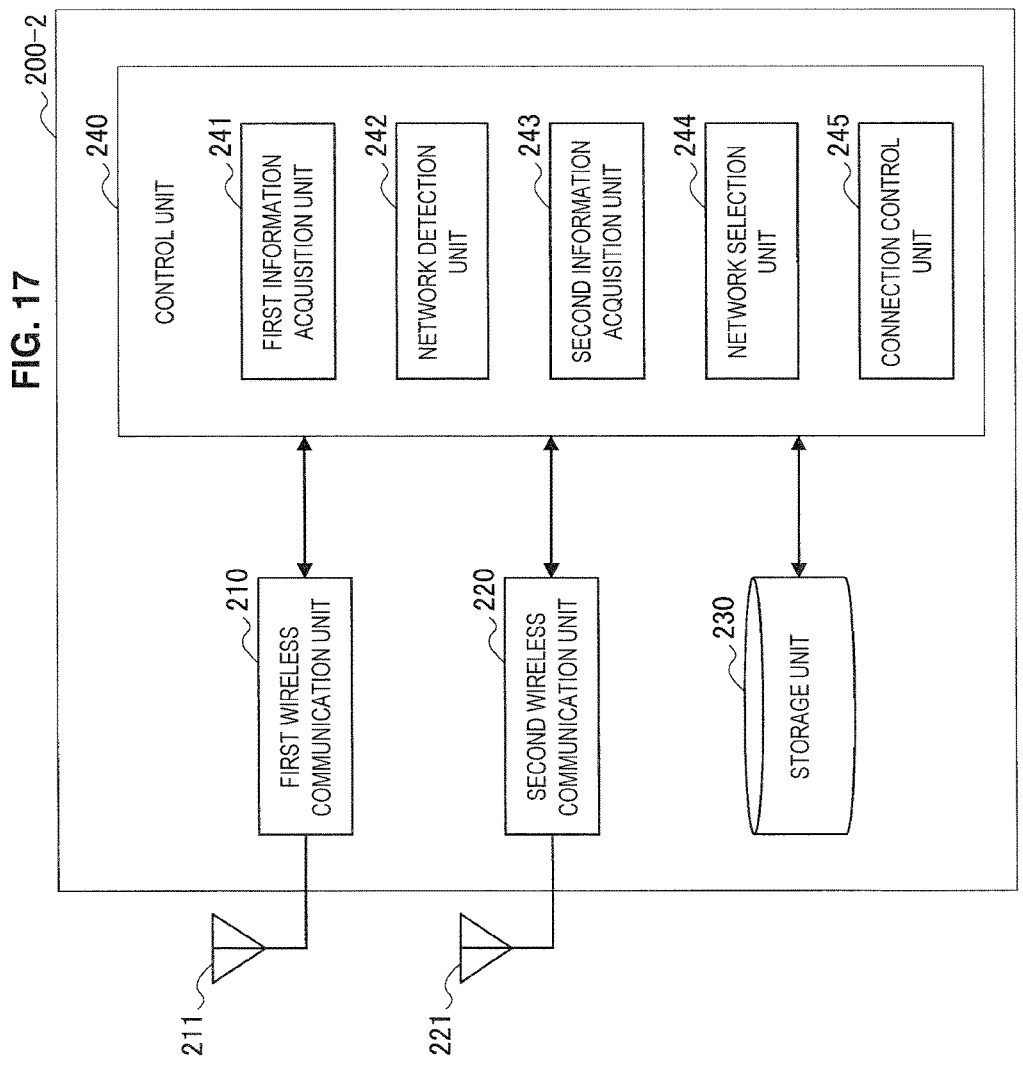
FIG. 17 is a block diagram showing an example of a configuration of a wireless communication terminal according to a second embodiment.

Next, a second embodiment of the present disclosure will be described with reference to FIGS. 17 to 19.

According to the second embodiment, a wireless communication terminal 200-2 selects one wireless network among one or more wireless networks to which the wireless communication terminal 200-2 is connectable through an authentication procedure. Then, the wireless communication terminal 200-2 is connected to the one selected wireless network.

4.1. Configuration of the Wireless Communication Terminal

First, an example of a configuration of the wireless communication terminal 200-2 according to the second embodiment of the present disclosure will be described with reference to FIG. 17. FIG. 17 is a block diagram showing an example of a configuration of the wireless communication terminal 200-2 according to the second embodiment. Referring to FIG. 17, the wireless communication terminal 200-2 includes a first wireless communication unit 210, an antenna unit 211, a second wireless communication unit 220, an antenna unit 221, a storage unit 230, and a control unit 240.

(First Wireless Communication Unit 210)

The first wireless communication unit 210 performs wireless communication that is different from mobile communication of a mobile communication network 30. The wireless communication is, for example, WLAN communication. Specifically, for example, the WLAN communication is communication that conforms with any of WLAN standards such as IEEE 802.11a, 11b, 11g, 11n, 11ac, and 11ad.

For example, the first wireless communication unit 210 receives signals from the access point 51 and transmits signals to the access point 51. In addition, for example, in cases of direct communication, the first wireless communication unit 2100 receives signals from another terminal device and transmits signals to the other terminal device. The other terminal device is, for example, the mobile communication terminal 100.

(Antenna Unit 211)

The antenna unit 211 radiates, as radio waves, signals output from the first wireless communication unit 210 to the space. In addition, the antenna unit 211 converts radio waves of the space into signals and outputs the signals to the first wireless communication unit 210.

(Second Wireless Communication Unit 220)

The second wireless communication unit 220 performs wireless communication that is different from mobile communication. The wireless communication is, for example, short-range wireless communication, and includes Bluetooth communication (i.e., communication that conforms with the Bluetooth standard) as an example. The second wireless communication unit 220, for example, receives signals from another terminal device and transmits signals to the other terminal device. The other terminal device is, for example, the mobile communication terminal 100-2.

(Storage Unit 230)

The storage unit 230 temporarily or permanently stores programs and data for operations of the wireless communication terminal 200.

(Control Unit 240)

The control unit 240 provides various functions of the wireless communication terminal 200-2. The control unit 240 includes a first information acquisition unit 241, a network detection unit 242, a second information acquisition unit 243, a network selection unit 244, and a connection control unit 245.

(First Information Acquisition Unit 241)

Acquisition of Third Network Information

The first information acquisition unit 241 acquires at least partial information (hereinafter referred to as "third network information") of information provided by a network information providing device 300-2 to a mobile communication terminal 100-2 (hereinafter referred to as "first network information"). The third network information is information provided by the mobile communication terminal 100-2 to the wireless communication terminal 200-2.

First Network Information

Content

Content of the first network information of the second embodiment is the same as the content of the first network information of the first embodiment described above. Thus, overlapping description will be omitted here. Note that, as an example, the first network information is the information shown in FIG. 6.

Provision Technique and Acquisition Technique

A provision technique of the first network information used by the network information providing device 300-2 of the second embodiment is the same as the provision technique of the first network information used by the network information providing device 300-1 of the first embodiment. In addition, an acquisition technique of the first network information used by the mobile communication terminal 100-2 of the second embodiment is the same as the acquisition technique of the first network information used by the mobile communication terminal 100-1 of the first embodiment. Therefore, overlapping description will be omitted here.

Third Network Information

The third network information is at least partial information of the first network information and is provided by the mobile communication terminal 100-2 to the wireless communication terminal 200-2 as described above.

Content

In the second embodiment, for example, the third network information is the same as the first network information. In other words, the third network information is information regarding at least one wireless network for the wireless communication that is different from the mobile communication. In addition, information items included in the third network information are the same as the information items included in the first network information. As an example, the third network information is the information shown in FIG. 6.

Note that the third network information may be partial information of the first network information.

When the first network information is information regarding two or more wireless networks for the wireless communication that is different from the mobile communication, for example, the third network information may be information regarding some wireless networks among the two or more wireless networks. When authentication capabilities are different between the mobile communication terminal 100-2 and the wireless communication terminal 200-2, in particular, a wireless network to which the wireless communication terminal 200-2 is connectable through an authentication procedure can be any of some wireless networks of the at least one wireless network indicated by the first network information. In such a case, the third network information may be information regarding the some wireless networks included in the first network information (i.e., wireless networks to which the wireless communication terminal 200-2 is connectable through an authentication procedure).

In addition, the information items included in the third network information may include, for example, some information items among the information items included in the first network information.

Acquisition Technique

The network information providing device 300-2 provides, for example, the first network information to the mobile communication terminal 100-2. Then, the mobile communication terminal 100-2 provides the third network information to the wireless communication terminal 200-2. Then, the first information acquisition unit 241 acquires the third network information via the first wireless communication unit 210 (or the second wireless communication unit 220). The first information acquisition unit 241 thereafter causes the storage unit 230 to store the third network information.

Acquisition of Use Situation Information

The first information acquisition unit 241 acquires, for example, use situation information indicating a use situation of each of the at least one wireless network.

Technique of Acquiring Use Situation Information

For example, the network information providing device 300-2 acquires the use situation information from each of the at least one wireless network and provides the use situation information to the mobile communication terminal 100-2. Then, the mobile communication terminal 100-2 provides the use situation information to the wireless communication terminal 200-2. Then, the first information acquisition unit 241 acquires the use situation information via the first wireless communication unit 210 (or the second wireless communication unit 220). The first information acquisition unit 241 thereafter causes the storage unit 230 to store the use situation information. Note that, as an example, the use situation information acquired by the first information acquisition unit 241 is the information shown in FIG. 7.

Information Items Included in Use Situation Information

Information items included in the use situation information acquired by the first information acquisition unit 241 are, for example, the same as the information items included in the use situation information acquired by the first information acquisition unit 162 in the first embodiment. Thus, overlapping description will be omitted here.

Acquisition of Disposition Situation Information

The first information acquisition unit 241 acquires, for example, disposition situation information indicating a disposition situation of an access point of each of the at least one wireless network.

Technique of Acquiring Disposition Situation Information

For example, the network information providing device 300-2 acquires the use situation information and the disposition situation information from each of the at least one wireless network, and provides the use situation information and the disposition situation information to the mobile communication terminal 100-2. Then, the mobile communication terminal 100-2 provides the use situation information and the disposition situation information to the wireless communication terminal 200-2. Then, the first information acquisition unit 241 acquires the disposition situation information along with the use situation information via the first wireless communication unit 210 (or the second wireless communication unit 220). The first information acquisition unit 241 thereafter causes the storage unit 230 to store the disposition situation information along with the use situation information.

Information Items Included in Disposition Situation Information

Information items included in the disposition situation information acquired by the first information acquisition unit 241 are, for example, the same as the information items included in the disposition situation information acquired by the first information acquisition unit 162 in the first embodiment. Thus, overlapping description will be omitted here. Note that, as an example, the disposition situation information acquired by the first information acquisition unit 241 is the information shown in FIG. 8.

Acquisition of Authentication Information

The mobile communication terminal 100-2 provides, for example, authentication information provided by a SIM of the mobile communication terminal 100-2 to the wireless communication terminal 200-2. Then, the first information acquisition unit 241 acquires the authentication information provided by the mobile communication terminal 100-2.

(Network Detection Unit 242)

The network detection unit 242 detects a wireless network for the wireless communication.

For example, the network detection unit 242 detects the wireless network (for example, a WLAN) by scanning channels for wireless networks for the wireless communication (for example, WLANs).

Detection Based on Third Network Information

The network detection unit 242 detects the wireless network for the wireless communication based on, for example, the third network information.

Specifically, for example, the network detection unit 242 scans the at least one wireless network indicated by the third network information to detect one or more wireless networks from the at least one wireless network. As an example, when the third network information is, for example, information regarding the three wireless networks shown in FIG. 6, the network detection unit 242 scans the three wireless networks. As a result, for example, the network detection unit 242 detects all three of the wireless networks.

In addition, for example, the third network information includes information indicating a channel for each of the at least one wireless network. In this case, the network detection unit 242 performs the scanning based on information indicating the channel. Accordingly, it is possible to detect a wireless network faster.

(Second Information Acquisition Unit 243)

Acquisition of State Information

The second information acquisition unit 243 acquires state information indicating a state of each of one or more wireless networks for wireless communication that is different from mobile communication of the mobile communication network 30.

The state information includes, for example, use situation information indicating a use situation of each of the one or more wireless networks.

One or More Wireless Networks

Features of the one or more wireless networks are the same as the features of the one or more wireless networks described in relation to the state information acquired by the second information acquisition unit 164 in the first embodiment.

In other words, the one or more wireless networks are wireless networks for the wireless communication to which the wireless communication terminal 200-2 is connectable through an authentication procedure. In addition, each of the one or more wireless networks is, for example, a wireless network that has a communication area that corresponds to a position of the mobile communication terminal 100-2 or the wireless communication terminal 200-2. In addition, each of the one or more wireless networks is, for example, a wireless network that has an available time in terms of time. In addition, each of the one or more wireless networks is, for example, a WLAN, and the wireless communication that is different from the mobile communication is, for example, WLAN communication. Note that overlapping description will be omitted here.

Information Items Included in Use Situation Information

Information items included in the use situation information acquired by the second information acquisition unit 243 are, for example, the same as the information items included in the use situation information acquired by the second information acquisition unit 164 in the first embodiment.

As a first example, the use situation information includes information regarding the number of devices that are connected to each of the one or more wireless networks. As a second example, the use situation information includes information regarding traffic on each of the one or more wireless networks. Note that overlapping description will be omitted here.

Technique of Acquiring Use Situation Information

The use situation information acquired by the second information acquisition unit 243 is at least partial information of the information provided by the mobile communication terminal 100-2 via the mobile communication network 30, and is included in the information provided by the mobile communication terminal 100-2 to the wireless communication terminal 200-2.

The first information acquisition unit 241 acquires, for example, use situation information indicating a use situation of each of at least one wireless network indicated by third network information, and causes the storage unit 230 to store the information as described above. On the other hand, the second information acquisition unit 243 acquires at least partial information of the use situation information acquired by the first information acquisition unit 241 from the storage unit 230.

More specifically, for example, the second information acquisition unit 243 acquires the use situation information indicating a use situation of each of one or more wireless networks detected by the network detection unit 242 from the at least one wireless network indicated by the third network information.

As a specific example of the information, when the information shown in FIG. 6 is provided as the third network information, all three of the WLANs shown in FIG. 6 are detected by the network detection unit 242 as described above. In this case, for example, the second information acquisition unit 243 acquires the use situation information shown in FIG. 7. Of course, two or fewer WLANs among the three WLANs shown in FIG. 6 may be detected by the network detection unit 242. In this case, the second information acquisition unit 243 may acquire use situation information of the two or fewer WLANs of the use situation information shown in FIG. 7.

Note that the use situation information acquired by the second information acquisition unit 243 may include only some information items of the use situation information acquired by the first information acquisition unit 241.

Others

Note that the information regarding the one or more wireless networks is at least partial information of the information provided by the network information providing device 300-2 to the mobile communication terminal 100-2, and is included in the information provided by the mobile communication terminal 100-2 to the wireless communication terminal 200-2.

More specifically, for example, the one or more wireless networks are included in the at least one wireless network indicated by the third network information, and the information regarding the one or more wireless networks is included in the third network information as described above. In other words, the information regarding the one or more wireless networks is included in the third network information provided by the mobile communication terminal 100-2 to the wireless communication terminal 200-2.

As described above, the wireless communication terminal 200-2 can ascertain the one or more wireless networks.

Acquisition of Disposition Situation Information

The second information acquisition unit 243 acquires, for example, disposition situation information indicating a disposition situation of an access point of each of the one or more wireless networks.

Information Items Included in Disposition Situation Information

Information items included in the disposition situation information acquired by the second information acquisition unit 243 are, for example, the same as the information items included in the disposition situation information acquired by the second information acquisition unit 164 in the first embodiment. Thus, overlapping description will be omitted here.

Technique of Acquiring Disposition Situation Information

The second information acquisition unit 243 acquires, for example, the disposition situation information in the same manner as the use situation information.

The first information acquisition unit 241 acquires, for example, disposition situation information indicating a disposition situation of an access point of at least one wireless network indicated by the third network information and causes the storage unit 230 to store the information as described above. On the other hand, the second information acquisition unit 243 acquires at least partial information of the disposition situation information acquired by the first information acquisition unit 241 from the storage unit 230.

More specifically, for example, the network detection unit 242 detects one or more wireless networks from the at least one wireless network indicated by the third network information. Then, the second information acquisition unit 243 acquires disposition situation information indicating a disposition situation of an access point of each of the one or more detected wireless networks.

As a specific example of the information, when the information shown in FIG. 6 is provided as the third network information, all three of the WLANs shown in FIG. 6 are detected by the network detection unit 242 as described above. In this case, for example, the second information acquisition unit 243 acquires the disposition situation information shown in FIG. 8. Of course, two or fewer WLANs among the three WLANs shown in FIG. 6 may be detected by the network detection unit 242. In this case, the second information acquisition unit 243 may acquire disposition situation information of the two or fewer WLANs of the disposition situation information shown in FIG. 8.

(Network Selection Unit 244)

The network selection unit 244 selects one wireless network among the one or more wireless networks based on the state information indicating a state of each of the one or more wireless networks.

As described above, the state information indicating a state of each of the one or more wireless networks includes, for example, use situation information indicating a use situation of each of the one or more wireless networks. In other words, the network selection unit 244 selects one wireless network among the one or more wireless networks based on the use situation information indicating a use situation of each of the one or more wireless networks. Accordingly, it is possible to select a wireless network with better communication quality.

Furthermore, the network selection unit 244 selects, for example, the one wireless network based further on the disposition situation information indicating a disposition situation of an access point of each of the one or more wireless networks. Accordingly, for example, it is possible to select a wireless network with better communication quality with high accuracy.

Specific Selection Technique

A specific selection technique used by the network selection unit 244 is, for example, the same as the specific selection technique used by the network selection unit 165 in the first embodiment. Thus, overlapping description will be omitted here.

(Connection Control Unit 245)

The connection control unit 245 causes the wireless communication terminal 200-2 to be connected to the one selected wireless network through the authentication procedure.

As a specific process, for example, the connection control unit 245 performs the authentication procedure. The authentication procedure includes, for example, the authentication procedure in which authentication information provided by the SIM of the mobile communication terminal 100-2 is used (i.e., SIM authentication procedure) as described above. In this case, the connection control unit 245 performs the authentication procedure using the authentication information provided by the mobile communication terminal 100-2 (the authentication information provided by the SIM). Then, if authentication succeeds in the authentication procedure, the wireless communication terminal 200-2 is connected to the one selected wireless network.

As an example, the authentication procedure is a procedure for authentication based on EAP-AKA. Note that the authentication procedure may be another authentication procedure. The authentication procedure may be, for example, a procedure for authentication based on EAP-AKA' or may be a procedure for authentication based on EAP-SIM.

In this manner, the wireless communication terminal 200-2 is connected to the one selected wireless network. Accordingly, for example, it is possible for the wireless communication terminal 200-2 to promptly switch communication to communication that is performed via a more desirable wireless network.

First, since the one selected wireless network is one wireless network to which the wireless communication terminal 200-2 is connectable through the authentication procedure, the wireless communication terminal 200-2 can promptly switch communication from communication using tethering to communication that is performed via the one selected wireless network (for example, a WLAN).

More specifically, for example, a device with the ANDSF generally provides information regarding a wireless network to a device that performs mobile communication, but does not provide the information to a device that does not perform mobile communication. On the other hand, in the embodiment of the present disclosure, the mobile communication terminal 100-2 acquires, for example, information regarding a wireless network to which the wireless communication terminal 200-2 is connectable through the authentication procedure from the device with the ANDSF (the network information providing device 300-2) and provides the information regarding the wireless network to the wireless communication terminal 200-2 as described above. Thus, even the wireless communication terminal 200-2 that is not provided with the information directly from the device with the ANDSF can be promptly connected to the wireless network to which the terminal is connectable through the authentication procedure.

Second, the wireless communication terminal 200-2 is connected to one wireless network selected based on state information among one or more wireless networks to which the wireless communication terminal 200-2 is connectable through the authentication procedure. Thus, the wireless communication terminal 200-2 can be connected to, for example, a more desirable wireless network to which the terminal is connectable through the authentication procedure (for example, a wireless network with better communication quality). In other words, the wireless communication terminal 200-2 can promptly switch communication from communication using tethering to communication that is performed via the more desirable wireless network.

Note that, when communication using tethering is being performed, the wireless communication terminal 200-2 can acquire information from the mobile communication terminal 100-2. Thus, connection of the wireless communication terminal 200-2 to the one selected wireless network is appropriate particularly when communication to tethering is switched to communication via a wireless network (for example, a WLAN).

In addition, if the SIM authentication procedure is used, it is possible to lessen efforts of a user of the wireless communication terminal 200-2 in, for example, connection of the wireless communication terminal 200-2 that does not perform mobile communication on the mobile communication network 30 to a wireless network (a WLAN). It is possible to lessen an effort of, for example, inputting a password or the like. Thus, it is possible to promptly switch communication. Note that it is also possible to lessen efforts of the user by using an authentication procedure in which an electronic certificate is used as in the case in which the SIM authentication procedure is used.

4.2. Process Flow

Next, an example of a communication control process according to the second embodiment will be described with reference to FIG. 18.
(Overall Process Flow)

Figure 18:
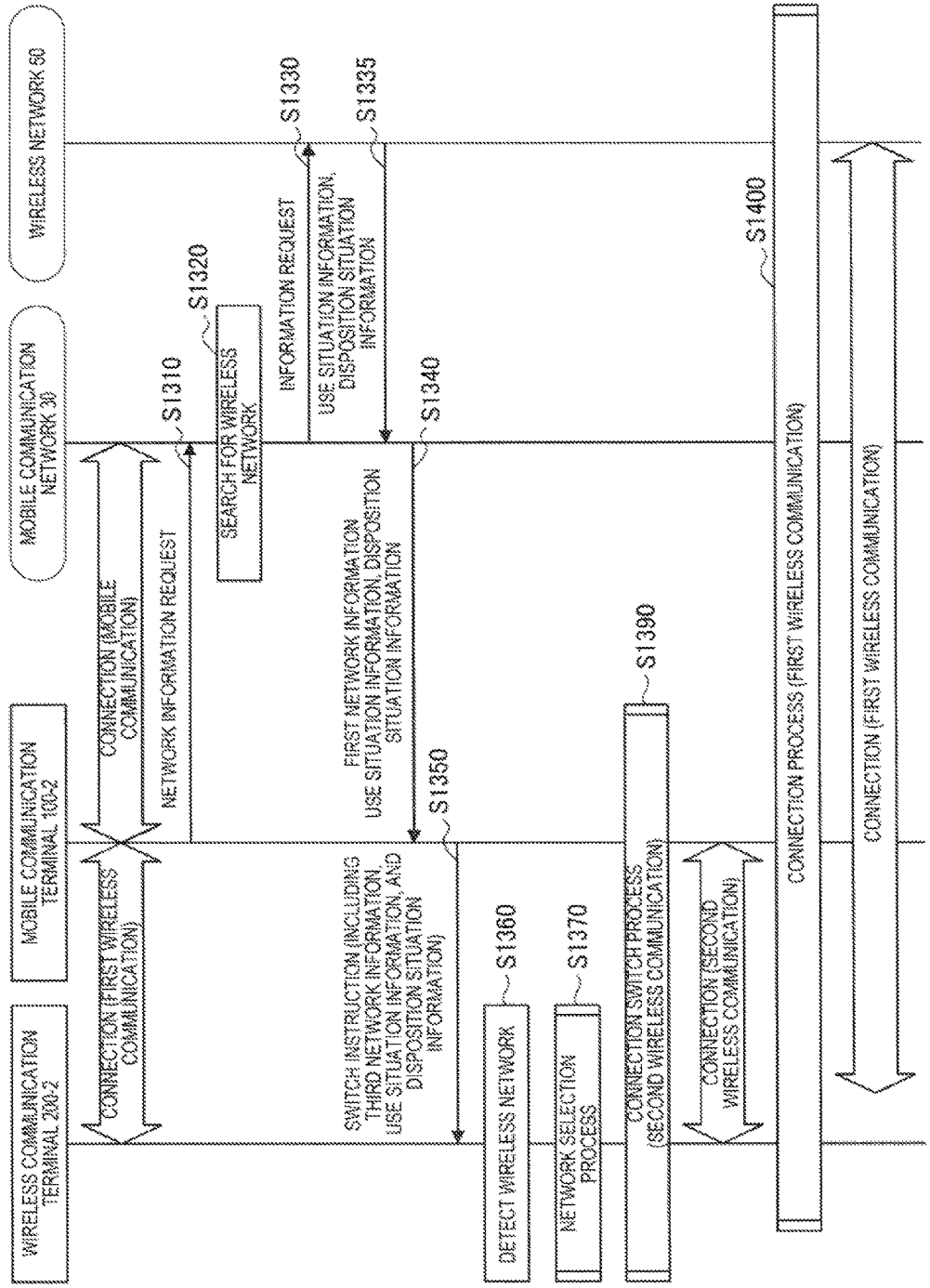
FIG. 18 is a sequence diagram showing an example of a schematic flow of an entire communication control process according to the second embodiment.

FIG. 18 is a sequence diagram showing an example of a schematic flow of the entire communication control process according to the second embodiment.

As a premise, for example, the mobile communication terminal 100-2 and the wireless communication terminal 200-2 are connected to each other in first wireless communication (for example, WLAN communication (direct communication)). In addition, the mobile communication terminal 100-2 is connected to the mobile communication network 30. Furthermore, the wireless communication terminal 200-2 performs communication using tethering by using the tethering function of the mobile communication terminal 100-2.

First, the mobile communication terminal 100-2 transmits a network information requesting message to the network information providing device 300-2 included on the mobile communication network 30 according to occurrence of any one or more predetermined events (S1310). The network information requesting message includes information for specifying a wireless network (for example, network type information, position-related information, time information, and the like).

Then, upon receiving the network information requesting message, the network information providing device 300-2 searches for a wireless network (S1320). For example, the network information providing device 300-2 searches for a wireless network that corresponds to the information for specifying the wireless network (for example, the network type information, the position-related information, the time information, and the like). Then, the search result includes, for example, at least one wireless network 50.

In addition, the network information providing device 300-2 requests provision of information from each of the at least one wireless network 50 (S1330). Then, each of the at least one wireless network 50 provides use situation information indicating its use situation and disposition situation information indicating a disposition situation of its access point to the network information providing device 300-2 (S1335). Thereby, the network information providing device 300-2 acquires the use situation information indicating the use situation of each of the at least one wireless network 50 and the disposition situation information indicating the disposition situation of the access point of each of the at least one wireless network 50. Note that, although only one wireless network 50 is shown in FIG. 18, there can be two or more wireless networks 50.

The network information providing device 300-2 thereafter provides information regarding the at least one wireless network 50 (i.e., first network information), the use situation information, and the disposition situation information to the mobile communication terminal 100-2 (S1340). Then, the mobile communication terminal 100-2 receives and thereby acquires the first network information, the use situation information, and the disposition situation information.

Then, the mobile communication terminal 100-2 transmits a switch instructing message including third network information, the use situation information, and the disposition situation information to the wireless communication terminal 200-2 (S1350). Then, the wireless communication terminal 200-2 receives the switch instructing message, and thereby acquires the third network information, the use situation information, and the disposition situation information. Note that the third network information is the same information as, for example, the first network information.

The wireless communication terminal 200-2 thereafter detects one or more wireless networks 50 based on the third network information (S1360). Specifically, for example, the wireless communication terminal 200-2 scans the at least one wireless network 50 indicated by the third network information. As a result, the wireless communication terminal 200-2 detects one or more wireless networks 50 from the at least one wireless network 50.

Then, the wireless communication terminal 200-2 executes a network selection process (S1370). In other words, the wireless communication terminal 200-2 acquires use situation information indicating a use situation of the one or more detected wireless networks 50 and disposition situation information indicating a disposition situation of an access point of the one or more detected wireless networks 50. Thereby, the wireless communication terminal 200-2 selects one wireless network 50 among the one or more wireless networks 50 based on the use situation information and the disposition situation information.

Thereafter, the mobile communication terminal 100-2 and the wireless communication terminal 200-2 perform a connection switch process for switching from connection of the first wireless communication (WLAN communication (direct communication)) to connection of second wireless communication (Bluetooth communication) (S1390). As a result, the mobile communication terminal 100-2 and the wireless communication terminal 200-2 are connected to each other in the second wireless communication (Bluetooth communication).

Further, the wireless communication terminal 200-2 performs a connection process to connect to the one selected wireless network 50 (S1400). As a result, the wireless communication terminal 200-2 is connected to the one wireless network 50.
(Network Selection Process: S1370)

The flow of the network selection process (S1370) executed by the wireless communication terminal 200-2 in the second embodiment is the same as, for example, the flow of the network selection process executed by the mobile communication terminal 100-1 in the first embodiment (i.e., the flow described with reference to FIG. 10). Thus, overlapping description will be omitted here.

(Connection Switch Process: S1390)

The flow of a connection switch process (S1390) executed by the mobile communication terminal 100-2 and the wireless communication terminal 200-2 in the second embodiment is the same as, for example, the flow of the connection switch process executed by the mobile communication terminal 100-1 and the wireless communication terminal 200-1 in the first embodiment (i.e., the flow described with reference to FIG. 11). Thus, overlapping description will be omitted here.

(Wireless Network Connection Process: S1400)

The flow of a connection process (S1400) in the second embodiment is the same as, for example, the flow of the connection process of the first embodiment (i.e., the flow described with reference to FIGS. 12A and 12B) except that detection of a wireless network (S1110) is not included. Thus, overlapping description will be omitted here.

4.3. Modified Example

Next, a modified example of the second embodiment will be described with reference to FIG. 19.

According to the second embodiment described above, the wireless communication terminal 200-2 acquires, for example, as state information indicating a state of each of one or more wireless networks, use situation information indicating a use state of each of the one or more wireless networks. Then, the wireless communication terminal 200-2 selects one wireless network among the one or more wireless networks based on the use situation information.

On the other hand, according to a modified example of the second embodiment, the wireless communication terminal 200-2 acquires, as state information indicating a state of each of one or more wireless networks, communication quality information indicating measured communication quality of each of the one or more wireless networks. Then, the wireless communication terminal 200-2 selects one wireless network among the one or more wireless networks based on the communication quality information.

Note that only differences between the above-described example of the second embodiment and the modified example of the second embodiment will be described here.

(Wireless Communication Terminal 200-2: First Information Acquisition Unit 241)

In the modified example of the second embodiment, the first information acquisition unit 241 acquires, for example, neither use situation information nor disposition situation information.

(Wireless Communication Terminal 200-2: Network Detection Unit 242)

Measurement of Communication Quality

In the modified example of the second embodiment, when detecting a wireless network for the wireless communication based on the third network information, the network detection unit 242 measures, for example, communication quality of the detected wireless network.

When detecting the one or more wireless networks, the network detection unit 242 detects, for example, communication quality of each of the one or more wireless networks. Then, the network detection unit 242 generates, as a measurement result, communication quality information indicating the communication quality.

As an example, the network detection unit 242 measures, as the communication quality, intensity of a received signal, and generates communication quality information indicating the measured intensity. As an example, the information indicating intensity of a received signal is an RSSI.

(Wireless Communication Terminal 200-2: Second Information Acquisition Unit 243)

Acquisition of State Information

As described above, the second information acquisition unit 243 acquires state information indicating a state of each of one or more wireless networks for wireless communication that is different from mobile communication of the mobile communication network 30.

In the modified example of the second embodiment, in particular, the state information includes communication quality information indicating measured communication quality of each of the one or more wireless networks.

Information Items Included in Communication Quality Information

Information items included in the communication quality information acquired by the second information acquisition unit 243 are, for example, the same as the information items included in the communication quality information acquired by the second information acquisition unit 164 in the first embodiment described above. Thus, overlapping description will be omitted here. Note that, as an example, the communication quality information acquired by the second information acquisition unit 243 is the information shown in FIG. 13.

Technique of Acquiring Communication Quality Information

The communication quality information is information generated by the mobile communication terminal 100-2 or the wireless communication terminal 200-2 through measurement of communication quality. Thus, for example, an amount of information provided from a network side becomes small, and radio resources can be saved on the mobile communication network 30.

When detecting the one or more wireless networks, for example, the network detection unit 242 measures communication quality of each of the one or more wireless networks as described above. Then, the network detection unit 242 generates communication quality information indicating the communication quality as a measurement result. Then, the second information acquisition unit 243 acquires the communication quality information.

As a specific example of the information, when the information shown in FIG. 6 is provided as the third network information, for example, the network detection unit 242 detects all three of the WLANs shown in FIG. 6. Then, the communication quality information shown in FIG. 13 is generated by the network detection unit 242 and acquired by the second information acquisition unit 243.

Acquisition of Channel Information

The second information acquisition unit 243 acquires, for example, information indicating a channel used on each of the one or more wireless networks. As an example, the second information acquisition unit 243 acquires the information shown in FIG. 14 as the information. With the information, for example, it is possible to ascertain a sharing state of a channel used on each of the wireless networks.

Note that the information indicating a channel used on each of the one or more wireless networks is, for example, generated according to detection by the network detection unit 242, and then the second information acquisition unit 243 acquires the generated information. Alternatively, the information indicating a channel used on each of the one or more wireless networks may be information included in the third network information. In this case, the second information acquisition unit 243 may acquire the information included in the third network information.

(Wireless Communication Terminal 200-2: Network Selection Unit 244)

The network selection unit 244 selects one wireless network among the one or more wireless networks based on the state information indicating a state of the one or more wireless networks as described above.

As described above, in the modified example of the second embodiment, in particular, the state information indicating a state of each of the one or more wireless networks includes communication quality information indicating measured communication quality of each of the one or more wireless networks. In other words, the network selection unit 244 selects one wireless network among the one or more wireless networks based on the communication quality information indicating the measured communication quality of each of the one or more wireless networks. Accordingly, it is possible to select a wireless network with better communication quality.

Furthermore, for example, the network selection unit 244 selects the one wireless network based further on a sharing situation of a channel used on each of the one or more wireless networks. Accordingly, for example, it is possible to consider a possibility of interference or cross talk occurring on the wireless network, and to select a wireless network with better communication quality with high accuracy.

Specific Selection Technique

A specific selection technique used by the network selection unit 244 in the modified example of the second embodiment is, for example, the same as the specific selection technique used by the network selection unit 165 in, for example, the modified example of the first embodiment. Thus, overlapping description will be omitted here.

(Process Flow: Overall Process Flow)

Figure 19:
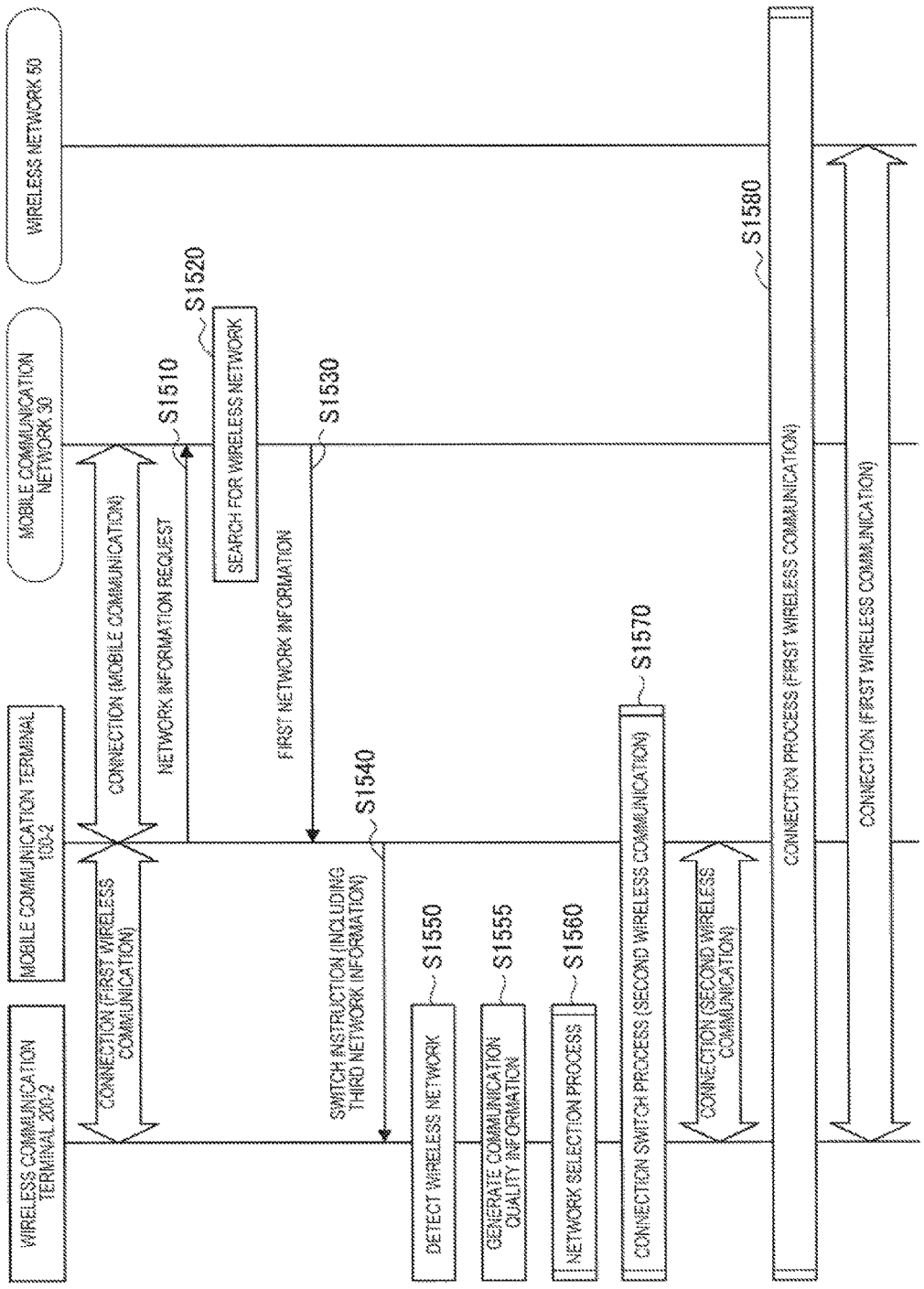
FIG. 19 is a sequence diagram showing an example of a schematic flow of an entire communication control process according to a modified example of the second embodiment.

FIG. 19 is a sequence diagram showing an example of a schematic flow of an entire communication control process according to the modified example of the second embodiment.

Note that Steps S1510, S1520, S1570, and S1580 of the communication control process according to the modified example of the second embodiment shown in FIG. 19 are the same as Steps S1310, S1320, S1390, and S1400 of the communication control process according to the second embodiment described with reference to FIG. 18. Thus, only Steps S1530, S1540, S1550, S1555, and S1560 will be described.

The network information providing device 300-2 provides information regarding at least one wireless network 50 included in the search result (i.e., first network information) to the mobile communication terminal 100-2 (S1530). Then, the mobile communication terminal 100-2 receives and thereby acquires the first network information.

Then, the mobile communication terminal 100-2 transmits a switch instructing message including third network information to the wireless communication terminal 200-2 (S1540). Then, the wireless communication terminal 200-2 receives the switch instructing message and thereby acquires the third network information. The third network information is, for example, the same as the first network information.

Then, the wireless communication terminal 200-2 detects one or more wireless networks 50 based on the third network information (S1550). Specifically, for example, the wireless communication terminal 200-2 scans the at least one wireless network 50 indicated by the third network information. As a result, the wireless communication terminal 200-2 detects one or more wireless networks 50 from the at least one wireless network 50.

In addition, the wireless communication terminal 200-2 measures communication quality of each of the one or more wireless networks, and generates, as a measurement result, communication quality information indicating the communication quality (S1555). Note that, for example, the wireless communication terminal 200-2 also generates information indicating a channel used on each of the one or more wireless networks.

The wireless communication terminal 200-2 thereafter executes a network selection process (S1560). In other words, the wireless communication terminal 200-2 selects one wireless network 50 among the one or more wireless networks 50 based on the communication quality information and a sharing situation of a channel used on each of the one or more wireless networks.

(Network Selection Process: S1560)

The flow of the network selection process (S1560) executed by the wireless communication terminal 200-2 in the modified example of the second embodiment is, for example, the same as the flow of the network selection process (i.e., the flow described with reference to FIG. 16) executed by the mobile communication terminal 100-1 in the modified example of the first embodiment.

5. Application Examples

The technology of the present disclosure is applicable to various kinds of products. For example, the mobile communication terminal 100 can be realized as a mobile terminal such as a smartphone, a tablet personal computer (PC), or a portable/dongle-type mobile router, or an in-vehicle terminal such as a car navigation device. In addition, the mobile communication terminal 100 can be realized as a terminal that performs machine-to-machine (M2M) communication (which is also called a machine-type communication (MTC) terminal). Further, the mobile communication terminal 100 can be a wireless communication module (for example, an integrated circuit module formed in one die) mounted in such a terminal.

In addition, the wireless communication terminal 200 can be realized as, for example, a mobile terminal such as a tablet PC, a notebook PC, a portable game terminal, or a digital camera, a fixed terminal such as a television receiver set, a printer, a digital scanner, or a network storage, or an in-vehicle terminal such as a car navigation device. In addition, the wireless communication terminal 200 can be realized as a terminal that performs M2M communication (which is also called an MTC terminal) such as a smart meter, a vending machine, a remote monitoring device, or a point-of-sale (POS) terminal. Further, the wireless communication terminal 200 can be a wireless communication module (for example, an integrated circuit module formed in one die) mounted in such a terminal.

5.1. Application Examples Regarding a Mobile Communication Terminal

First, a first application example (a smartphone 700) and a second application example (a car navigation device 730 and an in-vehicle system 760) regarding the mobile communication terminal 100 according to an embodiment of the present disclosure will be described.

First Application Example

Figure 20:
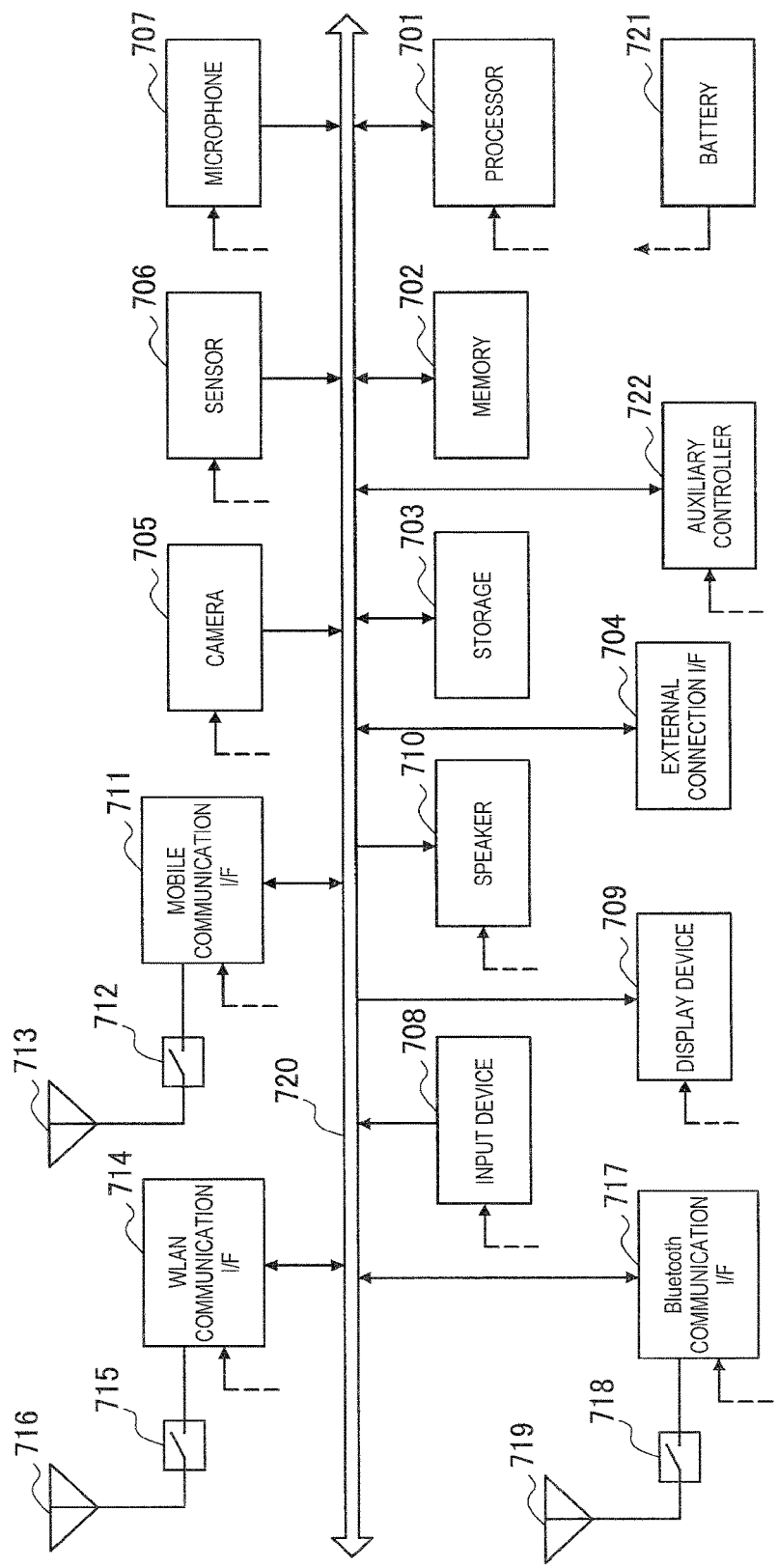
FIG. 20 is a block diagram showing an example of a schematic configuration of a smartphone to which the technology according to the present disclosure can be applied.

FIG. 20 is a block diagram showing an example of a schematic configuration of the smartphone 700 to which the technology according to the present disclosure can be applied. The smartphone 700 includes a processor 701, a memory 702, a storage 703, an external connection interface 704, a camera 705, a sensor 706, a microphone 707, an input device 708, a display device 709, a speaker 710, a mobile communication interface 711, an antenna switch 712, an antenna 713, a WLAN communication interface 714, an antenna switch 715, an antenna 716, a Bluetooth communication interface 717, an antenna switch 718, an antenna 719, a bus 720, a battery 721, and an auxiliary controller 722.

The processor 701 may be, for example, a CPU or a System on Chip (SoC), and controls functions of an application layer and another layer of the smartphone 700. The memory 702 includes a RAM and a ROM, and stores a program that is executed by the processor 701, and data. The storage 703 may include a storage medium such as a semiconductor memory and a hard disk. The external connection interface 704 is an interface for connecting an external device such as a memory card and a universal serial bus (USB) device to the smartphone 700.

The camera 705 includes an image sensor such as a charge coupled device (CCD) and a complementary metal oxide semiconductor (CMOS), and generates a captured image. The sensor 706 may include a group of sensors such as a measurement sensor, a gyro sensor, a geomagnetic sensor, and an acceleration sensor. The microphone 707 converts sounds that are input to the smartphone 700 to audio signals. The input device 708 includes, for example, a touch sensor configured to detect touch onto a screen of the display device 709, a keypad, a keyboard, a button, or a switch, and receives an operation or an information input from a user. The display device 709 includes a screen such as a liquid crystal display (LCD) and an organic light-emitting diode (OLED) display, and displays an output image of the smartphone 700. The speaker 710 converts audio signals that are output from the smartphone 700 to sounds.

The mobile communication interface 711 supports a cellular communication scheme of either LTE or LTE-Advanced to execute wireless communication. The mobile communication interface 711 can typically include a baseband (BB) processor, a radio frequency (RF) circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 713. The mobile communication interface 711 may be a one-chip module in which a BB processor and an RF circuit are integrated. The mobile communication interface 711 may include a signal BB processor or a plurality of BB processors. In addition, the mobile communication interface 711 may include a signal RF circuit or a plurality of RF circuits. The antenna switch 712 switches connection destinations of the antenna 713 for a plurality of circuits included in the mobile communication interface 711. The antenna 713 has a single or a plurality of antenna elements (for example, a plurality of antenna elements constituting a multiple-input and multiple-output (MIMO) antenna) and is used by the mobile communication interface 711 to transmit and receive radio signals.

The WLAN communication interface 714 supports one or more WLAN standards such as IEEE 802.11a, 11b, 11g, 11n, 11ac, and 11ad to execute wireless communication. The WLAN communication interface 714 can communicate with another device via a WLAN access point in an infrastructure mode. In addition, the WLAN communication interface 714 can communicate directly with another device in an ad hoc mode. The WLAN communication interface 714 can typically include a BB processor and an RF circuit. The WLAN communication interface 714 may be a one-chip module in which a memory that stores a communication control program, a processor that executes the program, and a relevant circuit are integrated. The antenna switch 715 switches connection destinations of the antenna 716 for a plurality of circuits included in the WLAN communication interface 714. The antenna 716 has a single or a plurality of antenna elements (for example, a plurality of antenna elements constituting a MIMO antenna), and is used by the WLAN communication interface 714 to transmit and receive radio signals.

The Bluetooth communication interface 717 supports one or more Bluetooth standards to execute wireless communication. The Bluetooth communication interface 717 can communicate directly with another device. The Bluetooth communication interface 717 can typically include a BB processor, an RF circuit, and the like. The Bluetooth communication interface 717 may be a one-chip module in which a memory that stores a communication control program, a processor that executes the program, and a relevant circuit are integrated. The antenna switch 718 switches connection destinations of the antenna 719 for a plurality of circuits included in the Bluetooth communication interface 717. The antenna 719 has a single or a plurality of antenna elements, and is used by the Bluetooth communication interface 717 to transmit and receive radio signals.

As shown in FIG. 20, the smartphone 700 may have antennas that correspond to each of the mobile communication interface 711, the WLAN communication interface 714, and the Bluetooth communication interface 717. Note that the configuration is not limited to the example of FIG. 24, and the smartphone 700 may have an antenna shared by two or more of the mobile communication interface 711, the WLAN communication interface 714, and the Bluetooth communication interface 717. As an example, the smartphone 700 may have an antenna and antenna switch shared by the WLAN communication interface 714 and the Bluetooth communication interface 717 instead of including the antenna switch 715 and the antenna 716, and the antenna switch 718 and the antenna 719. In addition, the shared antenna may be connected to either of the WLAN communication interface 714 and the Bluetooth communication interface 717 using the antenna switch.

In addition, the smartphone 700 may have the mobile communication interface 711, the WLAN communication interface 714, and the Bluetooth communication interface 717 as separate modules as shown in FIG. 20. Note that the configuration is not limited to the example of FIG. 24, and the smartphone 700 may have a one-chip module that includes two or more of the mobile communication interface 711, the WLAN communication interface 714, and the Bluetooth communication interface 717. In this case, the smartphone 700 may include an antenna and antenna switch shared between the communication interfaces, or may include antennas corresponding to each of the communication interfaces.

Note that the antenna switch 712, the antenna switch 715, and the antenna switch 718 may be omitted from the configuration of the smartphone 700.

The bus 720 connects the processor 701, the memory 702, the storage 703, the external connection interface 704, the camera 705, the sensor 706, the microphone 707, the input device 708, the display device 709, the speaker 710, the mobile communication interface 711, the WLAN communication interface 714, the Bluetooth communication interface 717, and the auxiliary controller 722 to each other. The battery 721 supplies power to blocks of the smartphone 700 illustrated in FIG. 20 via feeder lines, which are partially shown as dashed lines in the drawing. The auxiliary controller 722 operates a minimum necessary function of the smartphone 700, for example, in a sleep mode.

The second information acquisition unit 164, the network selection unit 165, and the information providing unit 166 described with reference to FIG. 4 may be implemented by the processor 701 and/or the auxiliary controller 722 in the smartphone 700 shown in FIG. 20. More specifically, for example, the second information acquisition unit 164, the network selection unit 165, and the information providing unit 166 may be implemented by the processor 701 and/or the auxiliary controller 722 and a program executed by the processor 701 and/or the auxiliary controller 722 (for example, an operating system (OS), a device driver, and/or application software). In addition, at least some of the functions may be implemented by the mobile communication interface 711, the WLAN communication interface 714, and/or the Bluetooth communication interface 717. In addition, the mobile communication unit described with reference to FIG. 4 may be implemented by the mobile communication interface 711. In addition, each of the requesting unit 161, the first information acquisition unit 162, and the network detection unit 163 described with reference to FIG. 4 may be implemented by one or two or more of the processor 701, the auxiliary controller 722, the mobile communication interface 711, the WLAN communication interface 714, and the Bluetooth communication interface 717.

Second Application Example

Figure 21:
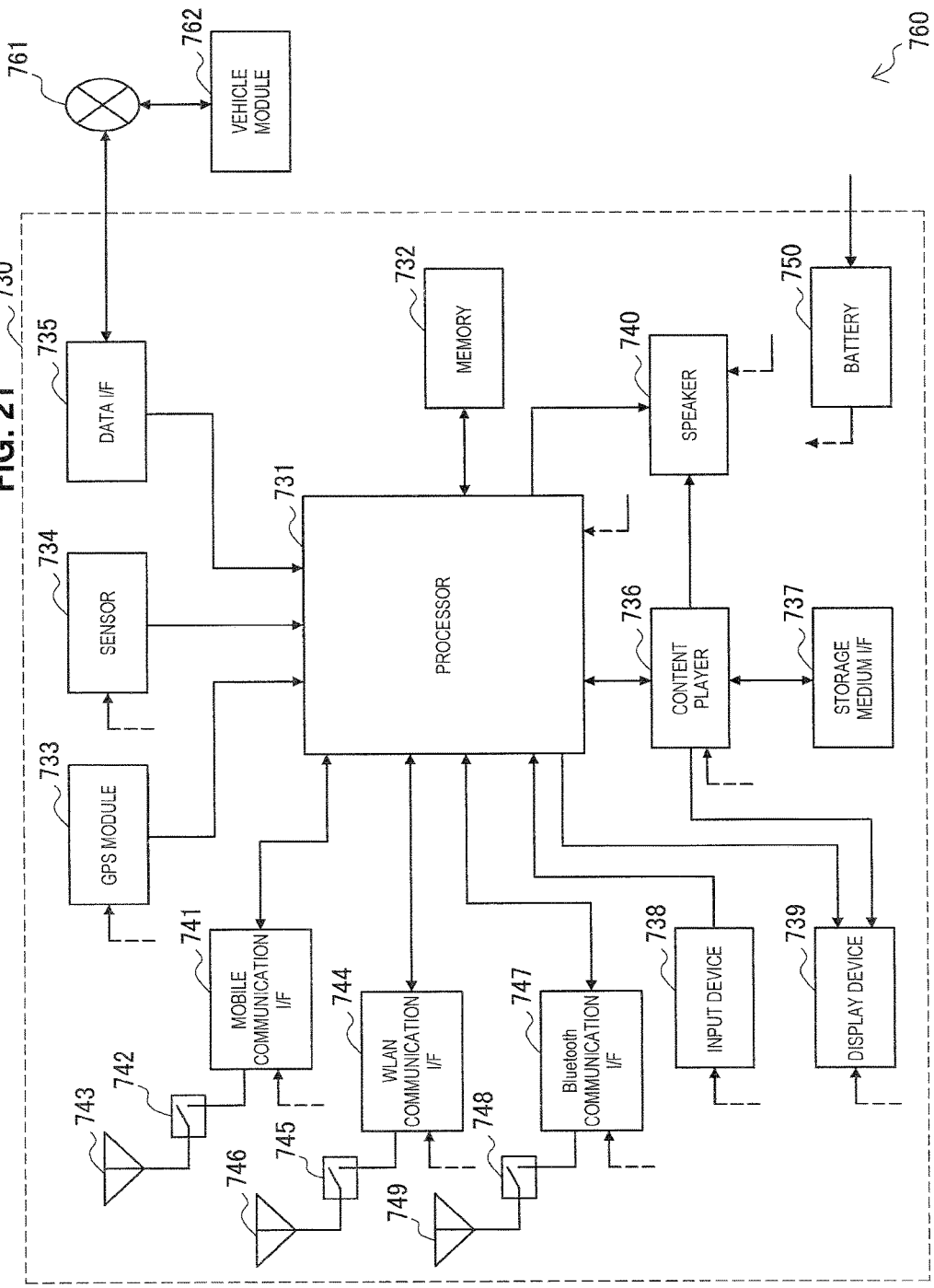
FIG. 21 is a block diagram showing an example of a schematic configuration of a car navigation device to which the technology according to the present disclosure can be applied.

FIG. 21 is a block diagram showing an example of a schematic configuration of the car navigation device 730 to which the technology according to the present disclosure can be applied. The car navigation device 730 includes a processor 731, a memory 732, a Global Positioning System (GPS) module 733, a sensor 734, a data interface 735, a content player 736, a storage medium interface 737, an input device 738, a display device 739, a speaker 740, a mobile communication interface 741, an antenna switch 742, an antenna 743, a WLAN communication interface 744, an antenna switch 745, an antenna 746, a Bluetooth communication interface 747, an antenna switch 748, an antenna 749, and a battery 750.

The processor 731 may be, for example, a CPU or a SoC, and controls a navigation function and another function of the car navigation device 730. The memory 732 includes a RAM and a ROM, and stores a program that is executed by the processor 731, and data.

The GPS module 733 uses GPS signals received from a GPS satellite to measure a position (for example, latitude, longitude, and altitude) of the car navigation device 730. The sensor 734 may include a group of sensors such as a gyro sensor, a geomagnetic sensor, and an air pressure sensor. The data interface 735 is connected to, for example, an in-vehicle network 761 via a terminal that is not shown, and acquires data generated by the vehicle, such as vehicle speed data.

The content player 736 reproduces content stored in a storage medium (such as a CD and a DVD) that is inserted into the storage medium interface 737. The input device 738 includes, for example, a touch sensor configured to detect touch onto a screen of the display device 739, a button, or a switch, and receives an operation or an information input from a user. The display device 739 includes a screen such as a LCD or an OLED display, and displays an image of the navigation function or content that is reproduced. The speaker 740 outputs sounds of the navigation function or the content that is reproduced.

The mobile communication interface 741 supports a cellular communication scheme of either LTE or LTE-Advanced to execute wireless communication. The mobile communication interface 741 can typically include a BB processor, a RF circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 743. The mobile communication interface 741 may be a one-chip module in which a BB processor and an RF circuit are integrated. The mobile communication interface 741 may include a signal BB processor or a plurality of BB processors. In addition, the mobile communication interface 741 may include a signal RF circuit or a plurality of RF circuits. The antenna switch 742 switches connection destinations of the antenna 743 for a plurality of circuits included in the mobile communication interface 741. The antenna 743 has a single or a plurality of antenna elements (for example, a plurality of antenna elements constituting a MIMO antenna) and is used by the mobile communication interface 741 to transmit and receive radio signals.

The WLAN communication interface 744 supports one or more WLAN standards such as IEEE 802.11a, 11b, 11g, 11n, 11ac, and 11ad to execute wireless communication. The WLAN communication interface 744 can communicate with another device via a WLAN access point in an infrastructure mode. In addition, the WLAN communication interface 744 can communicate directly with another device in an ad hoc mode. The WLAN communication interface 744 can typically include a BB processor and an RF circuit. The WLAN communication interface 744 may be a one-chip module in which a memory that stores a communication control program, a processor that executes the program, and a relevant circuit are integrated. The antenna switch 745 switches connection destinations of the antenna 746 for a plurality of circuits included in the WLAN communication interface 744. The antenna 746 has a single or a plurality of antenna elements (for example, a plurality of antenna elements constituting a MIMO antenna), and is used by the WLAN communication interface 744 to transmit and receive radio signals.

The Bluetooth communication interface 747 supports one or more Bluetooth standards to execute wireless communication. The Bluetooth communication interface 747 can communicate directly with another device. The Bluetooth communication interface 747 can typically include a BB processor, an RF circuit, and the like. The Bluetooth communication interface 747 may be a one-chip module in which a memory that stores a communication control program, a processor that executes the program, and a relevant circuit are integrated. The antenna switch 748 switches connection destinations of the antenna 749 for a plurality of circuits included in the Bluetooth communication interface 747. The antenna 749 has a single or a plurality of antenna elements, and is used by the Bluetooth communication interface 747 to transmit and receive radio signals.

As shown in FIG. 21, the car navigation device 730 may have antennas that correspond to each of the mobile communication interface 741, the WLAN communication interface 744, and the Bluetooth communication interface 747. Note that the configuration is not limited to the example of FIG. 21, and the car navigation device 730 may have an antenna shared by two or more of the mobile communication interface 741, the WLAN communication interface 744, and the Bluetooth communication interface 747. As an example, the car navigation device 730 may have an antenna and antenna switch shared by the WLAN communication interface 744 and the Bluetooth communication interface 747 instead of including the antenna switch 745 and the antenna 746, and the antenna switch 748 and the antenna 749. In addition, the shared antenna may be connected to either of the WLAN communication interface 744 and the Bluetooth communication interface 747 using the antenna switch.

In addition, the car navigation device 730 may have the mobile communication interface 741, the WLAN communication interface 744, and the Bluetooth communication interface 747 as separate modules as shown in FIG. 21. Note that the configuration is not limited to the example of FIG. 21, and the car navigation device 730 may have a one-chip module that includes two or more of the mobile communication interface 741, the WLAN communication interface 744, and the Bluetooth communication interface 747. In this case, the car navigation device 730 may include an antenna and antenna switch shared between the communication interfaces, or may include antennas corresponding to each of the communication interfaces.

Note that the antenna switch 742, the antenna switch 745, and the antenna switch 748 may be omitted from the configuration of the car navigation device 730.

The battery 750 supplies power to blocks of the car navigation device 730 shown in FIG. 21 via feeder lines that are partially shown as dashed lines in the drawing. The battery 750 accumulates power supplied form the vehicle.

The second information acquisition unit 164, the network selection unit 165, and the information providing unit 166 described with reference to FIG. 4 may be implemented by the processor 731 in the car navigation device 730 shown in FIG. 21. More specifically, for example, the second information acquisition unit 164, the network selection unit 165, and the information providing unit 166 may be implemented by the processor 731 and a program executed by the processor 731 (for example, an OS, a device driver, and/or application software). In addition, at least some of the functions may be implemented by the mobile communication interface 741, the WLAN communication interface 744, and/or the Bluetooth communication interface 747. In addition, the mobile communication unit 110 described with reference to FIG. 4 may be implemented by the mobile communication interface 741. In addition, each of the requesting unit 161, the first information acquisition unit 162, and the network detection unit 163 described with reference to FIG. 4 may be implemented by one or two or more of the processor 731, the mobile communication interface 741, the WLAN communication interface 744, and the Bluetooth communication interface 747.

In addition, the technology of the present disclosure may also be realized as an in-vehicle system (or a vehicle) 760 including one or more blocks of the car navigation device 730, the in-vehicle network 761, and a vehicle module 762. The vehicle module 762 generates vehicle data such as vehicle speed, engine speed, and trouble information, and outputs the generated data to the in-vehicle network 761.

5.2. Application Example Regarding a Wireless Communication Terminal

Next, a first application example (a tablet terminal 800) and a second application example (a car navigation device 830 and an in-vehicle system 860) regarding the wireless communication terminal 200 according to an embodiment of the present disclosure will be described.

First Application Example

Figure 22:
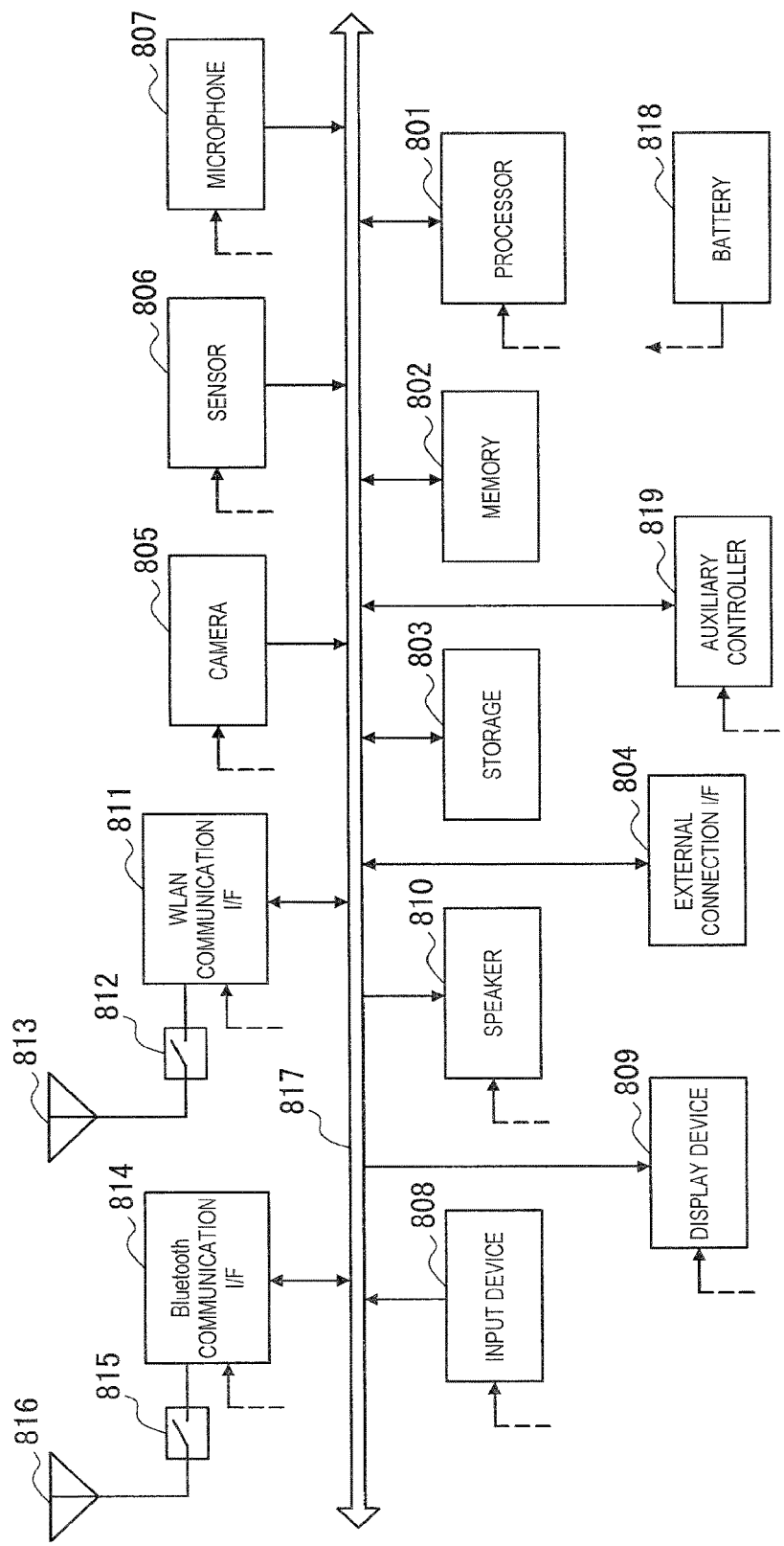
FIG. 22 is a block diagram showing an example of a schematic configuration of a tablet terminal to which the technology according to the present disclosure can be applied.

FIG. 22 is a block diagram showing an example of a schematic configuration of the tablet terminal 800 to which the technology according to the present disclosure can be applied. The tablet terminal 800 includes a processor 801, a memory 802, a storage 803, an external connection interface 804, a camera 805, a sensor 806, a microphone 807, an input device 808, a display device 809, a speaker 810, a WLAN communication interface 811, an antenna switch 812, an antenna 813, a Bluetooth communication interface 814, an antenna switch 815, an antenna 816, a bus 817, a battery 818, and an auxiliary controller 819.

The processor 801 may be, for example, a CPU or a SoC, and controls functions of an application layer and another layer of the tablet terminal 800. The memory 802 includes a RAM and a ROM, and stores a program that is executed by the processor 801, and data. The storage 803 may include a storage medium such as a semiconductor memory and a hard disk. The external connection interface 804 is an interface for connecting an external device such as a memory card and a USB device to the tablet terminal 800.

The camera 805 includes an image sensor such as a CCD and a CMOS, and generates a captured image. The sensor 806 may include a group of sensors such as a measurement sensor, a gyro sensor, a geomagnetic sensor, and an acceleration sensor. The microphone 807 converts sounds that are input to the tablet terminal 800 to audio signals. The input device 808 includes, for example, a touch sensor configured to detect touch onto a screen of the display device 809, a keypad, a keyboard, a button, or a switch, and receives an operation or an information input from a user. The display device 809 includes a screen such as a liquid crystal display (LCD) and an organic light-emitting diode (OLED) display, and displays an output image of the tablet terminal 800. The speaker 810 converts audio signals that are output from the tablet terminal 800 to sounds.

The WLAN communication interface 811 supports one or more WLAN standards such as IEEE 802.11a, 11b, 11g, 11n, 11ac, and 11ad to execute wireless communication. The WLAN communication interface 811 can communicate with another device via a WLAN access point in an infrastructure mode. In addition, the WLAN communication interface 811 can communicate directly with another device in an ad hoc mode. The WLAN communication interface 811 can typically include a BB processor and an RF circuit. The WLAN communication interface 811 may be a one-chip module in which a memory that stores a communication control program, a processor that executes the program, and a relevant circuit are integrated. The antenna switch 812 switches connection destinations of the antenna 813 for a plurality of circuits included in the WLAN communication interface 811. The antenna 813 has a single or a plurality of antenna elements (for example, a plurality of antenna elements constituting a MIMO antenna), and is used by the WLAN communication interface 811 to transmit and receive radio signals.

The Bluetooth communication interface 814 supports one or more Bluetooth standards to execute wireless communication. The Bluetooth communication interface 814 can communicate directly with another device. The Bluetooth communication interface 814 can typically include a BB processor, an RF circuit, and the like. The Bluetooth communication interface 814 may be a one-chip module in which a memory that stores a communication control program, a processor that executes the program, and a relevant circuit are integrated. The antenna switch 815 switches connection destinations of the antenna 816 for a plurality of circuits included in the Bluetooth communication interface 814. The antenna 816 has a single or a plurality of antenna elements, and is used by the Bluetooth communication interface 814 to transmit and receive radio signals.

As shown in FIG. 22, the tablet terminal 800 may have antennas that correspond to each of the WLAN communication interface 811, and the Bluetooth communication interface 814. Note that the configuration is not limited to the example of FIG. 22, and the tablet terminal 800 may have an antenna shared by the WLAN communication interface 811, and the Bluetooth communication interface 814. Specifically, the tablet terminal 800 may have an antenna and antenna switch shared by the WLAN communication interface 811 and the Bluetooth communication interface 814 instead of including the antenna switch 812 and the antenna 813, and the antenna switch 815 and the antenna 816. In addition, the shared antenna may be connected to either of the WLAN communication interface 811 and the Bluetooth communication interface 814 using the antenna switch.

In addition, the tablet terminal 800 may have the WLAN communication interface 811, and the Bluetooth communication interface 814 as separate modules as shown in FIG. 22. Note that the configuration is not limited to the example of FIG. 22, and the tablet terminal 800 may have a one-chip module that includes the WLAN communication interface 811, and the Bluetooth communication interface 814. In this case, the tablet terminal 800 may include an antenna and antenna switch shared between the communication interfaces, or may include antennas corresponding to each of the communication interfaces.

Note that the antenna switch 812, the antenna switch 815, and the antenna switch 718 may be omitted from the configuration of the tablet terminal 800.

The bus 820 connects the processor 801, the memory 802, the storage 803, the external connection interface 804, the camera 805, the sensor 806, the microphone 807, the input device 808, the display device 809, the speaker 810, the WLAN communication interface 811, the Bluetooth communication interface 814, and the auxiliary controller 819 to each other. The battery 818 supplies power to blocks of the tablet terminal 800 illustrated in FIG. 26 via feeder lines, which are partially shown as dashed lines in the drawing. The auxiliary controller 819 operates a minimum necessary function of the tablet terminal 800, for example, in a sleep mode.

The second information acquisition unit 243, the network selection unit 244, and the connection control unit 245 described with reference to FIG. 17 may be implemented by the processor 801 and/or the auxiliary controller 819 of the tablet terminal 800 shown in FIG. 22. More specifically, for example, the second information acquisition unit 243, the network selection unit 244, and the connection control unit 245 may be implemented by the processor 801 and/or the auxiliary controller 819, and a program executed by the processor 801 and/or the auxiliary controller 819 (for example, an OS, a device driver, and/or application software). In addition, at least some of the functions may be implemented by the WLAN communication interface 811 and/or the Bluetooth communication interface 814. In addition, the first wireless communication unit 210 described with reference to FIG. 17 may be implemented by the WLAN communication interface 811. In addition, each of the first information acquisition unit 241 and the network detection unit 242 described with reference to FIG. 17 may be implemented by one or two or more of the processor 801, the auxiliary controller 819, the WLAN communication interface 811, and the Bluetooth communication interface 814.

Note that the tablet terminal 800 may operate as a wireless access point (software AP) as the processor 801 executes an access point function at an application level. In addition, the WLAN communication interface 811 may have a wireless access point function.

Second Application Example

Figure 23:
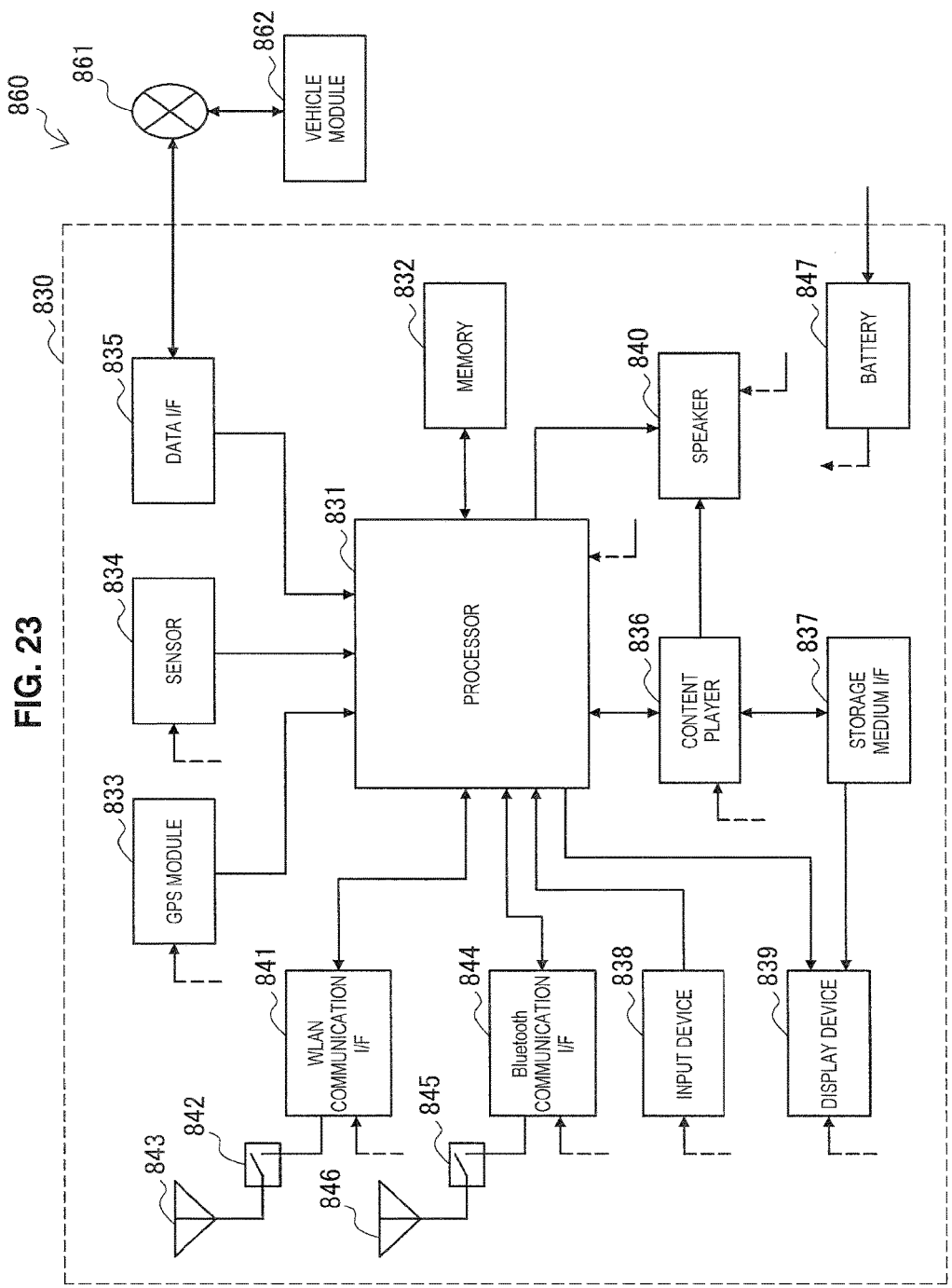
FIG. 23 is a block diagram showing an example of a schematic configuration of a car navigation device to which the technology according to the present disclosure can be applied.

FIG. 23 is a block diagram showing an example of a schematic configuration of the car navigation device 830 to which the technology of the present disclosure can be applied. The car navigation device 830 includes a processor 831, a memory 832, a GPS module 833, a sensor 834, a data interface 835, a content player 836, a storage medium interface 837, an input device 838, a display device 839, a speaker 840, a WLAN communication interface 841, an antenna switch 842, an antenna 843, a Bluetooth communication interface 844, an antenna switch 845, an antenna 846 and a battery 847.

The processor 831 may be, for example, a CPU or a SoC, and controls a navigation function and another function of the car navigation device 730. The memory 832 includes a RANI and a ROM, and stores a program that is executed by the processor 831, and data.

The GPS module 833 uses GPS signals received from a GPS satellite to measure a position (for example, latitude, longitude, and altitude) of the car navigation device 830. The sensor 834 may include a group of sensors such as a gyro sensor, a geomagnetic sensor, and an air pressure sensor. The data interface 835 is connected to, for example, an in-vehicle network 861 via a terminal that is not shown, and acquires data generated by the vehicle, such as vehicle speed data.

The content player 836 reproduces content stored in a storage medium (such as a CD and a DVD) that is inserted into the storage medium interface 837. The input device 838 includes, for example, a touch sensor configured to detect touch onto a screen of the display device 839, a button, or a switch, and receives an operation or an information input from a user. The display device 839 includes a screen such as a LCD or an OLED display, and displays an image of the navigation function or content that is reproduced. The speaker 840 outputs sounds of the navigation function or the content that is reproduced.

The WLAN communication interface 841 supports one or more WLAN standards such as IEEE 802.11a, 11b, 11g, 11n, 11ac, and 11ad to execute wireless communication. The WLAN communication interface 841 can communicate with another device via a WLAN access point in an infrastructure mode. In addition, the WLAN communication interface 841 can communicate directly with another device in an ad hoc mode. The WLAN communication interface 841 can typically include a BB processor and an RF circuit. The WLAN communication interface 841 may be a one-chip module in which a memory that stores a communication control program, a processor that executes the program, and a relevant circuit are integrated. The antenna switch 842 switches connection destinations of the antenna 843 for a plurality of circuits included in the WLAN communication interface 841. The antenna 843 has a single or a plurality of antenna elements (for example, a plurality of antenna elements constituting a MIMO antenna), and is used by the WLAN communication interface 811 to transmit and receive radio signals.

The Bluetooth communication interface 844 supports one or more Bluetooth standards to execute wireless communication. The Bluetooth communication interface 844 can communicate directly with another device. The Bluetooth communication interface 844 can typically include a BB processor, an RF circuit, and the like. The Bluetooth communication interface 844 may be a one-chip module in which a memory that stores a communication control program, a processor that executes the program, and a relevant circuit are integrated. The antenna switch 845 switches connection destinations of the antenna 846 for a plurality of circuits included in the Bluetooth communication interface 844. The antenna 846 has a single or a plurality of antenna elements, and is used by the Bluetooth communication interface 844 to transmit and receive radio signals.

As shown in FIG. 23, the tablet terminal 800 may have antennas that correspond to each of the WLAN communication interface 841, and the Bluetooth communication interface 844. Note that the configuration is not limited to the example of FIG. 23, and the car navigation device 830 may have an antenna shared by the WLAN communication interface 841, and the Bluetooth communication interface 844. Specifically, the car navigation device 830 may have an antenna and antenna switch shared by the WLAN communication interface 841 and the Bluetooth communication interface 844 instead of including the antenna switch 842 and the antenna 843, and the antenna switch 845 and the antenna 846. In addition, the shared antenna may be connected to either of the WLAN communication interface 841 and the Bluetooth communication interface 844 using the antenna switch.

In addition, the car navigation device 830 may have the WLAN communication interface 841, and the Bluetooth communication interface 844 as separate modules as shown in FIG. 23. Note that the configuration is not limited to the example of FIG. 23, and the car navigation device 830 may have a one-chip module that includes the WLAN communication interface 841, and the Bluetooth communication interface 844. In this case, the car navigation device 830 may include an antenna and antenna switch shared between the communication interfaces, or may include antennas corresponding to each of the communication interfaces.

Note that the antenna switch 842, the antenna switch 845, and the antenna switch 748 may be omitted from the configuration of the car navigation device 830.

The battery 847 supplies power to blocks of the car navigation device 830 illustrated in FIG. 23 via feeder lines that are partially shown as dashed lines in the drawing. The battery 847 accumulates power supplied form the vehicle.

The second information acquisition unit 243, the network selection unit 244, and the connection control unit 245 described with reference to FIG. 17 may be implemented by the processor 831 of the car navigation device 830 shown in FIG. 23. More specifically, for example, the second information acquisition unit 243, the network selection unit 244, and the connection control unit 245 may be implemented by the processor 831, and a program executed by the processor 831 (for example, an OS, a device driver and/or application software). In addition, at least some of the functions may be implemented by the WLAN communication interface 841 and/or the Bluetooth communication interface 844. In addition, the first wireless communication unit 210 described with reference to FIG. 17 may be implemented by the WLAN communication interface 841. In addition, each of the first information acquisition unit 241 and the network detection unit 242 described with reference to FIG. 17 may be implemented by one or two or more of the processor 831, the WLAN communication interface 841, and the Bluetooth communication interface 844.

In addition, the technology of the present disclosure may also be realized as an in-vehicle system (or a vehicle) 860 including one or more blocks of the car navigation device 830, the in-vehicle network 861, and a vehicle module 862. The vehicle module 862 generates vehicle data such as vehicle speed, engine speed, and trouble information, and outputs the generated data to the in-vehicle network 861.

6. Conclusion

So far, devices and processes according to the embodiments of the present disclosure have been described with reference to FIGS. 3 to 23.

First Embodiment (Mobile Communication Terminal 100-1)

According to the first embodiment of the present disclosure, the mobile communication terminal 100-1 includes the mobile communication unit 110 which performs the mobile communication of the mobile communication network 30, the second information acquisition unit 164 which acquires state information indicating a state of each of one or more wireless networks for wireless communication that is different from the mobile communication, the network selection unit 165 which selects one wireless network among the one or more wireless networks based on the state information, and the information providing unit 166 which provides information regarding the one selected wireless network to another terminal device which performs the wireless communication. Each of the one or more wireless networks is a wireless network for the wireless communication to which the other terminal device is connectable through an authentication procedure. The information regarding the one or more wireless networks is included in information (i.e., first network information) provided by the network information providing device 300-1 (i.e., an information providing device which provides information regarding a wireless network that is different from the mobile communication network to a device which performs the mobile communication) to the mobile communication terminal 100-1.

Accordingly, for example, the other terminal device (for example, the wireless communication terminal 200-1) can promptly switch communication to communication that is performed via a more desirable wireless network.

First, for example, the wireless communication terminal 200-1 can specify a wireless network to which the terminal is connectable through an authentication procedure from the second network information. As a result, for example, the wireless communication terminal 200-1 can promptly switch communication from communication using tethering to communication that is performed via the specified wireless network (for example, a WLAN).

More specifically, for example, a device with the ANDSF in general provides information regarding a wireless network to a device that performs mobile communication, but does not provide the information to a device that does not perform mobile communication. On the other hand, in the embodiment of the present disclosure, the mobile communication terminal 100-1 acquires, for example, information regarding a wireless network to which the wireless communication terminal 200-1 is connectable through the authentication procedure from the device with the ANDSF (the network information providing device 300-1) and provides the information regarding the wireless network to the wireless communication terminal 200-1 as described above. Thus, even the wireless communication terminal 200-1 that is not provided with the information directly from the device with the ANDSF can specify a wireless network to which the terminal is connectable through the authentication procedure.

Second, the second network information is information regarding one wireless network selected based on state information from one or more wireless networks to which the wireless communication terminal 200-1 is connectable through the authentication procedure. Thus, for example, the wireless communication terminal 200-1 can specify a more desirable wireless network (for example, a wireless network with better communication quality) to which the wireless communication terminal 200-1 is connectable through the authentication procedure from the provided second network information. As a result, for example, the wireless communication terminal 200-1 can promptly switch communication from communication using tethering to communication that is performed via the specified more desirable wireless network.

Note that, when communication using tethering is being performed, the wireless communication terminal 200-1 can acquire information from the mobile communication terminal 100-1. Thus, provision of the second network information to the wireless communication terminal 200-1 is appropriate when communication to tethering is switched to communication performed via a wireless network (for example, a WLAN).

Use Situation Information

The state information includes, for example, use situation information indicating a use situation of each of the one or more wireless networks. With the use situation information, it is possible to ascertain a congestion situation of each of the one or more wireless networks. Thus, it is possible to deduce which wireless network has better communication quality among the one or more wireless networks.

As a first example, the use situation information includes information regarding the number of devices that are connected to each of the one or more wireless networks. With the information, for example, it is possible to ascertain the number of terminals connected to each of the one or more wireless networks. Thus, it is possible to ascertain a congestion situation of each of the one or more wireless networks.

As a second example, the use situation information includes information regarding traffic on each of the one or more wireless networks. With the information, for example, it is possible to ascertain the amount of traffic on each of the one or more wireless networks. Thus, it is possible to ascertain a congestion situation of each of the one or more wireless networks.

Disposition Situation Information

The second information acquisition unit 164 acquires, for example, disposition situation information indicating a disposition situation of an access point of each of the one or more wireless networks. Then, the network selection unit 165 selects the one wireless network based further on the disposition situation information. Accordingly, for example, it is possible to select a wireless network with better communication quality with high accuracy.

Communication Quality Information

The state information may be communication quality information indicating measured communication quality of each of the one or more wireless networks. With the communication quality information, for example, it is possible to ascertain communication quality of a wireless network. Thus, it is possible to specify a wireless network with better communication quality among the one or more wireless networks.

The communication quality information may be, for example, information generated by the mobile communication terminal 100-1 or the wireless communication terminal 200-1 through measurement of communication quality. Accordingly, for example, an amount of information provided from a network side becomes small and radio resources can be saved.

Selection Based on a Sharing Situation of a Channel

The network selection unit 165 may select one wireless network based further on, for example, a sharing situation of a channel used on each of the one or more wireless networks. Accordingly, for example, it is possible to consider a possibility of interference or cross talk occurring on a wireless network, and to select a wireless network with better communication quality with high accuracy.

Authentication Procedure

The authentication procedure includes an authentication procedure in which authentication information provided by the SIM of the mobile communication terminal 100-1 is used, and the information providing unit 166 provides the authentication information to the other terminal device. Accordingly, the other terminal device can perform SIM authentication procedure. Thus, for example, it is possible to lessen efforts of a user of the other terminal device in, for example, connection of the other terminal device (for example, the wireless communication terminal 200-1) that does not perform mobile communication on the mobile communication network 30 to a wireless network (for example, a WLAN). It is possible to lessen an effort of, for example, inputting a password or the like. As a result, for example, communication can be promptly switched.

Note that the authentication procedure may include an authentication procedure in which an electronic certificate is used. Accordingly, it is possible to lessen an effort of the user as in the case in which the SIM authentication procedure is used.

One or More Wireless Networks

Each of the one or more wireless networks is, for example, a wireless network that has a communication area that corresponds to a position of the mobile communication terminal 100-1 or the wireless communication terminal 200-1. Accordingly, information regarding a wireless network that is connectable in terms of position is obtained. Thus, it is possible to avoid attempts to detect a wireless network that is not allowed to connect in terms of position.

In addition, each of the one or more wireless networks is, for example, a wireless network that has an available time in terms of time. Accordingly, information regarding a wireless network that is connectable in terms of time can be obtained. Thus, for example, it is possible to avoid attempting detection of a wireless network that is non-connectable in terms of time.

Second Embodiment (Wireless Communication Terminal 200-2)

According to the second embodiment of the present disclosure, the wireless communication terminal 200-2 includes the first wireless communication unit 210 which performs wireless communication that is different from mobile communication of the mobile communication network 30, the second information acquisition unit 243 which acquires state information indicating a state of each of one or more wireless networks for the wireless communication, and the network selection unit 244 which selects one wireless network among the one or more wireless networks based on the state information. Each of the one or more wireless networks is a wireless network for the wireless communication to which the wireless communication terminal 200-2 is connectable through an authentication procedure. Information regarding the one or more wireless networks is at least partial information of information (i.e., first network information) provided by the network information providing device 300-2 (i.e., an information providing device which provides information regarding a wireless network that is different from the mobile communication network to a device that performs the mobile communication) to another terminal device that performs the mobile communication, and is included in the information provided by the other terminal device to the wireless communication terminal 200-2 (i.e., third network information). The wireless communication terminal 200-2 further includes the connection control unit which causes the wireless communication terminal 200-2 to be connected to one selected wireless network through the authentication procedure.

Accordingly, for example, the wireless communication terminal 200-2 can promptly switch communication to communication that is performed via a more desirable wireless network.

It should be understood by those skilled in the art that various modifications, combinations, sub-combinations and alterations may occur depending on design requirements and other factors insofar as they are within the scope of the appended claims or the equivalents thereof.

Although the example in which the network information providing device provides information to the mobile communication terminal according to, for example, a request of the mobile communication terminal has been described, the present disclosure is not limited thereto. The network information providing device may provide information to the mobile communication terminal, for example, without a request of the mobile communication terminal.

In addition, although the example in which all wireless networks that are search objects of the network information providing device are wireless networks to which the mobile communication terminal and the wireless communication terminal are connectable through the authentication procedure has been mainly described, the present disclosure is not limited thereto. For example, wireless networks that are search objects of the network information providing device may include a wireless network to which one of the mobile communication terminal and the wireless communication terminal is connectable through the authentication procedure. As an example, the wireless network may be a wireless network to which connection of only one of the mobile communication terminal and the wireless communication terminal is admitted due to a contract. Alternatively, the wireless network may be a wireless network that uses an authentication scheme that the other of the mobile communication terminal and the wireless communication terminal does not support (in other words, for which the other does not have a capability). In addition, for example, wireless networks that are search objects of the network information providing device may include a wireless network to which neither the mobile communication terminal nor the wireless communication terminal is connectable through the authentication procedure. As an example, the wireless network may be a wireless network to which connection of neither the mobile communication terminal nor the wireless communication terminal is admitted due to a contract. Alternatively, the wireless network may be a wireless network that uses an authentication scheme that neither the mobile communication terminal nor the wireless communication terminal supports (in other words, for which neither has a capability). In such a case, as an example, the network information providing device may search remaining wireless networks except for wireless networks to which neither the mobile communication terminal nor the wireless communication terminal is connectable through the authentication procedure among the wireless networks that are search objects for a wireless network according to a request of the mobile communication terminal. Alternatively, as another example, the network information providing device may search wireless networks that are search objects for a wireless network according to a request of the mobile communication terminal under a search condition that the mobile communication terminal and/or the wireless communication terminal be connectable thereto through the authentication procedure.

Although the example in which, for example, the mobile communication terminal acquires information regarding at least one wireless network from the network information providing device, detects one or more wireless networks from the at least one wireless network, and selects one wireless network among the one or more detected wireless networks has been described (in the first embodiment), the present disclosure is not limited thereto. For example, the mobile communication terminal may provide information regarding a detected wireless network to the network information providing device. In addition, the mobile communication terminal may acquire information regarding one or more wireless networks among the detected wireless network from the network information providing device and select one wireless network from the one or more wireless networks.

In addition, although the example in which, for example, the wireless communication terminal acquires information regarding at least one wireless network from the mobile communication terminal, detects one or more wireless networks from the at least one wireless network, and selects one wireless network from the one or more detected wireless networks has been described (in the second embodiment), the present disclosure is not limited thereto. For example, the wireless communication terminal may acquire information regarding one or more wireless networks among the detected wireless networks from the mobile communication terminal and select one wireless network from the one or more wireless networks.

In addition, although the example in which for example, the mobile communication terminal or the wireless communication terminal evaluates one or more detected wireless networks based on state information and selects one wireless network has been described, the present disclosure is not limited thereto. As an example, the mobile communication terminal or the wireless communication terminal may evaluate one or more wireless networks that are not detected yet based on state information, and thereafter detect some of the one or more wireless networks (for example, wireless networks with higher evaluation values) or all of them. Then, the mobile communication terminal or the wireless communication terminal may select one of the detected wireless networks.

In addition, although the example in which, for example, one wireless network is selected based on use situation information and disposition situation information, and the example in which one wireless network is selected based on communication quality information and a sharing situation of a channel have been described, the present disclosure is not limited thereto. For example, one wireless network may be selected based on one or two or more of use situation information, disposition situation information, communication quality information, and a sharing situation of a channel. As an example, one wireless network may be selected based on both of the use situation information and the communication quality information. In other words, state information may include both use situation information and communication quality information. As another example, one wireless network may be selected based on communication quality information and disposition situation information.

In addition, although the example in which, for example, evaluation values of one or more wireless networks are calculated based on use situation information or communication quality information and one wireless network is selected based on the evaluation values has been mainly described, the present disclosure is not limited thereto. For example, the use situation information or the communication quality information may serve as an evaluation value by itself. As an example, the network information providing device may calculate the evaluation values, and the mobile communication terminal or the wireless communication terminal may select one wireless network based on the evaluation values. As another example, the mobile communication terminal may calculate the evaluation values and the wireless communication terminal may select one wireless network based on the evaluation values.

In addition, although the example in which, for example, use situation information and disposition situation information are provided to the network information providing device via a wireless network (i.e., an access point of a wireless network, a management device of a wireless network or the like) has been described, the present disclosure is not limited thereto. For example, use situation information and/or disposition situation information may be provided to the network information providing device by another device. In addition, although the example in which, for example, use situation information and disposition situation information are provided to the mobile communication terminal by the network information providing device has been described, the present disclosure is not limited thereto. Use situation information and/or disposition situation information may be provided to the mobile communication terminal by, for example, another device.

In addition, although the example in which, for example, the mobile communication terminal or the wireless communication terminal determines a sharing situation of a channel by itself has been described, the present disclosure is not limited thereto. Information indicating a sharing situation of a channel may be provided to the mobile communication terminal from, for example, a network side.

In addition, for example, although WLAN communication is exemplified as an example of wireless communication that is different from mobile communication of a mobile communication network, the present disclosure is not limited thereto. The wireless communication may be, for example, wireless communication other than WLAN communication. Alternatively, the wireless communication may include WLAN communication and the other wireless communication.

In addition, the network information providing device may also provide, for example, information regarding a network other than a WLAN. For example, the network information providing device may provide information regarding a wireless network that is different from a mobile communication network other than WLAN communication. In addition, the network information providing device may further provide information regarding another mobile communication network that is different from the mobile communication network. For example, if the mobile communication network is a network of LTE or LTE-Advanced, the network information providing device may provide information regarding a network of 3GPP2 as information regarding the other mobile communication network. Alternatively, the network information providing device may provide information regarding a network of mobile Worldwide Interoperability for Microwave Access (WiMAX) (registered trademark).

In addition, although, the example in which the mobile communication terminal performs, for example, communication that conforms with LTE or LTE-Advanced and the mobile communication network is a network that conforms with LTE or LTE-Advanced has been described, the present disclosure is not limited thereto. The mobile communication terminal may perform communication that conforms with another communication standard (for example, another communication standard of the 3GPP) as mobile communication, and the mobile communication network may also be a network that conforms with the other communication standard.

In addition, although the example in which the network information providing device is positioned, for example, within a mobile communication network (core network) has been described, the present disclosure is not limited thereto. For example, the network information providing device may be positioned outside the mobile communication network.

In addition, although the example in which the network information providing device provides, for example, information regarding a wireless network for wireless communication that is different from mobile communication only to a device that performs mobile communication has been described, the present disclosure is not limited thereto. For example, the network information providing device may provide the information regarding the wireless network not only to a device that performs mobile communication but also to a device that does not perform mobile communication.

In addition, although, the example in which the network information providing device is a device with, for example, the ANDSF has been described, the present disclosure is not limited thereto. For example, the network information providing device may have another function of providing information regarding a wireless network rather than the ANDSF.

In addition, processing steps in each of the processes of the present specification are not necessarily executed in the orders described in the flowcharts in a time-series manner. The processing steps in each of the processes may be executed, for example, in a different order from the orders described in the flowcharts or may be executed in parallel.

In addition, a computer program for causing hardware such as a CPU, a ROM, and a RAM installed in a terminal device according to the present disclosure (i.e., the mobile communication terminal or the wireless communication terminal) to exhibit the same function as each configuration of the terminal device can also be created. In addition, a storage medium to store the computer program may also be provided. In addition, an information processing device (for example, a processing circuit or a chip) that includes a memory (for example, a ROM and a RAM) that stores the computer program and one or more processors (for example, a CPU, a DSP, etc.) that can execute the computer program may also be provided.

In addition, the effects described in the present specification are merely illustrative or exemplary, and are not limitative. In other words, the technology according to the present disclosure can exhibit, along with or instead of the effects, other effects that are apparent to those skilled in the art based on the present specification.

Additionally, the present technology may also be configured as below.

(1)

A terminal device including:
   a mobile communication unit configured to perform mobile communication of a mobile communication network;
   an acquisition unit configured to acquire state information indicating a state of each of one or more wireless networks for wireless communication that is different from the mobile communication;
   a selection unit configured to select one wireless network among the one or more wireless networks based on the state information; and
   a providing unit configured to provide information regarding the one selected wireless network to another terminal device that performs the wireless communication,
   wherein each of the one or more wireless networks is a wireless network for the wireless communication to which the other terminal device is connectable through an authentication procedure, and
   wherein information regarding the one or more wireless networks is included in information provided to the terminal device by an information providing device that provides information regarding a wireless network that is different from the mobile communication network to a device that performs the mobile communication.

(2)

The terminal device according to (1), wherein the state information includes use situation information indicating a use situation of each of the one or more wireless networks.

(3)

The terminal device according to (2), wherein the use situation information includes information regarding the number of devices that are connected to each of the one or more wireless networks.

(4)

The terminal device according to (2) or (3), wherein the use situation information includes information regarding traffic on each of the one or more wireless networks.

(5)

The terminal device according to any one of (2) to (4), wherein the use situation information is included in information to be provided to the terminal device via the mobile communication network.

(6)

The terminal device according to any one of (1) to (5), wherein the acquisition unit acquires disposition situation information indicating a disposition situation of an access point of each of the one or more wireless networks, and wherein the selection unit selects the one wireless network based further on the disposition situation information.

(7)

The terminal device according to any one of (1) to (6), wherein the state information includes communication quality information indicating measured communication quality of each of the one or more wireless networks.

(8)

The terminal device according to (7), wherein the communication quality information includes information indicating intensity of a received signal.

(9)

The terminal device according to (7) or (8), wherein the communication quality information is information generated by the terminal device or the other terminal device through measurement of communication quality.

(10)

The terminal device according to any one of (1) to (9), wherein the selection unit selects the one wireless network based further on a sharing situation of a channel used on each of the one or more wireless networks.

(11)

The terminal device according to any one of (1) to (10), wherein the authentication procedure includes an authentication procedure in which authentication information provided by a subscriber identification module of the terminal device is used, and wherein the providing unit provides the authentication information to the other terminal device.

(12)

The terminal device according to any one of (1) to (11), wherein the authentication procedure includes an authentication procedure in which an electronic certificate is used.

(13)

The terminal device according to any one of (1) to (12), wherein each of the one or more wireless networks is a wireless network that has a communication area that corresponds to a position of the terminal device or the other terminal device.

(14)

The terminal device according to any one of (1) to (13), wherein each of the one or more wireless networks is a wireless network that has an available time in terms of time.

(15)

The terminal device according to any one of (1) to (14),
   wherein each of the one or more wireless networks is a wireless local area network (WLAN), and
   wherein the wireless communication is WLAN communication.

(16)

The terminal device according to any one of (1) to (15), wherein each of the one or more wireless networks is a wireless network operated by an operator of the mobile communication network.

(17)

The terminal device according to any one of (1) to (16), wherein the information providing device is a device with an access network discovery and selection function (ANDSF).

(18)

An information processing device for a terminal device which performs mobile communication of a mobile communication network, the information processing device including:
   a memory that stores a program; and
   one or more processors that are capable of executing the program,
   wherein the program is a program for execution of acquiring state information indicating a state of each of one or more wireless networks for wireless communication that is different from the mobile communication, selecting one wireless network among the one or more wireless networks based on the state information, and providing information regarding the one selected wireless network to another terminal device that performs the wireless communication, wherein each of the one or more wireless networks is a wireless network for the wireless communication to which the other terminal device is connectable through an authentication procedure, and wherein information regarding the one or more wireless networks is included in information provided to the terminal device by an information providing device that provides information regarding a wireless network that is different from the mobile communication network to a device that performs the mobile communication.

(19)

A terminal device including:

a wireless communication unit configured to perform wireless communication that is different from mobile communication of a mobile communication network;

an acquisition unit configured to acquire state information indicating a state of each of one or more wireless networks for the wireless communication; and a selection unit configured to select one wireless network among the one or more wireless networks based on the state information, wherein each of the one or more wireless networks is a wireless network for the wireless communication to which the terminal device is connectable through an authentication procedure, wherein information regarding the one or more wireless networks is at least partial information of information to be provided to another terminal device that performs the mobile communication by an information providing device that provides information regarding a wireless network that is different from the mobile communication network to a device that performs the mobile communication, and is included in the information to be provided to the terminal device by the other terminal device, and wherein the terminal device further includes a connection control unit configured to causes the terminal device to be connected to the one selected wireless network through the authentication procedure.

(20)

An information processing device for a terminal device that performs wireless communication that is different from mobile communication of a mobile communication network, the information processing device including:

a memory that stores a program; and one or more processors that are capable of executing the program, wherein the program is a program for causing execution of acquiring state information indicating a state of each of one or more wireless networks for the wireless communication, and selecting one wireless network among the one or more wireless networks based on the state information, wherein each of the one or more wireless networks is a wireless network for the wireless communication to which the terminal device is connectable through an authentication procedure, wherein information regarding the one or more wireless networks is at least partial information of information to be provided to another terminal device that performs the mobile communication by an information providing device that provides information regarding a wireless network that is different from the mobile communication network to a device that performs the mobile communication, and included in the information to be provided to the terminal device by the other terminal device, and wherein the program is a program for further causing execution of connecting the terminal device to the one selected wireless network through the authentication procedure.

REFERENCE SIGNS LIST

1 communication system
30 mobile communication network
50 wireless network
51 access point
100 mobile communication terminal
110 mobile communication unit
164 second information acquisition unit
165 network selection unit
166 information providing unit
200 wireless communication terminal
210 first wireless communication unit
243 second information acquisition unit
244 network selection unit
245 connection control unit
300 network information providing device

The invention claimed is:

1. A terminal device comprising:

circuitry including at least a processor and a memory, the circuitry configured to:

perform mobile communication of a mobile communication network according to a communication standard of Third Generation Partnership Project (3GPP) that is different from wireless communication performed according to a wireless local area network (WLAN) standard by another terminal device that is a wireless communication terminal;

relay communications between the mobile communication network and the wireless communication terminal that performs tethering;

acquire state information indicating a state of each of one or more wireless networks for the wireless communication that is different from the mobile communication;

select one wireless network among the one or more wireless networks based on the state information; and provide information regarding the one selected wireless network to the wireless communication terminal;

wherein each of the one or more wireless networks is a wireless network for the wireless communication to which the wireless communication terminal is connectable through an authentication procedure, and wherein information regarding the one or more wireless networks is included in information provided to the terminal device by an information providing device that provides information regarding a wireless network that is different from the mobile communication network to a device that performs the mobile communication.

2. The terminal device according to claim 1, wherein the circuitry is further configured to:

acquire disposition situation information indicating a disposition situation of an access point of each of the one or more wireless networks; and select the one wireless network based further on the disposition situation information.

3. The terminal device according to claim 1, wherein the circuitry is further configured to select the one wireless network based further on a sharing situation of a channel used on each of the one or more wireless networks.

4. The terminal device according to claim 1, wherein the authentication procedure includes a procedure in which authentication information provided by a subscriber identification module of the terminal device is used, the circuitry is further configured to provide the authentication information to the other terminal device.

5. The terminal device according to claim 1, wherein the authentication procedure includes a procedure in which an electronic certificate is used.

6. The terminal device according to claim 1, wherein each of the one or more wireless networks is a wireless network that has a communication area that corresponds to a position of the terminal device or the other terminal device.

7. The terminal device according to claim 1, wherein each of the one or more wireless networks is a wireless network that has an available time in terms of time.

8. The terminal device according to claim 1,
wherein each of the one or more wireless networks is the WLAN.

9. The terminal device according to claim 1, wherein each of the one or more wireless networks is a wireless network operated by an operator of the mobile communication network.

10. The terminal device according to claim 1, wherein the information providing device is a device with an access network discovery and selection function (ANDSF).

11. The terminal device according to claim 1, wherein the state information includes use situation information indicating a use situation of each of the one or more wireless networks.

12. The terminal device according to claim 11, wherein the use situation information includes information regarding a number of devices that are connected to each of the one or more wireless networks.

13. The terminal device according to claim 11, wherein the use situation information includes information regarding traffic on each of the one or more wireless networks.

14. The terminal device according to claim 11, wherein the use situation information is included in information to be provided to the terminal device via the mobile communication network.

15. The terminal device according to claim 1, wherein the state information includes communication quality information indicating measured communication quality of each of the one or more wireless networks.

16. The terminal device according to claim 15, wherein the communication quality information includes information indicating intensity of a received signal.

17. The terminal device according to claim 15, wherein the communication quality information is information generated by the terminal device or the other terminal device through measurement of communication quality.

18. A non-transitory computer readable medium storing computer readable instructions thereon that, when executed by a terminal device, causes the terminal device to perform a method comprising:
performing mobile communication of a mobile communication network according to a communication standard of Third Generation Partnership Project (3GPP) that is different from wireless communication performed according to a wireless local area network (WLAN) standard by another terminal device that is a wireless communication terminal;
relaying communications between the mobile communication network and the wireless communication terminal that performs tethering;
acquiring state information indicating a state of each of one or more wireless networks for the wireless communication that is different from the mobile communication;
selecting one wireless network among the one or more wireless networks based on the state information; and
providing information regarding the one selected wireless network to the wireless communication terminal;
wherein each of the one or more wireless networks is a wireless network for the wireless communication to which the wireless communication terminal is connectable through an authentication procedure, and
wherein information regarding the one or more wireless networks is included in information provided to the terminal device by an information providing device that provides information regarding a wireless network that is different from the mobile communication network to a device that performs the mobile communication.

19. A terminal device comprising:
circuitry including at least a processor and a memory, the circuitry configured to:
perform wireless communication according to a wireless local area network (WLAN) standard that is different from mobile communication of a mobile communication network performed according to a communication standard of Third Generation Partnership Project (3GPP) by another terminal device that is a mobile communication terminal, the mobile communication terminal relaying communications between the mobile communication network and the terminal device that performs tethering;
acquire state information indicating a state of each of one or more wireless networks for the wireless communication; and
select one wireless network among the one or more wireless networks based on the state information,
wherein each of the one or more wireless networks is a wireless network for the wireless communication to which the terminal device is connectable through an authentication procedure,
wherein information regarding the one or more wireless networks is at least partial information of information to be provided to the mobile communication terminal by an information providing device that provides information regarding a wireless network that is different from the mobile communication network to a device that performs the mobile communication, and is included in the information to be provided to the terminal device by the mobile communication terminal, and
wherein the circuitry is further configured to causes the terminal device to be connected to the one selected wireless network through the authentication procedure.

20. A non-transitory computer readable medium storing computer readable instructions thereon that, when executed by a terminal device, causes the terminal device to perform a method comprising:
performing wireless communication according to a wireless local area network (WLAN) standard that is different from mobile communication of a mobile communication network performed according to a communication standard of Third Generation Partnership Project (3GPP) by another terminal device that is a mobile communication terminal, the mobile communication terminal relaying communications between the mobile communication network and the terminal device that performs tethering;
acquiring state information indicating a state of each of one or more wireless networks for the wireless communication; and selecting one wireless network among the one or more wireless networks based on the state information, wherein each of the one or more wireless networks is a wireless network for the wireless communication to which the terminal device is connectable through an authentication procedure, wherein information regarding the one or more wireless networks is at least partial information of information to be provided to the mobile communication terminal by an information providing device that provides information regarding a wireless network that is different from the mobile communication network to a device that performs the mobile communication, and is included in the information to be provided to the terminal device by the mobile communication terminal; and causing the terminal device to be connected to the one selected wireless network through the authentication procedure.

* * * * *